(12) United States Patent
Smolenaers

(10) Patent No.: US 11,479,139 B2
(45) Date of Patent: Oct. 25, 2022

(54) METHODS AND SYSTEMS FOR AN INTEGRATED CHARGING SYSTEM FOR AN ELECTRIC VEHICLE

(71) Applicant: InvertedPower Pty Ltd, Heidelberg West (AU)

(72) Inventor: Stefan Smolenaers, Heidelberg West (AU)

(73) Assignee: InvertedPower Pty Ltd, Heidelberg West (AU)

( * ) Notice: Subject to any disclaimer, the term of this patent is extended or adjusted under 35 U.S.C. 154(b) by 0 days.

(21) Appl. No.: 16/900,667

(22) Filed: Jun. 12, 2020

(65) Prior Publication Data
US 2020/0298722 A1    Sep. 24, 2020

Related U.S. Application Data

(63) Continuation of application No. 16/612,354, filed as application No. PCT/AU2018/000065 on May 8, (Continued)

(30) Foreign Application Priority Data

Sep. 11, 2015 (AU) .................................. 2015903706
May 8, 2017 (AU) .................................. 2017901696
(Continued)

(51) Int. Cl.
*B60L 53/60* (2019.01)
*H02P 27/08* (2006.01)
(Continued)

(52) U.S. Cl.
CPC ............ *B60L 53/60* (2019.02); *B60L 53/53* (2019.02); *B60L 53/66* (2019.02); *H02J 7/02* (2013.01);
(Continued)

(58) Field of Classification Search
None
See application file for complete search history.

(56) References Cited

U.S. PATENT DOCUMENTS 4,258,304 A    3/1981    Bourke
4,536,696 A    8/1985    Ray
(Continued)

FOREIGN PATENT DOCUMENTS

CN    101633309 A    1/2010
CN    201639546 U    11/2010
(Continued)

OTHER PUBLICATIONS

Liu, T. et al., "Implementation of an Integrated Battery-Charger for an Electric-Propulsion System," Proceedings of the 40th Annual Conference of the IEEE Industrial Electronics Society (IECON 2014), Oct. 29, 2014, Dallas, Texas, 6 pages.
(Continued)

*Primary Examiner* — Rexford N Barnie
*Assistant Examiner* — Terrence R Willoughby
(74) *Attorney, Agent, or Firm* — McCoy Russell LLP

(57) ABSTRACT

Methods and systems are provided for an onboard charging system of an electric vehicle. In one example, the charging system includes a controller for an electric vehicle comprising a first DC energy storage device at a device voltage, a charging interface for interfacing with an external DC source of an external DC voltage, an electric machine including one or more inductive windings, a converter comprising at least two or more drive circuits operating in a first and in a second state, a first DC input and a second DC input to the converter, and a switching mechanism for selectively operating in a first state and in a second state operated by the controller, wherein in the first state the converter is responsive to drawing a drive current from the
(Continued)

first DC energy storage device and applying current to at least one of the one or more inductive windings for moving the vehicle, and in the second state, the converter is responsive to drawing a load current from the charging interface and applying an energizing current to at least one of the one or more inductive windings for generating at least one of a regulated charging voltage for the DC energy storage device.

20 Claims, 19 Drawing Sheets

Related U.S. Application Data 2018, and a continuation-in-part of application No. 15/758,694, filed as application No. PCT/AU2016/050852 on Sep. 12, 2016, now Pat. No. 10,771,001.

(30) Foreign Application Priority Data

Jul. 17, 2017 (AU) ................................ 2017902796
Jun. 12, 2019 (AU) ................................ 2019902046

(51) Int. Cl.
H02J 7/34 (2006.01)
H02J 7/02 (2016.01)
B60L 53/53 (2019.01)
B60L 53/66 (2019.01)
B60K 6/28 (2007.10)

(52) U.S. Cl.
CPC .............. H02J 7/345 (2013.01); H02P 27/08 (2013.01); B60K 6/28 (2013.01); B60L 2210/30 (2013.01); B60Y 2200/91 (2013.01); B60Y 2200/92 (2013.01); B60Y 2300/91 (2013.01)

(56) References Cited

U.S. PATENT DOCUMENTS

| | | | |
|---|---|---|---|
| 4,920,475 A | 4/1990 | Rippel | |
| 5,017,800 A | 5/1991 | Divan | |
| 5,099,186 A | 3/1992 | Rippel et al. | |
| 5,182,508 A | 1/1993 | Schauder | |
| 5,235,504 A | 8/1993 | Sood | |
| 5,291,388 A | 3/1994 | Heinrich | |
| 5,341,075 A | 8/1994 | Cocconi | |
| 5,373,195 A | 12/1994 | De Doncker et al. | |
| 5,412,557 A | 5/1995 | Lauw | |
| 5,500,579 A | 3/1996 | Kim et al. | |
| 5,504,414 A | 4/1996 | Kinoshita | |
| 5,546,295 A | 8/1996 | Prete et al. | |
| 5,583,385 A | 12/1996 | Horie et al. | |
| 5,642,270 A | 6/1997 | Green et al. | |
| 5,717,303 A | 2/1998 | Engel | |
| 5,734,237 A | 3/1998 | Engel | |
| 5,875,106 A | 2/1999 | Tenconi et al. | |
| 5,952,812 A | 9/1999 | Maeda | |
| 6,002,603 A | 12/1999 | Carver | |
| 6,031,738 A | 2/2000 | Lipo et al. | |
| 6,066,928 A | 5/2000 | Kinoshita et al. | |
| 6,496,393 B1 | 12/2002 | Patwardhan | |
| 6,608,396 B2 | 8/2003 | Downer et al. | |
| 6,724,100 B1 | 4/2004 | Gabriel | |
| 6,822,866 B2 | 11/2004 | Fearing et al. | |
| 6,930,460 B2 | 8/2005 | Ishikawa et al. | |
| 7,012,822 B2 | 3/2006 | Zhu et al. | |
| 7,327,113 B2 | 2/2008 | Steigerwald et al. | |
| 7,332,882 B2 | 2/2008 | Aoyagi et al. | |
| 7,443,125 B2 | 10/2008 | Clothier et al. | |
| 7,538,449 B2 | 5/2009 | Schreiber | |
| 7,595,606 B2 | 9/2009 | Loubeyre | |
| 7,832,513 B2 | 11/2010 | Verbrugge et al. | |
| 7,859,201 B2 | 12/2010 | Oyobe et al. | |
| 7,932,633 B2 | 4/2011 | King et al. | |
| 7,977,819 B2 | 7/2011 | Kitanaka | |
| 3,030,884 A1 | 10/2011 | King et al. | |
| 8,080,973 B2 | 12/2011 | King et al. | |
| 8,098,056 B2 | 1/2012 | Yamazaki et al. | |
| 8,138,694 B2 | 3/2012 | Steigerwald et al. | |
| 8,143,856 B2 | 3/2012 | Andrea et al. | |
| 8,217,616 B2 | 7/2012 | Rozman et al. | |
| 8,232,669 B2 | 7/2012 | Chen et al. | |
| 8,299,739 B2 | 10/2012 | Kakebayashi et al. | |
| 8,395,910 B2 | 3/2013 | Alexander | |
| 8,405,327 B2 | 3/2013 | Liang et al. | |
| 8,415,904 B2 | 4/2013 | Rippel | |
| 8,421,271 B2 | 4/2013 | King et al. | |
| 8,432,126 B2 | 4/2013 | Hasan et al. | |
| 8,466,652 B2 | 6/2013 | Klaes | |
| 8,547,051 B2 | 10/2013 | Green et al. | |
| 8,638,069 B2 | 1/2014 | Krauer | |
| 8,653,696 B2 | 2/2014 | King et al. | |
| 8,736,203 B2 | 5/2014 | Jang et al. | |
| 8,772,984 B2 | 7/2014 | Chang | |
| 8,803,469 B2 | 8/2014 | Briane et al. | |
| 8,847,555 B2 | 9/2014 | Loudot et al. | |
| 8,963,365 B2 | 2/2015 | King et al. | |
| 9,000,717 B2 | 4/2015 | Januschevski et al. | |
| 9,000,740 B2 | 4/2015 | Touzani et al. | |
| 9,018,809 B2 | 4/2015 | Rippel et al. | |
| 9,045,046 B2 | 6/2015 | Januschevski et al. | |
| 9,231,433 B2 | 1/2016 | Schillinger | |
| 9,252,625 B2 | 2/2016 | Dittmer et al. | |
| 9,312,692 B2 | 4/2016 | Feuerstack et al. | |
| 9,457,672 B2 | 10/2016 | Chang | |
| 9,573,486 B2 | 2/2017 | Hoevenaars et al. | |
| 9,937,806 B2 | 4/2018 | Spesser et al. | |
| 10,097,078 B2 | 10/2018 | Rayner et al. | |
| 10,358,041 B2 | 7/2019 | Lee et al. | |
| 10,389,158 B2 | 8/2019 | Schillinger | |
| 10,439,516 B2 | 10/2019 | Tsugawa et al. | |
| 10,476,401 B2 | 11/2019 | Kusch et al. | |
| 10,498,221 B2 | 12/2019 | Rayner et al. | |
| 10,507,716 B2 | 12/2019 | Huh et al. | |
| 10,562,404 B1 | 2/2020 | Khaligh et al. | |
| 10,826,408 B2 | 11/2020 | Tarkiainen et al. | |
| 11,245,346 B2 | 2/2022 | Chon et al. | |
| 2002/0158606 A1 | 10/2002 | King | |
| 2002/0185989 A1 | 12/2002 | Rahman et al. | |
| 2004/0062059 A1 | 4/2004 | Cheng et al. | |
| 2006/0226703 A1 | 10/2006 | Schreiber | |
| 2007/0029986 A1 | 2/2007 | Nakamura et al. | |
| 2008/0238372 A1 | 10/2008 | Cintra et al. | |
| 2010/0045248 A1 | 2/2010 | Hawley | |
| 2010/0244775 A1 | 9/2010 | Smith | |
| 2012/0019212 A1 | 1/2012 | Krauer | |
| 2012/0049820 A1 | 3/2012 | Moussaoui et al. | |
| 2012/0062176 A1 | 3/2012 | Hasan et al. | |
| 2012/0153884 A1 | 6/2012 | Lindsey et al. | |
| 2012/0181975 A1 | 7/2012 | Loudot et al. | |
| 2012/0274246 A1 | 11/2012 | Radulescu | |
| 2012/0286740 A1 | 11/2012 | Loudot et al. | |
| 2013/0020993 A1 | 1/2013 | Taddeo et al. | |
| 2013/0193276 A1 | 8/2013 | Hunter | |
| 2013/0214729 A1 | 8/2013 | Gati et al. | |
| 2013/0221921 A1* | 8/2013 | Ang | B60L 7/14 320/109 |
| 2013/0265005 A1* | 10/2013 | Kurita | B60L 53/22 320/109 |
| 2013/0293163 A1 | 11/2013 | Flett | |
| 2013/0320912 A1 | 12/2013 | Feuerstack et al. | |
| 2014/0062183 A1 | 3/2014 | Ichikawa | |
| 2014/0062394 A1 | 3/2014 | Khan et al. | |
| 2014/0097676 A1* | 4/2014 | Kusumi | B60L 58/16 307/10.1 |
| 2014/0132203 A1 | 5/2014 | Schillinger | |
| 2014/0191582 A1 | 7/2014 | Deboy et al. | |
| 2014/0232301 A1 | 8/2014 | Dittmer et al. | |
| 2014/0265971 A1 | 9/2014 | Taube et al. | |
| 2015/0008748 A1 | 1/2015 | Deboy et al. | |

(56) References Cited

U.S. PATENT DOCUMENTS

| | | |
|---|---|---|
| 2015/0015072 A1 | 1/2015 | Deboy et al. |
| 2015/0042159 A1 | 2/2015 | Kim et al. |
| 2015/0069934 A1 | 3/2015 | Gardner et al. |
| 2015/0069936 A1 | 3/2015 | Jang et al. |
| 2015/0146457 A1 | 5/2015 | Stijker |
| 2017/0057368 A1 | 3/2017 | King et al. |
| 2018/0131220 A1 | 5/2018 | Pfeilschifter et al. |
| 2018/0351398 A1 | 12/2018 | Tang et al. |
| 2019/0255960 A1 | 8/2019 | Töns et al. |
| 2020/0055411 A1 | 2/2020 | Pfeilschifter |

FOREIGN PATENT DOCUMENTS

| | | |
|---|---|---|
| CN | 102390272 A | 3/2012 |
| CN | 102457182 A | 5/2012 |
| CN | 102826054 A | 12/2012 |
| CN | 202634360 U | 12/2012 |
| CN | 203032409 U | 7/2013 |
| CN | 203211118 U | 9/2013 |
| CN | 103647465 A | 3/2014 |
| CN | 103647483 A | 3/2014 |
| CN | 203708127 U | 7/2014 |
| CN | 203708154 U | 7/2014 |
| CN | 204290428 U | 4/2015 |
| CN | 106985687 A | 7/2017 |
| DE | 4013506 A1 | 10/1991 |
| DE | 4107391 A1 | 9/1992 |
| DE | 102009052680 A1 | 5/2011 |
| DE | 102011075927 A1 | 11/2012 |
| DE | 102012201617 A1 | 8/2013 |
| DE | 102017203065 A1 | 8/2018 |
| EP | 0593472 B1 | 4/1995 |
| EP | 0834977 A2 | 4/1998 |
| EP | 0950559 A3 | 9/2001 |
| EP | 1657807 A2 | 5/2006 |
| EP | 2406098 B1 | 8/2013 |
| FR | 2720201 A1 | 11/1995 |
| FR | 2738964 A1 | 3/1997 |
| FR | 2998115 A1 | 5/2014 |
| IN | 01381MU2013 A | 4/2015 |
| JP | H06133564 A | 5/1994 |
| JP | H06292304 A | 10/1994 |
| JP | H0787616 A | 3/1995 |
| JP | H08256405 A | 10/1996 |
| JP | 3223842 B2 | 10/2001 |
| JP | 2002176704 A | 6/2002 |
| JP | 3477850 B2 | 12/2003 |
| JP | 2005033954 A | 2/2005 |
| JP | 2014103752 A | 6/2014 |
| JP | 5644070 B2 | 12/2014 |
| JP | 3284571 B2 | 5/2020 |
| MY | 149800 A | 10/2013 |
| WO | 9301650 A1 | 1/1993 |
| WO | 2004009397 A1 | 1/2004 |
| WO | 2010119097 A3 | 12/2010 |
| WO | 2011157922 A1 | 12/2011 |
| WO | 2011159241 A1 | 12/2011 |
| WO | 2012025256 A1 | 3/2012 |
| WO | 2012066045 A2 | 5/2012 |
| WO | 2013029891 A2 | 3/2013 |
| WO | 2013072278 A2 | 5/2013 |
| WO | 2014177803 A2 | 11/2014 |
| WO | 2015024508 A1 | 2/2015 |
| WO | 2016050392 A1 | 4/2016 |
| WO | 2016091426 A1 | 6/2016 |
| WO | 2016183419 A1 | 11/2016 |
| WO | 2017063832 A1 | 4/2017 |
| WO | 2017211656 A1 | 12/2017 |
| WO | 2018109001 A1 | 6/2018 |
| WO | 2019215128 A1 | 11/2019 |
| WO | 2019215157 A1 | 11/2019 |

OTHER PUBLICATIONS

Liu, T. et al., "Integrated battery charger with power factor correction for electric-propulsion systems," IET Electric Power Applications, vol. 9, No. 3, Mar. 9, 2015, 10 pages.
ISA Australian Patent Office, International Search Report Issued in Application No. PCT/AU2016/050852, dated Dec. 5, 2016, WIPO, 3 pages.
European Patent Office, Extended European Search Report Issued in Application No. 16843306.8, dated Dec. 17, 2018, Germany, 13 pages.

* cited by examiner

METHODS AND SYSTEMS FOR AN INTEGRATED CHARGING SYSTEM FOR AN ELECTRIC VEHICLE

CROSS-REFERENCE TO RELATED APPLICATIONS

The present application is a continuation-in-part of U.S. patent application Ser. No. 15/758,694, entitled "CONTROLLER FOR AN INDUCTIVE LOAD HAVING ONE OR MORE INDUCTIVE WINDINGS", and filed on Mar. 8, 2018. U.S. patent application Ser. No. 15/758,694 is a U.S. National Phase of International Application No. PCT/AU2016/050852, entitled "A CONTROLLER FOR AN INDUCTIVE LOAD HAVING ONE OR MORE INDUCTIVE WINDINGS", and filed on Sep. 12, 2016. International Application No. PCT/AU2016/050852 claims priority to Australian Application No. 2015903706, filed on Sep. 11, 2015. The present application is also a continuation-in-part of U.S. patent application Ser. No. 16/612,354, entitled "A VEHICLE CHARGING STATION", and filed on Nov. 8, 2019. U.S. patent application Ser. No. 16/612,354 is a U.S. National Phase of International Application No. PCT/AU2018/000065, entitled "A VEHICLE CHARGING STATION", and filed on May 8, 2018. International Application No. PCT/AU2018/000065 claims priority to Australian Application No. 2017902796, filed on Jul. 17, 2017. International Application No. PCT/AU2018/000065 also claims priority to Australian Application No. 2017901696, filed on May 8, 2017. The present application also claims priority to Australian Patent Application No. 2019902046, filed on Jun. 12, 2019. The entire contents of each of the above-listed applications are hereby incorporated by reference for all purposes.

TECHNICAL FIELD

The present invention relates to a charging system for an electric vehicle.

The invention has been developed primarily for use in plug-in electric vehicles and will be described hereinafter with reference to that application. However, it will be appreciated that the invention is not limited to these particular fields of use and is also applicable to other vehicular uses such as plug-in hybrid electric vehicles whether for private or commercial use. The invention is also applicable to non-vehicle uses such as pumps, compressors, cordless power tools, and many other applications of electric motors or inductive loads in many different industries.

BACKGROUND

Electric vehicles (EVs) have been available for many decades and make use of one or more electric machines to provide locomotive drive for the vehicle. While improvements to EV design and performance have led to increased demand, the combination of the short ranges available between recharging and long charging times remains a major relative disadvantage in comparison with vehicles with internal combustion engines (ICEs). By incorporating more efficient batteries that charge up faster and hold charges for longer, successive generations of EVs have increased ranges and shortened charging times. However, this has led to compatibility issues with respect to charging stations. Successive generations of charging stations have provided faster charging via DC power and increased voltages. As a result, newer EVs built for greater recharging voltages and DC power may not be able to recharge at older charging stations. On the other hand, older EVs with low-power AC recharging circuitry (e.g., designed for plugging into a standard outlet) may not be able to handle the increased voltage and DC power of newer charging stations.

The inventors herein have recognized that the various known arrangements and apparatus for charging electric vehicles may not provide a satisfactory solution to the above mentioned version compatibility problems. Further, compatibility problems are exacerbated by the fact that for conventional DC electric vehicle charging stations, the output is typically tightly regulated by the charging station to provide a requested charging current or voltage profile. The existence of multiple competing communication protocols (some proprietary) for communicating the requested charging profile and battery state information to the external charging station further limits interoperability between vehicles and charging stations. Additionally, to accommodate the different voltage and charging profiles of multiple vehicle types and their respective traction packs, charging stations may include power electronics to regulate a wide variety of charging voltages and currents. In many cases, these power electronics are rated for high power (mostly, in excess of 50 kW) to provide a fast charge to the electric vehicle. However, this significantly increases the size, cooling requirements, and cost of the external charger used in the charging station. The communication standards and electronics within the DC charging station are typically fully integrated with the electrical hardware, fixed at the time of manufacture, and designed to charge vehicles currently available that make use of known technologies such as known battery chemistries. These DC charging stations are therefore not future-proof, and are prone to stifle innovation and development of vehicles in the future while also maintaining backwards compatibility.

One partial solution that has been proposed to this problem is to include in an electric vehicle a power conversion device that is a drive circuit for the electric machine and a charging circuit for the on-board battery. While this solution may address the low-power circuitry problem (e.g., by eliminating the need for separate recharging circuitry), it has not adequately addressed DC charging, and does not gain the benefits of scale, in that different versions of the conversion device would need to be produced for a plurality (and increasing number) of motor types.

BRIEF DESCRIPTION

In an embodiment, the present disclosure provides for a method for a controller for an electric vehicle comprising a first DC energy storage device at a device voltage, a charging interface for interfacing with an external DC source of an external DC voltage, an electric machine including one or more inductive windings, a converter comprising at least two or more drive circuits operating in a first and in a second state, a first DC input and a second DC input to the converter, and a switching mechanism for selectively operating in a first state and in a second state operated by the controller, wherein in the first state the converter is responsive to drawing a drive current from the first DC energy storage device and applying current to at least one of the one or more inductive windings for moving the vehicle, and in the second state, the converter is responsive to drawing a load current from the charging interface and applying an energizing current to at least one of the one or more inductive windings for generating at least one of a regulated charging voltage for the DC energy storage device.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Further, the claimed subject matter is not limited to implementations that solve any disadvantages noted above or in any part of this disclosure.

BRIEF DESCRIPTION OF THE DRAWINGS

Embodiments of the invention will now be described, by way of example, with reference to the accompanying drawings in which.

DETAILED DESCRIPTION

Figure 1:
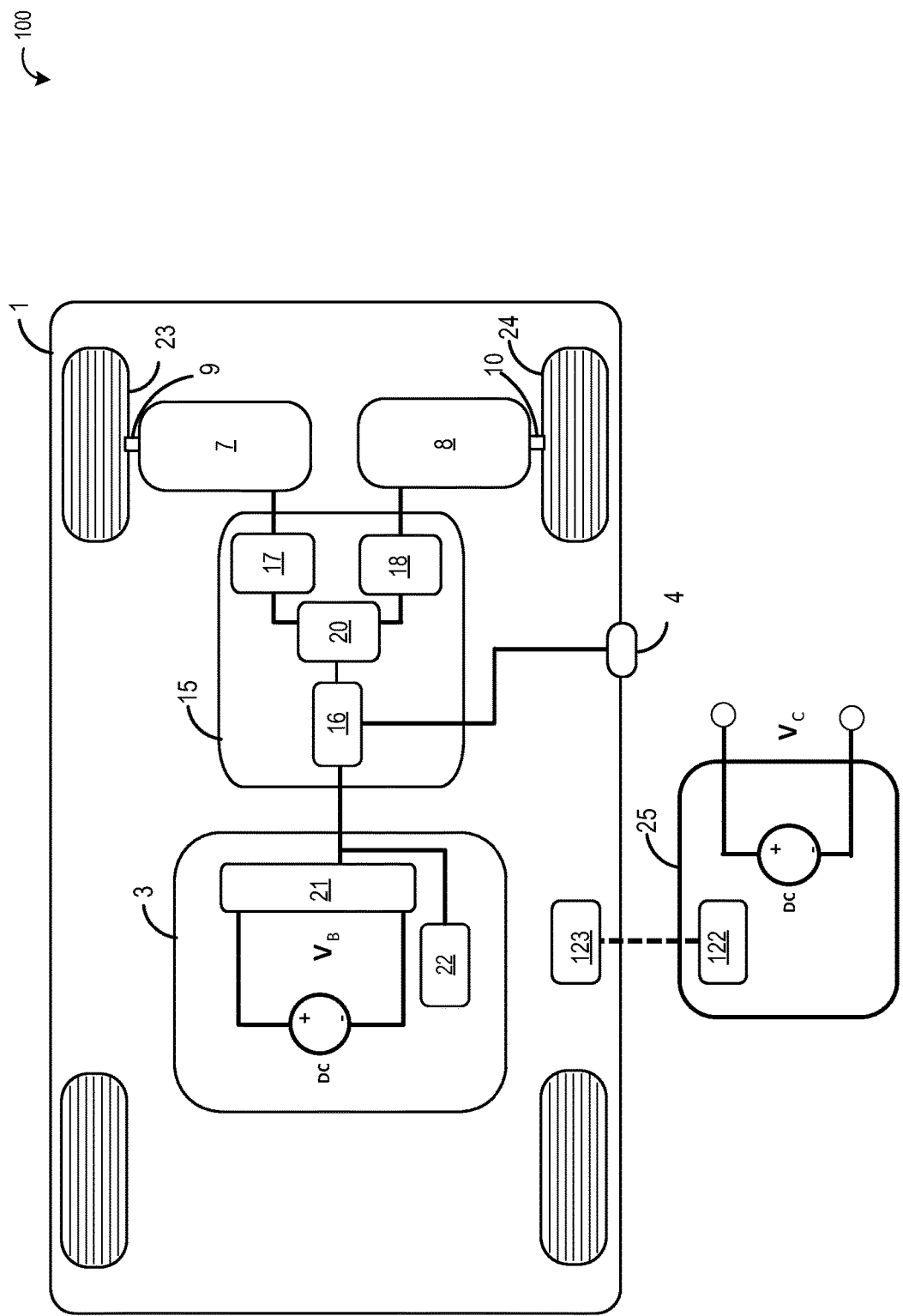
FIG. 1 is a schematic top view of an electric vehicle according to an embodiment of the invention and a charging station.

It is known that consumers favor electric vehicles with longer ranges and faster charge times, and these factors are therefore a significant factor for mass market adoption of these vehicles. Moreover, recent significant reductions in battery costs have enabled a new generation of electric vehicles to emerge with extended ranges, which is achieved due to a significant increase in the available energy storage on board each vehicle. While this may have ameliorated the range concerns of electric vehicles, this extra onboard energy storage takes longer to fully charge. Accordingly, to alleviate the faster charge time requirements, there is a need for a greatly increased power transfer to the onboard storage (e.g., the battery).

In an attempt to address this need for higher power charge rates, vehicle manufacturers have moved to higher voltages to be able to transfer the power required between the infrastructure (e.g., the charging station) and the vehicle. This solution also has the benefit of being much more efficient, as power loss in transmission is exponential to current transfer. Even so, the recent increase in voltage for Generation 3 vehicles (referred to as "Gen3 vehicles") is beyond the 500 Volt maximum limit of previously installed DC infrastructure.

Therefore, to avoid having to update the existing infrastructure to accommodate both the original voltages for the earlier generation cars and the greater voltages for the later generation cars, at anticipated great expense, all Gen3 vehicles and above will demand an onboard means for charging from infrastructure that has been installed for charging Gen1 or Gen2 vehicles. For a later generation vehicle to work with an earlier generation station will also demand that the onboard controller accommodate different relative voltage levels between the vehicle and the charging station.

As disclosed herein, this may be achieved by providing an integrated, onboard charging system that can be used to charge from a DC source, including unregulated chargers (e.g., DC micro-grid, renewables, HVDC etc.) The charging system may include a switching mechanism comprising one or more switches to switch between the driving and charging modes. In one embodiment, for example, this creates a DC-DC boost converter (e.g., in the charging mode) to boost a sub-500 Volt supply from the charging station to the greater than 500 Volt supply (e.g., 800 V) needed to charge the battery on board the electric vehicle. Various embodiments of an integrated charging system for an EV are presented below, including an onboard battery charger and a controller for an inductive load in the form of an electric motor which may have inductive winding which are able to address this issue without the need for complicated, redundant and expensive infrastructure. Unlike many prior-art configurations, the embodiments presented herein may be based on inductive windings in either a wye or delta configuration, whereby increased charging efficiency may be achieved during charging through high inductance without producing zero sequence currents. The onboard charger may be designed for the exact requirements (for example, voltage and current capability) of the electric vehicle to which it is fitted, and for the same future era as the vehicle, making it effectively future-proof.

The integrated charge controller disclosed herein may be able to regulate high power transfers whilst accommodating different relative levels of $V_B$ (or the related first voltage) and $V_C$ (or the related second voltage), or similar levels of the first and second voltages. More particularly, the present disclosure is able to accommodate changes in the relative voltage levels in real time through implementing boost, buck, or buck-boost functions with one or multiple integrated charge controllers, whilst controlling any part of the charging current delivered from the voltage source to the voltage load. The charging current can be controlled to regulate the output current, regulate the input current, or the phase current, whilst protecting the maximum voltage and current thresholds of the components. In this way, the controller (or controllers) is able to regulate the charging current from a regulated or unregulated DC source. The term "unregulated DC source" is reference to a DC source that does not provide the principal means of current or voltage control. This term includes semi-regulated voltage or current outputs. In the embodiments disclosed herein, a charging station need not regulate the current or voltage of the output, as that may be performed by integrated controller embodiments of the invention on board the electric vehicle. An advantage of this is that the ability to make use of such an unregulated charging station enables significant reduction in cost and size relative to a regulated external DC charging station.

The charging station may or may not be a dedicated electric vehicle charging station, and the interface may be defined by a standard or non-standard plug, rail, automated connection, wireless transducer, paddle, pantograph, or a network of overhead wires or the like. Similarly, the electric vehicle may include a receptacle, plug, paddle, wireless transducer, rails, pantograph or other structure(s) or the like for supporting a complimentary interface which can be selectively connected to the charging station interface. Via the methods and systems proposed herein, the electric vehicle may be able to make use of existing infrastructure without modification to the external infrastructure. For example, an electric vehicle may be configured to interact with supply infrastructure used by a train, tram, trolley bus, etc. Further, the onboard energy storage of the electric vehicle may enable the vehicle to become untethered from such infrastructure for periods of time, enabling a more versatile system than is presently able to be enjoyed by trains, trams, or trolley buses that traditionally operate in continuous electrical connection with such infrastructure. This enables high power opportunity charging of an electric vehicle, such as at a bus stop or traffic light, to occur with minimal cost to the vehicle or infrastructure. Existing opportunity charge solutions for battery electric vehicles (BEVs) require a high-power AC-DC or DC-DC converter to exist within the charging station to provide a regulated DC charging current to the vehicle, adding cost to infrastructure. As detailed herein, embodiments of the invention are operable to regulate this externally received power whilst the vehicle is stopped, or whilst moving. In some applications, the electric vehicle is also able to operate in a first state (e.g., propulsion mode) while drawing power from the charging interface, such as for manipulating rotor position, or providing locomotion power from the external source.

Reference throughout this specification to "one embodiment", "some embodiments" "an embodiment", "an arrangement", "one arrangement" means that a particular feature, structure or characteristic described in connection with the embodiment or arrangement is included in at least one embodiment or arrangement of the present invention. Thus, appearances of the phrases "in one embodiment", "in some embodiments", "in an embodiment", "in one arrangement", or "in and arrangement" in various places throughout this specification are not necessarily all referring to the same embodiment or arrangement, but may. Further, the particular features, structures or characteristics may be combined in any suitable manner, as would be apparent to one of ordinary skill in the art from this disclosure, in one or more embodiments or arrangements.

As used herein, and unless otherwise specified, the use of the ordinal adjectives "first", "second", "third", etc., to describe a common object, merely indicate that different instances of objects in a given class of objects are being referred to, and are not intended to imply by their mere use that the objects so described must be in a given sequence, either temporally, spatially, in ranking, in importance or in any other manner.

Unless defined otherwise, all technical and scientific terms used herein have the same meaning as commonly understood by those of ordinary skill in the art to which the invention belongs.

The articles "a" and "an" are used herein to refer to one or to more than one (that is, to at least one) of the grammatical object of the article unless the context demands otherwise. By way of example, "an element" normally refers to one element or more than one element.

The term "electric machine" is used in a broad sense to include electric motors, generators and other electromechanical devices that convert electrical energy into mechanical energy, or vice versa, or both. For convenience, and unless is otherwise clear from the context, the terms "electric motor" or "motor" are used as an equivalent for, and interchangeably with, the terms "electric machine" or "machine".

Reference in this specification to the term "vehicle" includes a reference to both land-based vehicles and other vehicles such as aircraft and watercraft. Typical examples of land-based vehicles include plug-in electric vehicles and plug-in hybrid electric vehicles. These electric vehicles and hybrid electric vehicles are not limited to cars, and include also trucks, buses, forklifts, scooters, electric bicycles, motorcycles and other personal transportation devices, buggies (such as golf carts and the like), mining equipment, agricultural equipment, recreational vehicles, and others.

Referring now to FIG. 1, an example electric car charging system 100 shows a vehicle, in the form of an electric passenger car 1, and an external energy source, in the form of a charging station 25. The car 1 includes a DC energy source, in the form of a battery pack 3, mounted to the body of the car 1 for operating at a source DC voltage $V_B$. The battery pack 3 may include a power distribution unit (PDU) 21, which may include internal protection devices and power distribution such as fuses, contactors, switches, sensor feedback, pre-charge circuits, a filter, and the like. In particular, PDU 21 may include discrete circuits to selectively allow or disallow battery pack 3 to connect and thus transfer voltage, current, or energy with the different listed components of car 1 individually. The battery pack 3 may also include a battery management system (BMS) 22.

A charging port 4 is mounted to the body of the car 1 for connecting selectively with an external energy source, which in this embodiment is the charging station 25 which operates at an external voltage $V_C$ and is able to act in different modes to output either a regulated or unregulated DC voltage. In modes where the charging station 25 outputs a regulated DC voltage, the charging station 25 is responsible for supplying to the car 1 either a regulated charging current or a regulated charging voltage to be directly applied to the battery pack 3, or to be voltage translated or further regulated on board by the car 1. In modes where the charging station 25 outputs an unregulated DC voltage, the car 1 draws current from the charging station 25 and regulate a DC charging current and/or voltage on board. In this embodiment, the unregulated DC voltage supplied by the charging station 25 is related to the floating voltage of an integrated DC storage device (not shown).

Two electric machines, shown in FIG. 1 as three phase induction machines 7 and 8, respectively, are mounted to the body of the car 1 for providing locomotive energy to the car 1 by selectively rotating respective shafts 9 and 10 that are directly connected with respective rear wheels 23 and 24 of the car 1. The car 1 also includes a controller 15 for interlinking battery pack 3, machines 7 and 8 and the charging station 25 via port 4. Controller 15 includes for machines 7 and 8 separate respective controllers 17 and 18, and a control module 20, which coordinates controllers 17 and 18 to act in combination to drive wheels 23 and 24. This includes having wheels 23 and 24 being driven to rotate at substantially the same angular velocity and in the same direction, at different angular velocities, or even in different directions, depending upon the detected drive conditions and nature of the relevant drive. It will be appreciated that controllers 17 and 18 each include an array of modules and/or drive circuits, where each may represent different converter structures such as at least one of a half bridge, rectifier, inverter, diode bridge, full bridge, asymmetric bridge, three-level converter, multi-level converter, and the like. Therefore, each of controllers 17 and 18, and thus controller 15, may constitute one or more converter structures, and may be able to be operated in different modes as presented herein. Additionally, BMS 22 may communicate with controller 15 in order to transmit values such as state-of-charge, state-of-health, maximum permissible charge and discharge currents, maximum and minimum voltages, instantaneous voltage and current values, individual cell data and voltages, temperature, etc., for the management of controllers 17 and 18 and module 20.

In some embodiments, the external energy source may not be a charging station, and may be used for propulsion of car 1, either in a tethered or untethered application. Tethered applications may include, for example, cases in which car 1 is a tram or trolleybus where current is supplied to car 1 via overhead wires. Untethered applications may include, for example, the use of a portable power supply on board car 1 for operating car 1. When the external source is used for propulsion of car 1, one or more of the poles of the battery pack 3 may be electrically disconnected from the drive circuits of controller 17 during operation in the first state, such as to prevent unabated power transfer between battery pack 3 and the external energy source. In some embodiments with more than one controller, one controller can act in DCDC mode, while the controller other acts in propulsion mode. For example, while controller 17 acts in the first state (e.g., propulsion mode), a charging current may be regulated to the battery pack 3 via other means, such as a switch acting in pulse-width modulation (PWM) mode (not depicted in FIG. 1), or a further motor and controller (e.g., controller 18) or machine winding set acting in the second state (e.g., charging mode). In further embodiments where battery pack 3 is a lower voltage than that applied by the external energy source, battery pack 3 may be connected such that it may supply or receive power (such as through the use of a diode) when operating in the first state and connected to the external energy source. In some embodiments, one or more controllers (such as controller 17 and/or controller 18) are able to swap between the first and second state, or act simultaneously in the first and second state, depending on the relevant operation, whilst remaining electrically coupled with the external energy source. This means, in some embodiments, controller 17 and/or controller 18 are able to provide propulsion to the car 1 and charge battery pack 3 simultaneously using power from the external energy source. In some embodiments, an isolation DC-DC converter is used as part of an input circuit for controller 17 and/or controller 18 to ensure touch safe operation of the vehicle while tethered to a power source, especially where the external power source is not isolated from ground.

A switching mechanism 16 is included in controller 15 for switching between a first state (e.g., a propulsion mode in which power a charge from the battery pack 3 is used to power the car 1) and a second state (e.g., a charging state in which the battery pack 3 receives a charge from the charging station 25). The switching mechanism 16 may selectively connect the charging station 25 to controller 15 for onboard charging regulation, or connect the charging station 25 directly to the battery pack 3 via a bypass to charge the battery pack 3. This allows the resultant controller to be fully compatible prospectively or retrospectively with a larger range of charging methodologies and hardware. In some embodiments, the bypass may be through controller 15 itself, while in other embodiments the bypass may be a dedicated system. An embodiment of a switching mechanism with its associated switches and bypass circuit is discussed in further detail below in reference to FIG. 2. The selective connection to the controller may be via a dedicated connection, or via repurposing existing aspects of controller (for example, by directing current through one or more of the existing bus bars, drive circuit switches, or associated diodes).

When charging in DC to DC mode (e.g., second state), the controllers do not provide galvanic isolation and therefore the battery is not galvanically isolated from the external source. Therefore, as safety features, in some embodiments the car 1 may include an insulation monitoring device to monitor the isolation barrier between the low voltage circuit or chassis, and the high voltage circuit of battery pack 3. In the event of a detected breach of isolation between the low voltage (LV) circuit or chassis, and the high voltage (HV) circuit, controller 17 enters a safety state. In most embodiments, port 4 includes a ground or earthing pin which is tied to the chassis. In one such embodiment, charging station 25 includes a ground leakage detection circuit which detects if there is a ground leakage above a predetermined threshold and, if so, isolates the vehicle from the power source of the charging station 25. In some embodiments, ground leakage or insulation monitoring information is communicated between the car 1 and the charging station 25 as part of first charging data or second charging data, which is described further below. In further embodiments, the car 1 includes a ground fault detection circuit which isolates the vehicle from the charging station 25 in the event of direct currents, or non-sinusoidal currents which could otherwise affect the operation of a residual current device (RCD). This function is known as ground fault interrupt (GFI) in North America. In other embodiments, the charging station 25 includes an RCD or RCMU capable of detecting and isolating DC voltages, greater than 20 kHz AC, and non-sinusoidal ground fault currents. Care is taken to maintain a strict isolation barrier, as well as limit any capacitive coupling, between the HV circuit and the chassis. This isolation barrier may include the use of reinforced isolation.

Machines 7 and 8 may also include other motor types (e.g., SR, IM, PMSM, BLDC, etc.), or machines 7 and 8 may include other phases (e.g. 2, 3, 6, 9, etc. phase motors). Machines 7 and 8 may use different winding types (e.g., star, delta, configurable, etc.) Further, controller 17 may drive multiple motors or motors with multiple windings, and may include other converter types (e.g., 3-level, dual two level, asymmetric, H bridge, etc.). It will be appreciated that in some of the embodiments, machines 7 and 8 each have three inductive windings (e.g., as disclosed herein in FIGS. 2-6), while in other embodiments the machines may each have any number of inductive windings. Different electric machine types, and/or machines with different number of phases, and/or machine winding configurations, are used for the motoring and charging process. In embodiments with more than one phase, where each phase is controlled by a drive circuit, multiple current paths exist by allowing or disallowing current through the individual phases. This method of operation alters the inductance and resistance path of the current, for instance, by placing some of the phases in series or parallel. In this way, the characteristics of the charging cycle are able to be manipulated to alter or improve the charging efficiency, noise, harmonic distortion, power factor, or the like. In some embodiments, increasing the number of phases in the electric machine increases the versatility of characteristics in the second mode of operation. In further embodiments, multiple independent connections of phase windings are present within the same machine. An example of such a machine includes two independent sets of 3-phase star or delta connected windings within the stator of a machine to form machine with six driveable phases, as illustrated by FIGS. 8-14. In still further embodiments, other machine types and winding configurations are utilized to achieve variable charging and motoring characteristics. Implementations with other number of machines and/or with other numbers of inductive windings are described in more detail below in reference to FIG. 8.

The car 1 may include a module for communicating, or a circuit to sense or determine one or more characteristics and/or capabilities of the external energy source (e.g., the charging station 25). In this embodiment, the car 1 includes a communication module 123, and the charging station 25 includes a corresponding communication module 122, in order for the car 1 and the charging station 25 exchange communication data. One main purpose of controller 17 and communication module 123 is to determine what type of DC to DC regulation to apply. In some embodiments, the communication module 123 or corresponding module 122 may comprise or utilize a pilot signal, proximity sensor, voltage sensor or applied terminal voltage, High Voltage Interlock Loop (HVIL), or resistor value, where communication data determines whether a plug is connected. In other embodiments, communication data may include, for example, instantaneous voltage, voltage limits, or voltage type (for example, regulated DC, unregulated DC, or single or 3-phase AC), current limits, regulation potential of the charging station (e.g., through communication, or lack thereof), charging power, etc. One or more of these values can be communicated via simple methods such as an applied voltage level, different resistor values, HVIL, pilot PWM and the like, and/or all the way to full communication implemented in serial, parallel differential, or powerline line communications, or any other communication method as implemented in present or future EV charging standards such as CCS, CHAdeMO, GB/T and the like. Such communication data can be wirelessly transmitted, or conductively transmitted through port 4 terminals, either through the powered terminals or further terminals specifically designed for communicating data. In some embodiments, controller 17 is unable to electrically connect with the external charging station 25 (e.g. interlocked) until a first charging data is received. Such an interlock may be achieved via hardware (e.g. as part of the charging HVIL, or a further interlocking circuit), or via software. In some embodiments, the hardware or software mechanism or trigger which disables the interlock (and therefore allows a connection between the charging station 25 and the controller 17) is, or forms part-of, the charging data. In some embodiments the method by which the controller 17 is prevented from electrically connecting to charging station 25 is implemented by switching mechanisms 16. In some embodiments the interlocked switching mechanisms of 16 or otherwise are controlled directly or indirectly by the external charging station 16, and whereby the control of which constitutes a charging data. The communication of charging data is discussed in further detail below in reference to FIG. 2.

The charging station 25 may include, source, or derive power from other infrastructure. For example, as mentioned above, a DC source may be provided to power a tram or train. In some embodiments, the charging station 25 may be powered by one or more renewable resources, or the charging station 25 may represent a DC micro-grid. Further, the car 1 may allow a third AC input from the charging station 25 (e.g., as part of a combo plug), where both AC and DC power are accepted at the same input port 4, with a further dedicated input circuit including an active rectifier, which may be combined with another integrated motor controller charger. The third AC input may also allow wireless and/or bidirectional charging and power factor correction (PFC). An embodiment with a third AC input is described in more detail below with respect to FIG. 13.

In the FIG. 1 embodiment, the DC source voltage $V_B$ is 800 Volts DC and the external voltage Vc is 400 Volts DC. However, in other embodiments use is made of different voltages, or varying DC voltages. It should be appreciated that many different voltages are presently in use for electric vehicles, ranging typically from about 48 Volts to many hundreds of Volts. Moreover, while use is made in the embodiment of three phase induction motors, in other embodiments, different electric machines or motors are used. Moreover, in other embodiments, controller 17 (and/or/in conjunction with the controller 15 or 18 of car 1 of FIG. 1) may be configured accordingly to allow the relevant functionality to be provided with that form of electric machine.

It should be appreciated that while the present disclosure makes reference to a controller for a vehicle such as the car 1, other embodiments are applicable to other vehicles with one or more electric machines that are open to the system of control that is described herein. Such vehicles include trucks, vans, buses, ATVs, OHVs, motorcycles (and other two or three wheeled conveyances), autonomous vehicles, and the like. Similarly, other vehicles are embodied as watercraft or aircraft, where the latter includes manned and unmanned aircraft (such as drones). It should be further appreciated that the embodiments disclosed herein are applicable not only to vehicles, but to any application that has both of one or more coupled energy storage devices, and an inductive load (e.g., an electric motor) that is able to be connected to two or more power sources/sinks. The one or more coupled energy storage devices typically generates electricity (electrical current) from the stored energy and is able to include one or a combination of: one or a bank of batteries; one or a bank of capacitors; one or a bank of ultra-capacitors; one or more fuel cells; one or more kinetic energy recovery systems; and so forth.

For example, the inductive load may be one or more heating elements, where module 20 is responsive to various inputs for providing energy efficient heating operation. This may include the selective draw of current from the electrical grid and one or more attached energy storage devices for maintaining heating requirements and/or charging the one or more other attached energy storage devices. In other embodiments, motor 7 is part of a cordless appliance such as a cordless vacuum cleaner or power tool, including one or more motors, electronics, and integrated rechargeable batteries, and module 20 is the control system responsible for the operation of the appliance or tool during the intended use of the appliance or tool, and for the charging cycle of the appliance or tool whilst not in use and connected to a suitable power source.

In still further embodiments, motor 7 is a pump motor and module 20 is a control system to control the power management between an array of solar PV panels, an attached battery, and motor 7. When the PV array is generating power (that is, when sufficient sunlight falls upon the array) and motor 7 is operating, module 20 provides control signals such that the power generated by the PV array is used to directly drive the motor, with the battery pack 3 providing shortfalls based upon the current being drawn by motor 7. If motor 7 is not operating when power is supplied by the PV array, module 20 provides control signals to direct any DC current from the array, which is boosted or reduced in voltage (via the cooperation between windings 19a, 19b, and 19c and circuits 31 and 32), to define current 50, at the relevant DC voltage, to increase the SoC of the battery pack 3. During this charging of the battery pack 3 using controller 17, module 20 is able to regulate the charge current 54 and enable maximum power point tracking (MPPT). As the PV array is not a rechargeable source, it will typically have either a protection diode or a switch controlled by module 20, to prevent a flow of current into the PV array.

Thus, in this embodiment controller 15 is able to regulate a DC charging current and/or voltage to charge its onboard the battery pack 3 from the charging station 25, whereby the power electronics of the drive circuits and inductance of the relevant machine(s) are used when regulating the charging current onboard. The controller 15 is able to control onboard regulation/charging from an external unregulated DC source, onboard voltage conversion from a regulated DC source, or no regulation/conversion, via a bypass. In some embodiments where controllers 17 and/or 18 are bidirectional, the car 1 can also push energy back to the charging station 25 and operate in vehicle-to-everything (V2X) mode, as explained in further detail below.

As mentioned above, the ability to charge an electric vehicle from a wide variety of DC sources may be facilitated by providing electric vehicles with an onboard charger capable of handling voltage mismatches in either direction, whereby the voltage of a charging station may be selectively reduced or stepped-down to match the vehicle configuration (referred to herein as "buck" conversion) or increased or stepped-up to match the vehicle configuration (referred to herein as "boost" conversion). For example, an onboard charger configured to support buck conversion may allow Gen1 electric car designed for a 120V power supply (e.g., to be plugged into a conventional electrical outlet) to be charged at a Gen3 DC to DC charging station with a 400V power supply, by reducing (e.g., bucking) the voltage from 400V to 120V on board the vehicle. Alternatively, an onboard charger configured to support boost conversion may allow Gen3 electric car designed for a 800V power supply to be charged by plugging it into a 400V outlet, by increasing (e.g., boosting) the voltage from 400V to 800V on board the vehicle. As disclosed herein, embodiments with various drive controller circuit configurations and switching mechanisms (each of which may include a plurality of switches) provide for boost, buck, boost-buck, and/or buck-boost conversion that selectively increases or decreases voltage during charging under various conditions.

Figure 2A:
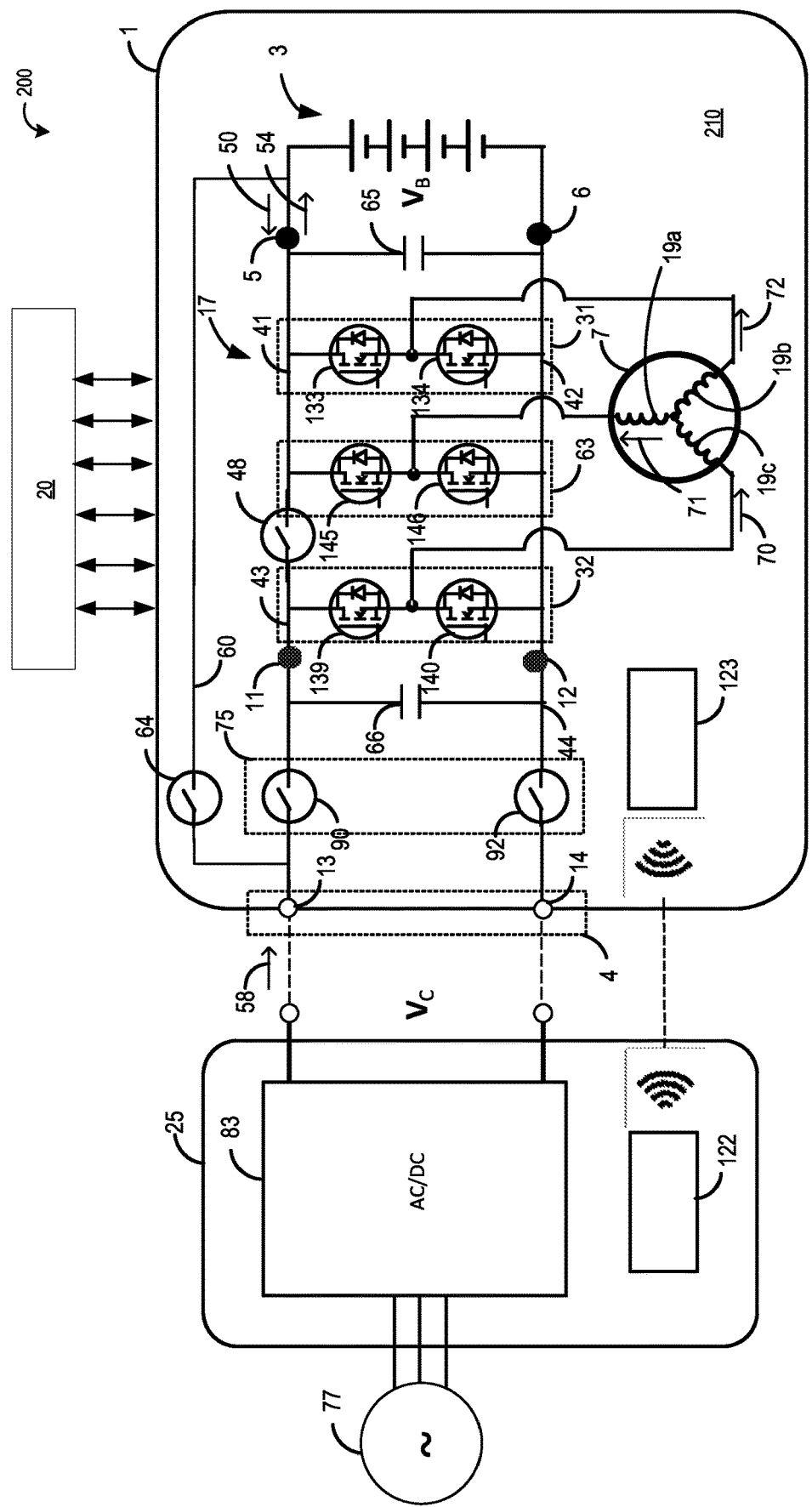
FIG. 2A is a schematic representation of an embodiment of a drive controller for an electric vehicle having an electric machine with multiple winding sets configured to receive DC power from an external charging station.

Referring now to FIG. 2A, an electric vehicle charging system 200 is shown, which may the same as or similar to the charging system 100 of FIG. 1. A car 1 and a charging station 25 are depicted (e.g., the car 1 and charging station 25 of charging system 100 of FIG. 1), where the car 1 includes a controller 17 for an inductive load in the form of a three phase motor 7, with three windings 19a, 19b and 19c, configured as buck-boost converter 210. The controller 17 may be the same as or similar to controller 17 of FIG. 1, and motor 7 may be the same as or similar to machine 7 of FIG. 1. In this embodiment, the three windings 19a, 19b, and 19c are in a wye or star configuration. In other embodiments a delta configuration may be used. All of the embodiments of the invention are able to operate in a first state (e.g., propulsion), and a second state (e.g., charging) for regulating either a DC voltage or current between a first DC source and a second DC source using the same drive circuits and inductive load as used in the first state.

Power is received at the charging station 25 from a grid 77, whereby AC power is converted to DC power via a AC/DC converter 83, and transmitted to the car 1 via port 4 during charging as current 58. Port 4 may include a positive import terminal 13 and a negative import terminal 14. In other embodiments, port 4 may include further terminals (not depicted in FIG. 2A) for powered or protective earthing, neutral or grounding, pilot signals or other dedicated communication lines, high voltage interlock loop circuits, and/or other terminals.

The controller 17 includes a first input defined by terminals 5 and 6 for drawing a DC load current 50 in a first period (e.g., during propulsion mode) from a first energy source in the form of a battery pack 3. The battery pack 3 may be the same as or similar to the battery pack 3 of FIG. 1. A first DC charging current 54 is supplied to the battery pack 3 during a second period, wherein a second input defined by terminals 11 and 12 draws a second DC charging current 58 during the second period from a second energy source in the form of an external charging station. The load current 50 and the charging current 54 are directed during the first state and the second state by a control module 20 (e.g., the control module 20 of FIG. 1).

It should be appreciated that while the controller 17, battery pack 3, motor 7, and/or other components of the car 1 depicted in FIG. 2 (and other figures included herein) may be the same as or similar to the components of FIG. 1 with the same names, the figures referred to herein represent embodiments included for illustrative purposes, and may vary without departing from the scope of this disclosure. Similarly, other embodiments may include less, additional, and/or different components without departing from the scope of this disclosure.

In buck-boost converter 210, the controller 17 includes three drive circuits: circuit 31, circuit 32, and circuit 63. Drive circuits 31 and 63 include a common positive DC power rail 41 from which DC current is selectively drawn by the respective drive circuits to energise at least one of the one or more windings 19a, 19b and 19c, and circuit 32 includes a positive power rail 43. Circuits 31, 63, and 32 all share common negative power rails 42 and 44. Drive circuits 31, 63, and 32 each include a set of switches, which in this embodiment are exemplified by two metal-oxide-semiconductor field-effect transistors (MOSFETs), each with a freewheeling diode (FWD). Drive circuit 31 includes MOSFETs 133 and 134; drive circuit 63 includes MOSFETs 145 and 146; and drive circuit 32 includes MOSFETs 139 and 140. The MOSFETs 133, 134, 145, 146, 139, and 140 operate in response to the relevant control signals generated by module 20. In other embodiments, the drive circuits 31, 63, and 32 include other configurations of sets of switches, including one or more switches of one or more types. These switches are able to be unidirectional, bidirectional, or multidirectional, and implemented by electrical, mechanical, or electromechanical devices including, but not limited to, transistors, MOSFETs, HEMTs, HFETs, MODFETs, IGBTs, Sic, GaN, Darlington pairs, diodes, photodiodes, thyristors, contactors, relays, or other such existing or future devices. The configuration of the set of switches is able to include, but are not limited to, half-bridge, full-bridge, H bridge, asymmetrical bridge, or one or more switches in any configuration of series and/or parallel.

Figure 2C:
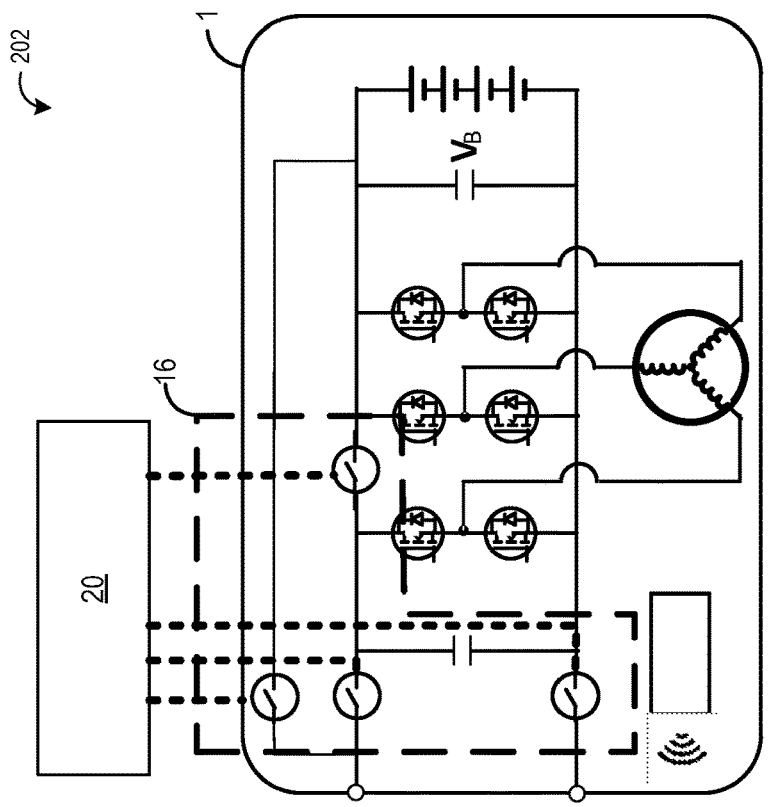
FIG. 2C is a schematic diagram that illustrates a switching mechanism in the drive controller of FIG. 2.
Figure 2B:
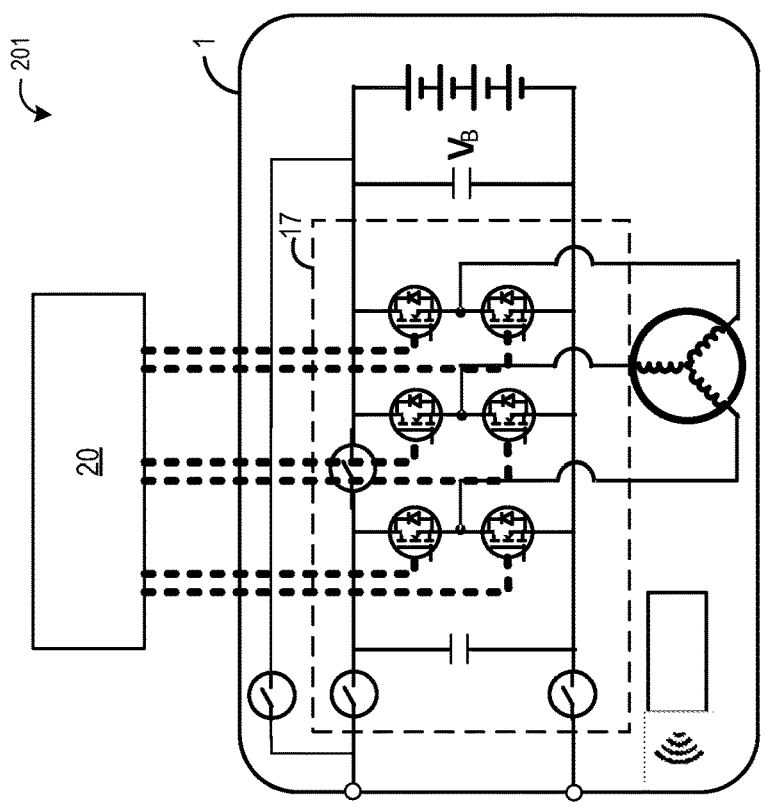
FIG. 2B is a schematic diagram that illustrates control lines between a control module and the drive controller of FIG. 2.

FIG. 2B shows a simplified schematic 201 of electric vehicle charging system 200 that illustrates the interaction between module 20 of FIG. 2A and the MOSFETs 133, 134, 145, 146, 139, and 140 of the controller 17.

Returning to FIG. 2A, each of the drive circuits 31, 32, and 63 may operate in a first state during the first period (e.g., during propulsion mode) and a second state during the second period (e.g., during charging mode). In the first state, responsive to control signals from the module 20, circuits 31, 32, and 63 may be connected to the battery pack 3 to receive load current 50 to selectively energize windings 19a, 19b, and 19c to create torque in motor 7 (e.g., for propulsion). In the second state (e.g., for charging), circuit 32 may be disconnected (at least in part) from the battery pack 3, and circuits 31, 32, and 63 may be responsive to the control signals such that, in wye configured loads as illustrated in FIG. 2A, circuit 32 is able to connect with the charging station 25 through input circuit 75 and be responsive to current 58 for selectively directing an energizing current 70 through winding 19c via operating switch 139. In operational modes where $V_C > V_B$, the current 70 flowing through 19c is split between phases 19a and 19b at the star point into charging currents 71 and 72, respectively, which flow through the freewheeling diodes of switches 145 and 133 respectively. In operational modes where $V_C < V_B$, circuits 31 and 63 can selectively draw any proportion of currents 71 and 72 through phases 19a and 19b, respectively, by operating the switches 146 and 134, respectively, via PWM, and the charging current again flows through the freewheeling diodes of switches 145 and 133 respectively. Thus, when charging battery pack 3 from charging station 25, circuit 32 (in particular switch 139) acts as a buck switch, and circuits 31 and 63 (in particular 134 and 146 respectively) act as boost switches.

It should be appreciated by someone skilled in the art that a poly-phase magnetically coupled inductive load (as typically embodied by a traction motor for an electric vehicle) is not typically designed to accommodate zero sequence currents in usual operation of the first state. In typical balanced wye/star windings, zero sequence currents may reduce the potential inductance (zero sequence inductance) of the charging sequence, which negatively impacts performance when operating in charging mode. One advantage of the embodiments disclosed herein is that they may operate with either star or delta windings without imposing zero sequence currents, thus achieving a high inductance and increased energy efficiency during charging. Thus, current sensors may be positioned on at least two of the three phases, and since no zero sequence currents (e.g., currents entering/exiting the star point) are imposed, if a first current and a second current of currents 70, 71, and 72 are known, the third current (and thus the average of current 54) can be accurately estimated. In some embodiments, current and/or voltage sensors are employed on the DC link (e.g., voltage sensors across terminal 5 and 6, 11 and 12, and/or 13 and 14, or current sensors on any one or more of the terminals) so as to accurately determine the instantaneous charging current and/or voltage. If both current and voltage sensors are applied to a terminal (or average voltage or current of the terminal is estimated through calculation), instantaneous power transfer can be determined through that terminal, and may be compared against power through corresponding terminals to determine conversion efficiency. Furthermore, it will be appreciated that the energizing current applied to inductive windings in the second state is DC, and the voltages presented to the first and second inputs are DC.

In some operational modes, circuit 31 and 63 may switched together, inversely, interleaved, or in any other pattern to selectively determine the path of the current. For example, in some operational modes when performing a boost function from the charging station 25 to the battery pack 3 with buck switch 139 on, module 20 may choose to operate boost switches 134 and 146 simultaneously such that current 70 is split between into currents 71 and 72 through 19a and 19b, respectively, thereby reducing the loading on each of circuit 31 and 63 than if either was individually used. Alternatively, in another example mode of operation, module 20 may operate the switches in an interleaved switching pattern with equal dead time in between such that the current 70 is diverted through either into current 71 through 19a or into current 72 through 19c, and as the effective switching frequency is increased, therefore the magnitude of ripple current through capacitor 65 can be decreased. Thus, selectively using one or both circuits 31 and 63 in varying combinational manners may improve aspects of the charging profile.

It should be appreciated that although the above operation of module 20 is described with reference to charging the battery pack 3 when operating in the second state. In other embodiments there are additional or alternative options available during the second state as will be described in the embodiments below. All these options arise from module 20 providing the controller 17 with the capability of translating energy between at least two DC voltages.

In order to switch between the first state and the second state described above, the car 1 may include a switching mechanism 16, which may be the same as or similar to the switching mechanism 16 of FIG. 1. Referring briefly to FIG. 2C, a simplified schematic 202 of electric vehicle charging system 200 is shown illustrating switching mechanism 16, depicted as a plurality of switches which may act in combination responsive to control signals from the control module 20 of FIG. 2A. As described above, the switching mechanism 16 may selectively connect the charging station 25 to controller 17 for onboard charging regulation, to allow the resultant controller to be fully compatible prospectively or retrospectively with a larger range of charging methodologies and hardware. The individual switches included in switching mechanism 16 are described below in reference to the more comprehensive FIG. 2A.

The switching mechanism 16 may include an input circuit 75, which forms part of the charging initiation process, and which may include disconnect power switches 90 and 92 for safety. For example, when charging data is received by communication module 123 in the car 1 from communication module 122 in the charging station 25, control module 20 may be able to operate controller 17 during a charging mode to pre-charge the bulk capacitance of controller 17 before closing the disconnect switches 90 and/or 92 of input circuit 75 to prevent an inrush current. Input circuit 75 may also include, at least in some embodiments, other safety mechanisms such as isolation monitoring and fusing.

The switching mechanism 16 may also include a switch 48 for selectively connecting and disconnecting power rails 41 and 43 to and from each other, responsive to control signals from module 20. Switch 48 is implemented in this embodiment as a bidirectional switching device in the form of a single throw single pole switch with two IGBTs in series having common emitters with free-wheeling body diodes. In other embodiments, another form of unidirectional or multidirectional switch may be used, such as back-to-back MOSFETs, relays, contactors, mechanical switches, or other such devices. As depicted herein, when switch 48 is in an open state (as shown), power rail 43 is disconnected or isolated from power rail 41. Although power rail 44 is still physically connected to power rail 42, drive circuit 32 is functionally disconnected from circuit 31 to allow those circuits to perform different functions. This functional disconnection is able to be established by having the break between either of the like power rails in the two drive circuits. Thus, in a closed or connected state, switch 48 allows power rails 41 and 43 to draw energy from battery pack 3 (for motoring and regeneration) and, in an open or disconnected state, switch 48 isolates power rail 41 from power rail 43 to allow power rail 41 to operate at a first DC voltage that is related to $V_B$ and power rails 43 to operate at a second DC voltage that is related to $V_C$.

The switching mechanism 16 may also include an optional bypass switch 64 on an optional dedicated bypass circuit 60, in order to operate the controller such that motor inductance or drive circuits of controller 17 are not used. This is functionally equivalent to the operation of switching mechanism 16 closing switch 90 and switch 48, however, dedicated bypass circuit 60 is illustrated for the sake of practical example. For example, in some embodiments, the controller may allow an external DC source (such as an external DC charger) to bypass controller 17 to allow direct charging of the batteries. In some embodiments bypass circuit 60 connects directly into PDU 21 of battery pack 3 and switching mechanism 16 employs appropriate switches such that controller 17 is not energised when bypass 60 is used. In some embodiments, a further corresponding bypass switch (not depicted in FIG. 2A) to bypass switch 64 is employed to connect the negative DC terminal 14 of port 4 to the negative DC terminal of battery pack 3 along a corresponding dedicated bypass route (not depicted in FIG. 2A) to bypass route 60. This corresponding bypass switch helps bypass both the positive and negative DC bus impedance of controller 17, and therefore may enable a higher charging current than for which the DC bus, fusing, and protection circuits of controller 17 are rated. In the illustrated drawing of ideal components, such a switch is electrically equivalent to switch 92 and therefore has been omitted, but may be implied when discussing the dedicated bypass route 60 and/or bypass switch 64.

In another embodiment, dedicated bypass route 60 and switch 64 are not employed, and controller 20 may use the switching mechanism 16 to direct current through controller 17 in a passive state (that is, not actively switching or regulating current or voltage) to perform the bypass feature. This may include closing switch 48 such that the first and second inputs are bridged, allowing a charging current to pass without passing through the drive circuits or machine inductance. A benefit of this is that the cost and component cost of the vehicle may be reduced by repurposing high voltage and power rated cabling, fusing and other protection devices, switches, sensors, etc., already deployed as part of controller 17 and the traction system. To enable bypass function through controller 17, in some embodiments, switch 48 (when fitted) may be considered as part of switching mechanism 16, and in other embodiments, such as FIG. 3A discussed below, switch 139 (or the freewheeling diode of MOSFET 139) may be considered part of switching mechanism 16. It will be appreciated by those skilled in the art that the first input terminal 6 and the second input terminal 12 may be of the same electrical potential, and therefore, in some embodiments, the first input terminal 6 and the second input terminal 12 may interface with controller 17 at the same location, and therefore the bypass charging current will not pass through the negative DC bus bar of controller 17 when operating in the bypass modes. As mentioned above, this bypass functionality allows the resultant controller to be fully compatible prospectively or retrospectively with a larger range of charging methodologies and hardware.

It should be appreciated that when operating with switch 48 in an open or disconnected state, the battery pack 3 may be able to be charged from the charging station 25 (referred to as a charging mode), or alternatively, in some cases, it may be beneficial to transfer power back into the charging station 25 (referred to as vehicle-to-everything or V2X operation). In the embodiment described above, controller 17 is fully bidirectional and accommodates these multiple modes of charge and discharge using the existing drive circuits in the vehicle. For example, in V2X operation, AC output is required to put energy back on to the electrical power grid (V2G) as described later, whereas DC output may be beneficial to directly charge another electric vehicle (V2V) which may have run out of stored energy.

Switch 48 is responsive to the control signals for selectively connecting and disconnecting at least one of the power rails from either or both terminals of the battery pack 3, and/or at least one of the power rails from either or both terminals 13 and 14 of port 4. This selective disconnection of the power rails and the resultant energy flows in the different switching states allow controller 17 to act as a bidirectional DC-to-DC converter. In other words, the configuration of the controller 17 is such that during the second state, a boost converter can be made to act as a buck converter if the input and output are reversed, or vice versa. Thus the controller 17 is able to operate bidirectionally in both buck and boost modes.

For example, in embodiments with switch 48 between circuits 32 and 63 (e.g., as shown in FIG. 2A), during the second state (e.g., charging mode), circuit 32 acts as a buck switch and circuits 63 and 31 act as boost switches when charging battery pack 3. Alternatively, if switch 48 is arranged between circuits 31 and 63, during the second state circuits 32 and 63 act as buck switches and circuit 31 acts as a boost switch. On the other hand, if the inputs to the controller 17 are changed such that the current through the controller 17 is reversed, then if switch 48 is arranged between circuits 32 and 63 (e.g., as shown in FIG. 2A), circuit 31 and 63 (in particular MOSFETs 133 and 145 respectively) act as buck switches and circuit 32 (in particular MOSFET 140) acts as the boost switch, while if switch 48 is arranged between circuits 31 and 63, circuit 31 acts as a buck switch and circuits 32 and 63 act as boost switches.

In all cases of the proposed embodiment, the upper switches of the drive circuits (e.g., MOSFETs 133, 139 and 145) act as the buck switches, and the lower switches of the drive circuits (e.g., MOSFETs 134, 140, and 146) act as the boost switches. Therefore, if a circuit is deemed to be acting as a buck switch or in buck mode, then it is implied that the upper switches of that drive circuit are being used to regulate the buck current. Similarly, if a circuit is deemed to be acting as a boost switch or in boost mode, then it is implied that the lower switches of that drive circuit are being used to regulate the boost current.

Thus, the bidirectional nature of controller 17 allows for:

Current being supplied to motor 7 from current drawn from battery pack 3 to provide rotation of shaft 9 (in either direction) and hence drive the car 1.

Current being supplied to motor 7 by a DC source connected to port 4. (This could be, for example, an external power supplied via a pantograph or wireless interface, or a supplementary energy supply (not shown) that is being carried temporarily or otherwise by the car 1. The supplementary energy supply is able to be a supplementary energy storage device having one or more or a combination of ultracapacitors, capacitors, batteries and hybrid devices, or a supplementary energy generation device such as a PV array or fuel cell.)

Charging current being provided to battery pack 3 from port 4.

Current being drawn from battery pack 3 and transferred, via port 4, to an electrical load or other electrical sink of either DC or AC nature.

The generation of current from motor 7 during regenerative braking of the car 1 to supply to battery pack 3 (or any supplemental energy storage device) as charging current, or to supply any DC source or load connected to port 4.

In buck-boost converter 210, the negative power rails 42 and 44 remain connected and are common at all times. However, in other embodiments, another switching device, similar to switch 48, may be located between power rails 42 and 44 for selectively connecting and disconnecting power rails 42 and 44 to and from each other. In further embodiments, additional switches may be used to provide further selective connection and disconnection between power rails 41 and 43 and power rails 42 and 44. As mentioned above, while in this embodiment the switching device 48 is located between the power rails of drive circuit 32 and 63, in other embodiments, switch 48 (or a further similar switching device) may be employed between drive circuits 31 and 63. Accordingly, the switching device may include, in different embodiments, at least one switch for selectively connecting and isolating the power rails. More particularly, the switches comprising the switching device each have at least two switching states and are responsive to the control signals for selectively changing switching states. The change in switching state, in response to the control signals, has the effect of selectively connecting and disconnecting the power rails.

The switching mechanism 16 may also be used in the bidirectional DCDC mode to pre-charge the input capacitor prior to entering the second state. For embodiments with switch 48, this is accomplished when switch 48 is open and switches 90 and 92 of input circuit 75 are also open (e.g., the controller 17 has no connection to external source) until pre-charge is completed. For such purpose, the controller 17 (and/or/in conjunction with controller 15) of car 1 may use data received from the charging station 25 to determine the relevant mode of operation, including pre-charge voltage, and when to allow connection to the second input via switches 90 and 92 of input circuit 75. The input circuit 75 may also include an input filter for EMI/EMC/RF, or mechanism for impedance matching, etc. The communication of data between the car 1 and the charging station 25 is discussed in further detail below.

To summarize, the switching mechanism 16 may include a plurality of switches, which when opened or closed in different combinations may configure a plurality of charging and/or propulsion states. For example, in this embodiment:

Propulsion state (also referred to herein as the first state)=switch 48 closed (if used), input circuit 75 open (no connection to external source). Controller operating in ACDC/DCAC mode, e.g., DC from the battery pack 3 is converted to AC for the motor 7 to create positive torque for accelerating, and when decelerating, AC current from the motor 7 is converted to DC (rectified) to charge the battery pack 3, creating negative torque (referred to as regenerative braking).

DC Charging state (also referred to herein as the second state)=switch 48 open (if used), input circuit 75 closed (connected with external source). Controller operating in DCDC mode, e.g., DC from the charging station 25 is used to charge battery pack 3, or vice versa which is sometimes referred to as bidirectional mode.

Internal pre-charge state=switch 48 open (if used), input circuit 75 open (no connection to external source). Controller operating in DCDC mode to pre-charge capacitor 66 (if fitted).

Dedicated bypass state=switch 64 (dedicated bypass) closed. Switch 90 open, switch 92 closed, 48 open or closed. Controller not operating.

Non-dedicated or internal bypass state (switch 64 doesn't exist)=Switch 90 closed, 92 closed, switch 48 closed (if present). Controller passively operating.

External propulsion state=switch 48 closed (if used), input circuit 75 closed (connected to external source), battery switches may be open or a diode fitted as previously disclosed (e.g. PDU 21). The car 1 is propelled by an external source, such as an additional/external battery pack. This may also be referred to as operating in the first state.

In other embodiments, switch 48 is disposed between controllers 17 and 18 of the car 1 of FIG. 1, and the motor phases of machines (e.g., motors) 7 and 8 of the car 1 are interconnected between the controllers. In other words, one or more of the drive circuits of motor 7 are included within controller 17, and one or more of the drive circuits of motor 8 within controller 18. In still further embodiments, motor 7 may not be a 3-phase motor. Examples of such embodiments have motor 7 substituted with an inductive load, including a transformer or other winding or windings. Motor embodiments of other than 3 phases are discussed in further detail below in reference to FIGS. 8-14.

High power motor controllers of modern electric vehicles may include high decoupling/bulk capacitance on the DC bus bar to limit transient voltages caused by inductances and the switching of high current. For safety reasons, the motor controller of an electric vehicle is not energised when the vehicle is off, or not in active operation. Due to the low impedance of these capacitors, most modern electric vehicles have circuitry to prevent high inrush currents that would otherwise occur when the motor controller is first connected to the HV wiring loom. In some embodiments, the circuitry includes a resistor which is first switched into the circuit during the start-up procedure, or a method of pulsing the current through use of a fast switching mechanism. The resistor is able to be switched out, or the pulsing stopped, once the capacitor reaches a sufficient voltage. This inrush current limiting circuit adds cost and complexity to the vehicle concerned, as well as adding to the overall weight of the vehicle and increasing space constraints. In some embodiments, this pre-charge circuitry is provided in the power distribution module 21 of the car 1 of FIG. 1.

It will be noted from FIG. 2 that, for electric vehicle applications, it is common to have a decoupling capacitance across the power rails. Capacitors 65 and 66 are shown in this embodiment, meaning the total bulk capacitance is able to be common in the first state (e.g. propulsion mode), or split between the first inputs 5 and 6 and the second inputs 11 and 12 in the second state (e.g. DC charging), such that each input is filtered. Further, having capacitor 66 on the opposite side of switch 48 as the battery pack 3 may help when operating in the first state (e.g., propulsion) to compensate for any extra stray inductance which may have been caused by the fitment of switch 48. A further advantage of the architecture of the embodiments of the invention, when used in electric vehicles and other applications having such capacitances, is that the buck-boost functionality provided is available to pre-charge (or discharge) capacitor 66 from the battery pack 3 and/or pre-charge (or discharge) capacitor 65 from an external source (e.g., grid 77). For example, the controller 17 may be able to operate in the second state (e.g., charging mode), using the usual buck-boost operation, to charge the capacitor 66 before closing the power rail interruption switch 48 and entering the first state. Similarly, controller 17 may be able to pre-charge capacitor 66 before allowing a current to be drawn from the charging station 25.

In this way, the requirement for further external or additional inrush current limiter is eliminated for this embodiment. Similarly, it is considered unsafe for dangerous voltages to remain inside the motor controller of a modern electric vehicle once the vehicle is turned off, or in the event of an accident. Therefore, most modern electric vehicles have a method of discharging the bulk capacitance in the motor controller quickly in the event of shutdown or an emergency condition being detected. For example, in some embodiments, controller 17 is employed to discharge the capacitor 66 by entering the second state of operation (e.g., charging mode) and utilising buck-boost operation. The energy in the bulk capacitors is able to be either buck-boosted into battery pack 3, or discharged to a pulsed short circuit. This is achieved by making use of the motor inductance as a means of reducing current transients and protecting the drive circuits. In this way, the car 1 is further simplified by eliminating the use of a dedicated discharge circuit.

As mentioned above with respect to FIG. 1, the car 1 may include a system for communicating, or a circuit to sense or determine, one or more characteristics and/or capabilities of the external energy source (e.g., the charging station 25). The system may also communicate one or more characteristics and/or capabilities associated with the car 1. Similarly, the charging station 25 may include a system for communicating, or a circuit to sense or determine, one or more characteristics and/or capabilities associated with charging the vehicle that is connected to, or which is to be connected to, the charging station 25. These characteristics and capabilities may include, for example, voltage, voltage type (for example, regulated DC, unregulated DC, or single or 3-phase AC), maximum permissible sink current, maximum permissible source current, state of charge (SoC) of energy source, SoC and/or status of a supplementary power source, direction of power flow, etc. Some or all of these characteristics may be communicated as first charging data to or from the charging station. In some embodiments, the interface by which charging station 25 connects to car 1 may embody, or form part of the communication modules 122 and 123, and whereby the first communication data is defined by whatever method by which car 1 determines that an interface connection has been established. For example, in some embodiments, the first charging data represents a voltage applied to the input port 4 by charging station 25 by which the onboard communications module 123, through use of a voltage sensor, is able to determine that a connection with charging station 25 has been established. The communication of characteristics and/or capabilities may be one-way, or two-way (e.g., bidirectional). In some embodiments, the first charging data may be indicative of whether the station is to operate in the first state (e.g., propulsion mode) or the second state (e.g., charging mode). The first charging data may also be indicative of whether to enter bypass mode.

For example, in some embodiments, the ability to disconnect input via input circuit 75 may ensure that an unregulated charge does not flow as soon as the external source is connected (for example, if the system was in propulsion mode, or if there is a voltage mismatch, etc.). Through the input switches in input circuit 75, the system may selectively decide whether to allow the connection to the battery or to the controller, or to disallow charge. This decision may be aided by communication with the charging station 25 (e.g., in order to know the voltage/capabilities of the external charger).

As another example, the switching mechanism may be used to selectively enter the second state (e.g., charging mode) by choosing whether to connect the external source (e.g., the charging station 25) to controller 17 for initiating the charging event. The controller may use communication with the charging station to determine whether or not to enter charging mode (e.g., by closing the switches), whether it is safe, and what the parameters will be. As described above, the switching mechanism may also be used in such cases to bypass the onboard controller and charge the battery directly.

The communication modules 122 and 123 may also exchange second charging data. In an embodiment, communication module 122 of the charging station 25 is responsive to the second charging data for allowing one or more of: the load current to flow once the charging station 25 is electrically coupled to the car 1 via port 4; the availability of the second coupler to be electrically coupled to the first coupler; outputting a regulated charging voltage Vc and/or current 58; outputting an unregulated charging voltage Vc and/or current 58; and defining a maximum allowable value for the load current. As with the other use of ordinal adjectives in the present disclosure the use of 'first' and 'second' when referencing charging data does not imply an order or importance of the data, and nor does it necessarily represent the order or direction in which charging data is sent.

In some embodiments, the first charging data, or the second charging data, may include data sent from the communication module 122 to the communication module 123. Examples of such data includes: the state of charge of the external source; the state of health of the external source; the energy capacity of the external source; the power conversion capability of converter 83; the present voltage of the external source; the voltage limits of the external source; the maximum current sinking of the charging station 25; the maximum current or power able to be drawn by the car 1; the maximum energy able to be drawn by the car 1; any error states of the charging station 25; and the like. In other embodiments, first charging data, or second charging data, is able to be sent from the communication module 123 to the communication module 122. Examples of that data include the SoC of battery pack 3; the state of health of battery pack 3; the energy capacity of battery pack 3; the maximum power conversion of controller 17 or other onboard controller; the maximum and/or exact current requested for charging battery pack 3; the energy requested for charging battery pack 3; the instantaneous voltage of battery pack 3; the voltage limits of battery pack 3; the maximum and/or requested voltage able to be applied to terminals 13 and 14 of port 4 of the car 1; any error states of the car 1; and the like. In other embodiments, more or less data is included in the first and second charging data.

The first and second charging data may also include commands for controlling one or more functions of the car 1 from the charging station 25, or controlling the charging station 25 from the car 1. These commands may include analogue or digital control signals, such as for opening or closing switches possessed by either the vehicle or the charging station. In some embodiments, first charging data may be based on, or compatible with, existing charging communication standards such as those defined in private or public standards, or those commonly referred to as CCS, CHAdeMO, GB/T, Tesla, J1772, Type 2, OCPP, and the like. In some embodiments, charging data is continually communicated between the first and second or the second and first charging modules. For example, in bypass mode where the external charger is responsible for charging the battery pack 3, module 20 may send the requested charging parameters to the charging station 25 as frequently as required by the governing standard (e.g. CCS/CHAdeMO). In other examples, the charging station 25 continually communicates, among other things, the maximum permissible input load current 58 able to be drawn by the onboard controller 17 (or the controllers 15 or 18 of car 1 of FIG. 1) in the second state.

The onboard controllers for the vehicle may use algorithms to determine the direction of energy flow, the power of the energy conversion, the amount of energy to be converted, and any other relevant factors. This algorithm may have inputs and outputs which may include one or more of communication with the external source or charging station 25, the SoC of the battery pack 3, the charging and discharging power capability of the battery pack 3, the power conversion capability of the circuits and/or motor and/or motors used by the controller in the conversion, previous driving and vehicle use habits, future vehicle use requirements, minimum onboard energy or vehicle range requirements, error events such as ground leakage detection or isolation fault, fault conditions, high voltage interlock loop, status of pantograph or charging receptacle, or the like. In some embodiments, the communication from the charging station 25 may include the SoC of the external source, available energy to source or sink, the charging and discharging capability of the external source, instantaneous renewable energy generation of the external source, ground leakage detection status, fault conditions, interlock loops, status of pantograph or other equipment, demand response with grid 77, issued commands, or the like.

In an electric vehicle such as the car 1, when motor 7 is used to provide locomotive energy both to the vehicle and charging energy to the battery pack 3, capacitor 66 may be substituted by an energy storage device such as a bank of ultra-capacitors (or similar alternative substitution) working in cooperation with the battery pack 3. In such cases, module 20 may control the operation of circuits 31, 32 and 63 to provide the relevant voltage translation and/or current shaping/control requirements, including bidirectional power requirements for the battery pack 3 to charge and discharge while maintaining the ability to operate motor 7 to provide the relevant locomotive force which varies considerably over time. This functionality includes, for example, operating in the first state (e.g., propulsion mode) by having switch 48 in its closed state and operating circuits 31, 32 and 63 to connect motor 7 to the battery pack 3 and/or to the bank of ultra-capacitors to allow the current 50 to be drawn. Between periods in which motor 7 is being actively driven to provide locomotive drive to the vehicle, for example, when the vehicle is stationary, module 20 may operate in the second state (e.g., charging mode) by having switch 48 in its open state and operating in DC to DC charging mode to allow recharging of the battery pack 3 from a connected external power source (e.g., the charging station 25), or to re-charge capacitor 66 from battery pack 3.

For example, in some embodiments, ultra-capacitor 66 is a power dense device used to power initial high-power acceleration events, and the battery pack 3 is an energy dense device used for sustained power draw to maintain constant velocity. Therefore, when stopped, controller 17 can recharge capacitor 66 from battery pack 3 over a longer period in preparation for the next high-power drawing acceleration event. This enables battery pack 3 to have a lower specific power density, and be optimized for a higher energy density.

Figure 2D:
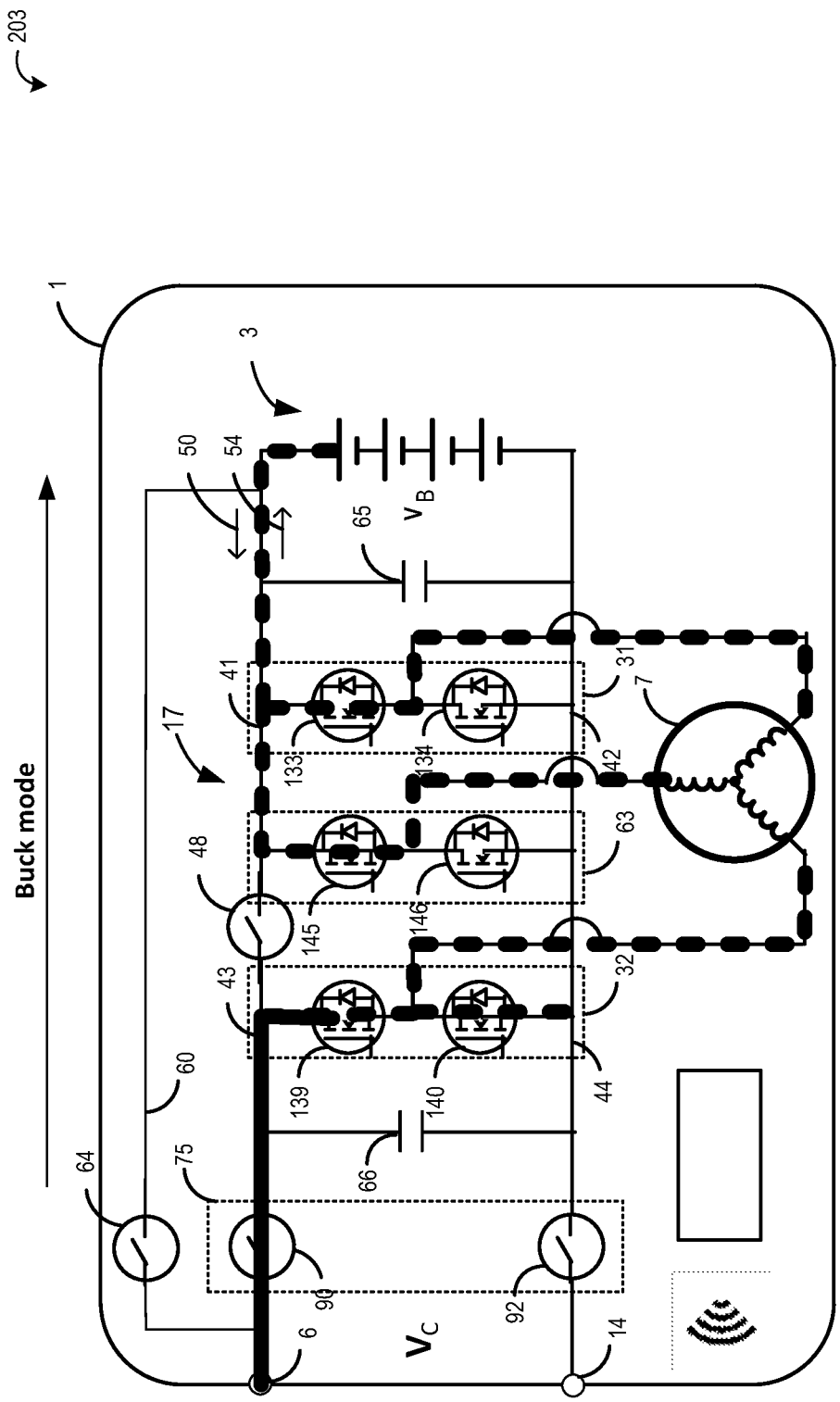
FIGS. 2D, 2E, and 2F are schematic diagrams that illustrate the flow of a current through the drive controller of FIG. 2 in buck mode, boost mode, and buck-boost mode, respectively.
Figure 2E:
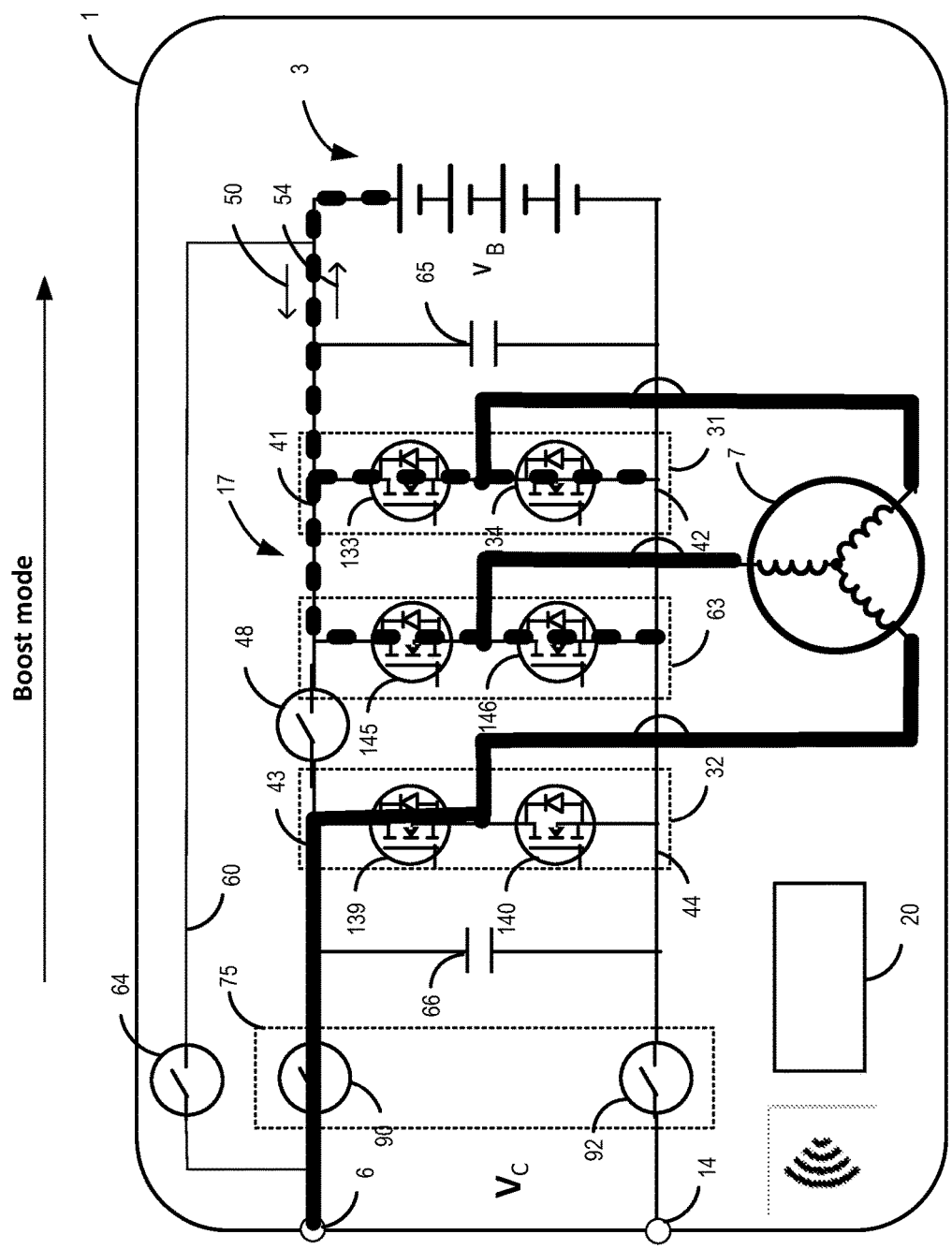
Figure 2F:
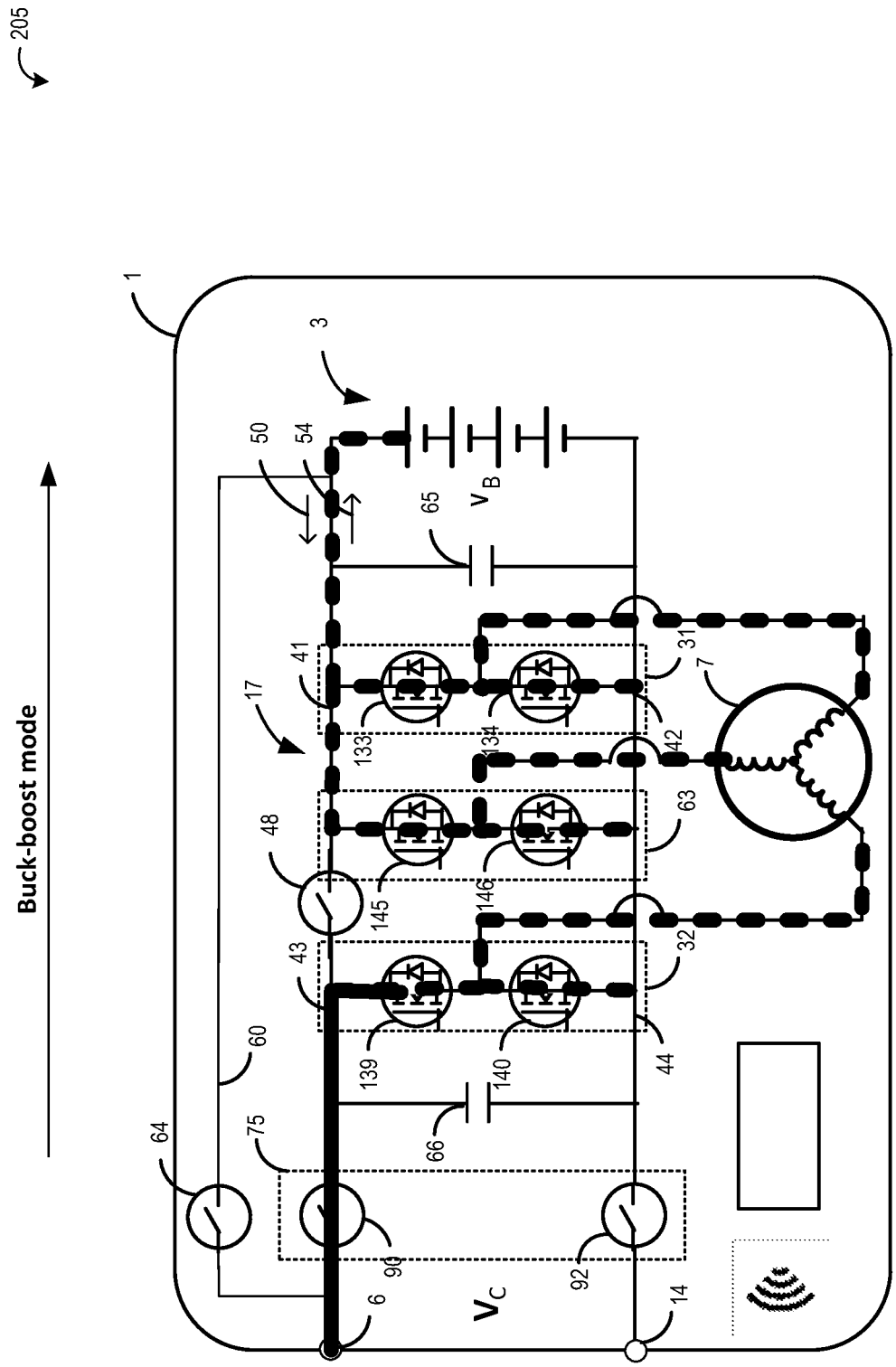

Reference is now made to FIGS. 2D, 2E, and 2F, which show the car 1 and controller 17 of FIG. 2A in buck, boost, and buck-boost modes, respectively, wherein the path of the current during the second state (e.g., charging mode) is indicated in solid or dotted black lines, where solid lines indicate continuous current and the dotted black lines indicate currents (whether continuous or discontinuous) after being subjected to pulse-width-modulation of switches or diodes within the available circuits.

FIGS. 2D, 2E, and 2F show controller 17 operating in the second state, where controller 17 is responsive to a number of inputs which are used by module 20 to generate the control signals. Module 20 executes software stored in local memory, and includes gaining information about the present operating parameters of controller 17 (e.g., present voltages such as $V_B$ and $V_C$, and others such as currents 50, 54, 70, 71, 72 and 58). In embodiments that include more than one inductive winding, more current sensors are typically used to allow more accurate control of the system. Similarly, in embodiments that include more than one power rail break, more voltage sensors are typically used. The control method is also responsible for operations not shown, such as safety checks and measures, which are able to include multiple levels of redundancy. These redundancy measures, in some embodiments, take the form of hardware or software redundancy including feedback loops and/or human input, to compliment the control operation. For instance, this feedback is able to include redundant feedback from both a charging plug and a human actuated mechanical input switch before the control method enters the second state of operation. The control method is also able to include other features as to comply with applicable standards and/or regulations of the application, such as those used in automotive applications. In some embodiments, the control is also sensitive to other feedback, for example, such as that gained through communication with the electrical grid or interface plug to ascertain the maximum permissible power level able to be drawn or returned. It will be appreciated by those skilled in the art that the control strategy shown is able to be expanded or contracted based on the requirements of the application.

Module 20 is responsive to the relevant inputs (most significantly, the voltage across the battery pack 3—which in FIG. 2A is $V_B$— and the voltage across the external source—which in FIG. 2A is $V_C$) to ascertain the nature of the conditioning to be applied to provide the relevant charge to the battery pack 3. This includes operating the drive circuits to deliver a boost mode, a buck mode, or a buck-boost mode, which will be described in more detail below. Once the appropriate mode has been determined by module 20, it then issues control signals to implement the selected mode while also adjusting the charging current supplied. This operation is maintained until module 20 assesses that the battery pack 3 are charged or that the conditions are changed. In another embodiment, no voltage value may be available for Vc (either communicated or via sensor feedback), and the charging modes may be selectively progressed from one of buck, to buck-boost, to boost (which will be explained in more detail below), until a desired charging current is reached. In one such implementation, this is done via Proportional Integral (PI) or Proportional Integral Derivative (PID) control to first increase the duty cycle of the buck switch (shown in FIG. 2A as switch 139) until the desired current flows, or if the desired current is still not achieved when the buck switch is at 100% duty cycle (e.g. continuously on), then the control loop progresses to increase the duty cycle of the boost switches until the desired charging current is achieved. In other implementations, the control loop begins to switch the boost switches prior to reaching 100% duty of the buck switches to enable an intermediate buck-boost charging mode.

Turning now to FIG. 2D, current flow schematic 203 shows buck-boost converter 210 when operating in buck mode in the second state, where the current is depicted in black lines as described above. Module 20 (not shown) may provide a control signal to switch 48 to remain in its open position, and then provides control signals to the gates of all of MOSFETs 133, 134, 139, 140, 145 and 146. The control signals provided to the MOSFETs are selected to ensure those individual MOSFETs operate specifically and overall collectively to deliver the buck functionality. For example, the control signals provided to MOSFETs 134 and 146 are to maintain a non-conductive state and thereby prevent a current path from being established through those MOSFETs to respective power rails 42 and/or 44. The control signals provided to MOSFETs 133 and 145 is also to maintain those switches in their open state (that is, the MOSFETs themselves are not conductive). However, as those MOSFETs include a body diode, a current path is still able to be established to respective power rails 41 and 43. The control signal provided to MOSFET 139 (the buck switch) is a pulse width modulation (PWM) signal. That is, although the current path through MOSFET 139 will be segmented (due to the PWM control signal) the current flow in the indicated current path downstream of MOSFET 139 will be continuous (although variable) when operating in a continuous conduction mode (CCM) due to the current path including the three windings of motor 122. The control signal provided to MOSFET 140 maintains that switch in its open state. Accordingly, there is no conduction through that MOSFET proper. However, when MOSFET 139 is switched OFF an into its open state, current will be drawn through the body diode of MOSFET 140 due to the inductive effect of the windings in the indicated current path. This provides for asynchronous operation of MOSFETs 139 and 140. In other embodiments MOSFET 140 is provided with PWM control signals that are the inverse of those provided to MOSFET 139 to enable synchronous operation of those MOSFETs and thereby reduce the forward conduction losses of the freewheeling diode as part of MOSFET 140. Further, in some embodiments MOSFETs 133 and 145 are used to provide synchronous operation and reduce the forward conduction losses of their respective diodes.

In other embodiments module 20 provides control signals such that controller 17 works in modes other than CCM. Examples of other such modes include discontinuous conduction mode (DCM), or other hybrid modes such as pseudo continuous conduction mode (PCCM). In some embodiments, individual inductive windings are in different conduction modes than the other windings.

In further embodiments a further switch, similar to switch 48, is disposed between circuits 31 and 63 for allowing those power rails to be selectively connected and disconnected in response to control signals from module 20. This allows for the implementation of a multiphase or interleaved buck conversion, with PWM control signals being provided to one or both of the gates of MOSFETs 139 and 145.

In the example provided in FIG. 2D, the energizing current travels through 19*c* (e.g., current 70) in series with both 19*a* (e.g., current 71) and 19*b* (e.g., current 72) in parallel, thus ignoring any mutual coupling effects, the buck inductance is 1.5 times the individual phase inductance of an individual windings of motor 7. In boost mode (discussed in the next section referencing FIG. 2E), the current 70 passing through 19*c* is selectively diverted in series through either/or 19*a* and/or 19*b*, and thus ignoring any mutual coupling effects, the boost inductance is able to be between 1.5 to 2 times the individual phase inductance. If the wye configuration of windings in FIG. 2A is substituted with a delta configuration, two phases are able to be used in parallel and thus, ignoring any mutual coupling effects, the buck inductance would be equivalent to half the individual winding inductance. For a delta winding operating on boost, the current is able to be one phase in parallel with two phases in series, and this, ignoring any mutual coupling effects, the boost inductance is able to be between 0.66 to 1 times the individual phase inductance. Therefore, it is possible to get a configuration for buck and boost inductance values that are between half and two times the individual phase inductance. In many embodiments of applications, the inductive loads are wound on a common core and have a coupling effect, and therefore the inductance values may differ accordingly based on the relationship of the currents in each phase. In other embodiments using a wye configuration and where switch 48 is located between power rails 135 and 147, (ignoring any mutual coupling effects), the buck and boost inductances are 1.5 to 2 times the individual phase inductance. For the same alternate location of switch 48 and using the delta configuration, the buck and boost inductances are 0.5 to 0.66 times the individual phase inductance. In the case that $V_C$ is usually higher than $V_B$, it may be preferable to locate switch 48 on the power rail between circuit 143 and 131 such that both switches 139 and 145 can be used as buck switches for interleaving, reduced loses, increased efficiency, increased power, or other benefits.

Therefore it will be appreciated that controller 17 (and/or 18) is able to selectively direct the energizing current flowing through the inductive windings of machine 7 (and/or 8) in at least one of the operational modes whilst operating in the second state. It will be further appreciated that the energizing current will flow through at least two phases in series (including when operating one in series with two in parallel) when operating a wye connected inductive load, and through at least two phases in parallel (including one in parallel with two in series) when operating a delta connected inductive load.

Reference is now made to FIG. 2E, where current flow schematic 204 shows buck-boost converter 210 when operating in the boost mode, wherein $V_B > V_C$ in the second state when the first energy source (e.g., the battery pack 3) is being charged from the second energy source (e.g., the charging station 25). In this embodiment the boost mode is achieved by module 20 maintaining MOSFET 139 in the closed or conductive state, and applying a PWM control signal to the gates of MOSFETs 134 and/or 146. To selectively determine characteristics of the conversion (for example, effective inductance) MOSFETs 134 and 146 are operated together or singularly. Preferentially, to reduce harmonics and have a more regular current draw, MOSFETs 134 and 146 are operated in phase shifted operation (for example, interleaved) or inversely. Due to the inductance provided by the windings of motor 122, after MOSFETs 134 and/or 146 have been turned off the freewheeling current will then pass through the body diodes of MOSFETs 133 and 145 to charge the battery pack 3.

Referring now to FIG. 2F, current flow schematic 205 shows buck-boost converter 210 when operating in the buck-boost mode. This typically occurs when $V_B$ and $V_C$ are close in value, and where changes in both during the charging can have those values crossing each other a number of times. In this embodiment the buck-boost mode to charge $V_B$ from $V_C$ is achieved by module 20 providing respective PWM control signal to the gates of MOSFET 139 (the buck switch) and the gates of MOSFETs 134 and/or 146 (the boost switches). To increase or maintain maximum current during the conducting phase of these switches, module 20 controls the buck and boost switches together such that when MOSFETs 134 and/or 146 are turned ON, MOSFETs 139 is also ON. The buck operation of MOSFETs 139 is also able to be used to reduce the current applied in the boost phase. MOSFETs 134 and 146 are able to be operated in phase shifted operation, and MOSFETs 133 and/or 145 are able to be inversely controlled to their respective boost switches in synchronous operation (depending on the switch type) to reduce forward voltage drop. In the case that MOSFETs 133 and/or 145 are toggled, MOSFET 139 may also be inversely toggled to prevent reverse current flow. Similarly, MOSFET 140 is able to be inversely toggled to MOSFET 139 to provide synchronous buck operation and reduce forward conducting losses of the body diode of MOSFET 140.

It will be appreciated that this buck-boost mode is able to enter periods of purely buck mode or purely boost mode to achieve the desired charging performance. Further, in the second state of the present embodiment, controller 17 is able to act as a four-switch non-inverting cascaded buck-boost converter, and therefore use any known control method for this or similar topologies. When the buck switch operates at 100% duty cycle, but the boost switches are operated, the system operates purely as a boost converter. Conversely, when the boost switches are not operated (e.g. 0% duty cycle), but the buck switch is operated, then the system operates as a buck converter.

The different buck, boost or buck-boost inductances, along with the switching frequency of the drive circuits controlled via module 20, are able to be optimized based on the power loading requirement at any given time. The system architecture is able to be optimized based on the intended voltage of the attached energy storage device, the power of the DC-DC conversion, and the voltage of the power source at the second input. In the application to an electric vehicle being charged from the electrical grid, the system architecture is optimized based on the on-board battery voltage, charging power capability, and the local grid voltage where the vehicle is to be deployed. This system architecture optimization is achieved through component selection, placement selection of the switch 48, the number of power rail interruption switches, star or delta winding configuration of the motor, the type of switches employed, and the switching control method and frequency employed by module 20. Component selection is in some embodiments influenced by voltage and/or current carrying capability, rise/fall time, switching frequency, conduction resistance, power consumption, quality, cost, or a range of other measures depending on the component in question. Optimization is also able to be implemented in the control strategy such that component stress is managed and/or evenly distributed such that the life expectancy of critical components is prolonged. Similarly, the system is able to be optimized based on failure modes and effects analysis (FMEA) such that operational safety is improved and complies with all applicable standards and/or regulations of the intended application. For example, in some embodiments it is desirable to implement a specific type of switch 48 which has a short circuit failure mode so that the motor operation will not be interrupted in a fault condition whilst operating in the first state.

In some embodiments use is made of multiple interruptions—that is, disconnections—on the positive power rail to enable selection at any given time of one of a plurality of buck or boost inductances to enable variable inductance to improve the efficiency of the controller at different voltages, loading levels, and charging current flow directions. In other embodiments, use is made of switching mechanisms such that the attached motor or polyphase load is able to change on demand between a wye, delta and/or other configurations.

Figure 3A:
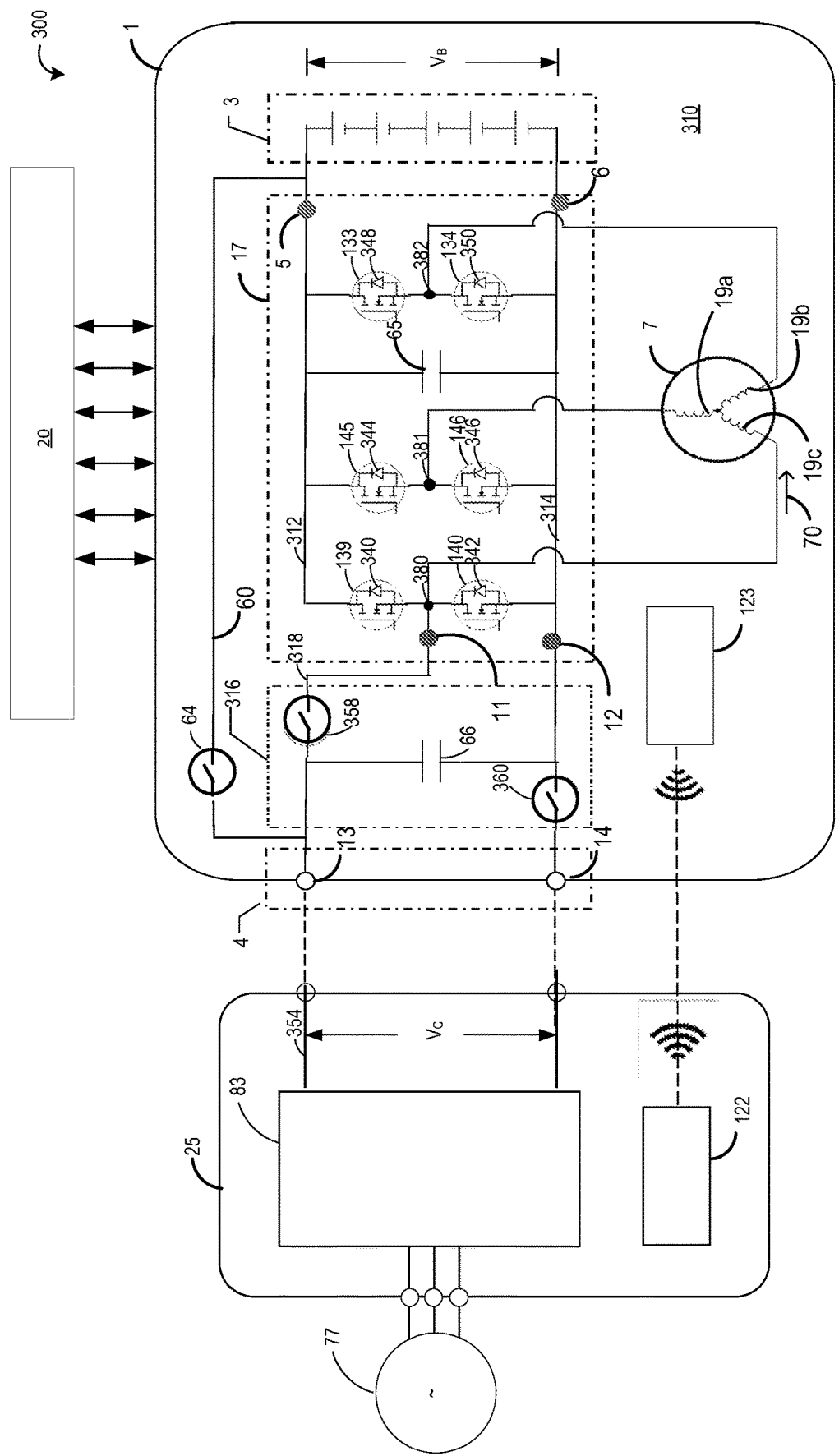
FIGS. 3A and 3B are schematic representations of embodiments of a drive controller for a three phase inductance motor having a wye configuration configured to receive DC power from an external charging station, with different filter configurations.

It will be appreciated by those in the art that in embodiments where it is known that the voltage of the charging station 25 (e.g., $V_C$) will be always be lower voltage than the voltage of battery pack 3 (e.g., $V_B$) the controller 17 always acts in boost mode with MOSFET 139 (e.g., the buck switch of FIG. 2A) at 100% PWM duty cycle. In such embodiments it is not necessary, nor preferable, to have MOSFET 139 in series in the charging conversion. In such cases, terminal 11 of the second input (and thus terminal 13 through input circuit 75) can connect directly to the mid-point power rail between MOSFETs 139 and 140 (that is, directly to machine phase 19c), to bypass MOSFET 139 as depicted in FIG. 3A and described below. This can increase the efficiency, or power rating of the charging conversion by eliminating bottle neck, voltage drop, or impedance of MOSFET 139. Similarly, in embodiments where $V_C$ will be always be higher than $V_B$, whereupon controller 17 always acts in buck mode, then terminal 5 can connect directly to the mid-point power rail between MOSFETs 139 and 140. In such cases, switch 48 can be eliminated as $V_B$ and $V_C$ are not both connected to a common power rail, and the functionality of switch 48 when operating in DC charging or bypass modes may be provided by MOSFET 139 (and corresponding body diode) acting as part of switching mechanism 16. That is, MOSFET 139 is able to be non-conducting or open when charging pack 3 from charging station 25, or closed or conducting when performing an internal bypass function by connecting the first and second inputs together. In cases where the voltage presented to the input connected to mid-point power rail 380 is greater than the voltage applied to the other input, then the bypass function will be automatic through the body diode of MOSFET 139, and therefore switching mechanism 16 may selectively allow or disallow this operation by control of input circuit 75. In other embodiments, either or both of the first input terminal 5, or the second input terminal 12 may be selectively connected by aspects of the switching mechanism 16 to the power rail between MOSFETs 133 and 134, or alternatively MOSFETs 145 and 146 (that is, directly to phase 19*b* or 19*a* respectively), to bypass the forward conduction losses of the antiparallel diode of MOSFETs 133 or 145 respectively.

Thus, when not using either the buck or boost switches (e.g., the configurations described in FIGS. 2D, 2E, and 2F), at least one of the DC inputs or outputs (e.g., the first input terminals at 5 and 6, or second input terminals at 11 and 12) can be connected directly to the mid-point of MOSFETs within a drive circuit and/or directly to one of the inductive phases 19*a*, 19*b*, or 19*c* as described above. That is, the second input (meaning positive terminal 11 of the second input) can be said to be connected directly to one of the phases or phase legs of machine 7 or 8, or drive circuit 31, 32, or 63. This eliminates the use of switch 48 and simplifies the converter structure. Eliminating switch 48 is beneficial, as otherwise a typical inverter structure may need to be altered, which may increase parasitic inductance in the DC bus when operating in the first state for the drive circuit(s) on the opposing side to the primary power source (for example, drive circuit 32 in FIG. 2A when operating from battery pack 3).

Referring now to FIG. 3A, an example charging system 300 shows boost converter 310, wherein switch 48 of buck-boost converter 210 has been eliminated in order to simplify the controller 17. The charging station 25 and the car 1 of FIGS. 1 and 2 are depicted once again. In this embodiment, boost converter 310 is configured to operate without buck functionalities for charging battery pack 3 from charging station 25. In FIG. 3A, boost converter 310 shows controller 17 in a boost converter configuration whereby the controller 17 does not break the power rail using switch 48 of FIG. 2, but instead accepts a positive DC input from the charging station 25 at the second input terminal 11 connected to the 19*c* phase leg of drive circuit 32, being mid-point power rail 380 situated between MOSFETs 139 and 140. Therefore, when operating in the second state, switch 139 is able to operate in lieu of switch 48 to disconnect the second input 11 power rail 380 of the second drive circuit 32, from the power rail 312 connected to the other drive circuits and the first input 5. However, in contrast to switch 48, as switch 139 typically has a free-wheeling anti-parallel diode, this therefore limits power rail 380 (and therefore Vc) to operate at a lower voltage potential than the voltage potential of 312 (and therefore $V_B$) with switch 139 selectively blocking current in the second state. That is, when $V_C < V_B$, controller 17 operating in the second state is able to selectively regulate a charging current or voltage from the second input to the first input using the first and third drive circuits 31 and 63 respectively. In this instance, controller 17 acts as a boost converter (e.g., missing buck charging functionality) where the voltage presented at input port 4 via the charging station 25 is lower than the voltage of battery pack 3, and where controller 17 regulates the charging current. In this embodiment, the positive second input terminal 11 is located at the mid-point power rail 380 connected to phase 19*c*, and similarly to FIG. 2A, the negative second input terminal 12 is connected to negative power rail 44 (or 314). The first input terminals 5 and 6 connecting to battery pack 3 interference to controller 17 at power rails 312 and 314 which are similar in nature to power rails 41 and 42, and/or 43 and 44 in FIG. 2A. When boost charger 310 operates in the second state, switches 139 and 140 is held open, and thus drive circuit 32 is not able to be responsive to the first input with the other drive circuits 31 and 63. In some embodiments, circuit 32 is interlocked in the second state such that the circuit is inoperable, and therefore may be viewed as being disconnected (at least in principal) from the circuits 31 and/or 63, and from the first input (5,6). Similarly, in the second state, circuit 31 are phase 19*c* are connected to, and may be responsive to receiving a current or voltage at the second input (11,12) via switching mechanism 316. It will therefore be appreciated by those skilled in the art that boost converter 310 operates the same as or similar to buck-boost charger 210 of FIGS. 2A and 2E when operating in the second state, and that MOSFET 139 operates the same as or similar to, and therefore replaces the use of switch 48, in applications where Vc<Vb.

As in FIG. 2A, the car 1 includes controller 17 for an inductive load in the form of a three phase motor 7, with three windings in a wye configuration. Power is received at the charging station 25 from grid 77, whereby AC power is converted to DC power via AC/DC converter 83, and transmitted via port 4 to the battery pack 3 of the car 1 during charging. The control of the charging station in this instance is similar to that detailed for FIG. 2. As in FIGS. 2A and 2E, the boost converter 310 of FIG. 3 includes a capacitor 65 in parallel with the battery pack 3. When in traction drive mode, the capacitor 65 is used to avoid voltage overshoot and drive failure caused by switching noise and stray inductance in the DC bus, according to best practice. The car 1 also includes an input circuit 316, which includes a capacitor 66 and protection/disconnection switches 358 and 360, as described in further detail below. It should be appreciated that in this boost-only embodiment, capacitor 66 may be disconnected from the second input 11 by opening switch 358 when operating in the first mode (e.g., propulsion), in order not to asymmetrically imbalance the motor phases.

It should be appreciated that prior art charging circuits have difficulty in advantageously using such a capacitor on the second input terminals 11 and 12, as it often leads to problems in power factor correction (PFC) when optimizing charging from AC sources. An advantage of the present embodiment is that it is optimized to charge from a DC source at the second input terminals 11 and 12, and therefore need not consider power factor correction as part of the circuit. Further, in prior art applications, including a capacitor 66 may asymmetrically load the motor and may negatively detract from the efficacy of propulsion during the first operation.

Furthermore, switching mechanism 16 and module 20 may operate such that during traction or propulsion mode (the is, the first state) and during idle states capacitor 66 is also disconnected from the input terminals of port 4 such that any stored voltage upon capacitor 66 is not accessible or presented as a hazardous voltage to port 4. In some embodiments input protection switch 360 of input circuit 360 is interlocked using communicated data (including, for example, a HVIL or other circuit) from an interface or plug coupling to port 4. Furthermore, the use of such an input capacitor 266 to prior art apparatus and arrangements has not been used advantageously as the use of such an input capacitor to the prior art can cause a hazardous voltage to be presented port 4 during modes where the vehicle is not actively being charged.

The boost converter 310 of FIG. 3 has a high voltage power rail 312 connected to the first input terminal 5 and the corresponding side of the battery pack 3. The negative or common power rail 314 is connected to the first input terminal 6 and corresponding and opposing side of the battery pack 3 as well as through to the second input terminal 12, and terminal 14 of port 4 and the charging station 25 via switch 360 as shown. The boost converter 310 has a bridge arrangement of six, preferably solid state, switches 139, 140, 145, 146, 133, and 134 as shown in FIG. 3. That is three, series pairs of switches, the three pairs being parallel. Examples of suitably high-power switches 139-134 are: MOSFETs, HEMTs, HFETs, MODFETs, IGBTs, SiC, GaN, etc. Across each switch 139-134 are six respective freewheeling diodes (FWD) 340, 342, 344, 346, 348, and 350. Each of the three phases of motor 7 are connected between switches of each switch pair 139-134 as shown in FIG. 3. The second input terminal 11 is connected to the mid-point power rail 380 of drive circuit 32, and phase 19c of motor 7. Switching mechanism 16 comprising switches 358, 360, and 64 (if fitted), PDU 21 (e.g., of car 1 of FIG. 1, not depicted in FIG. 3A), and/or 139 (including diode 340) is controlled by module 20 to reconfigure controller 17 (e.g., in conjunction with the controller 15 of car 1 of FIG. 1) to selectively determine the mode(s) of operation between propulsion mode, DC charging mode, pre-charge mode, internal bypass mode, dedicated bypass, and the like as previously described. This re-configuration of the drivetrain of the car 1 to make use of high-power capacity inductive windings of the AC motor advantageously allows the onboard boost converter 310 to raise the charging station 25's lower voltage potential to a high enough potential with sufficient current to charge the vehicle's battery pack 3. It will be readily appreciated that three phase motors of different winding configurations such as star, wye, mesh or delta terminologies may be used in a boost converter circuit described here and further below. Six phase motor example applications are described further below in reference to FIG. 8, but any number of phases or controllers are possible. It will also be appreciated to those skilled in the art that single phase AC and DC motors are also applicable to the invention described herein.

In this topology, the lower switches of the drive circuits, other than the drive circuit connected to the secondary DC input terminal 11 (that is, MOSFETs 146 and 134 in the illustrated embodiment), are pulsed to create a current flowing in the motor phases. This current then flows through the upper switch freewheeling diodes (e.g., diodes 340, 344, and 348) during the off-pulse (e.g., after switches 134 and 146 are turned off) to form a charging current for battery pack 3. This operation is similar to that of the boost charging operation described in FIG. 2E.

A lower DC voltage potential positive power rail 318, compared with the higher voltage potential power rail 312, connects to the positive or upper power rail 354 of the charging station 25 via input circuit 316. The lower voltage potential rail 318 is further connected to the second input terminal 11 at mid-point power rail 380 of the bridge arrangement of controller 17, between the first series pair of switches 139, 140. As mentioned above, input circuit 316 includes disconnect switches 358 and 360, which may be used by switching mechanism 16 to connect the second input terminals 11 and 12 to the port 4 input terminals 13 and 14. In this embodiment, input circuit 316 includes optional capacitor 66 disposed across the disconnect switches 358 and 360 such that the capacitor can be connected across either the second input (for example, with switch 358 closed) or across port 4 (with switch 360 closed), or common to both (358 and 360 closed). Further, the ability to disconnect capacitor 66 from the second input (and therefore mid-point power rail 380 and winding 19c) is advantageous when operating in the first mode, such that capacitor 66 does not asymmetrically load the phase.

The circuit(s) of boost converter 310 are switched or otherwise controlled by a boost control module 20. The boost control module 20 having a set of respective control lines to each of the switches 139-134 in the bridge arrangement, as depicted above in FIG. 2B. A first input defined by terminals 5 and 6 and a second input defined by terminals 11 and 12 are shown, where, in the present embodiment, the first input is responsible for interfacing with and allowing current transfer with battery pack 3 in the first state (e.g. propulsion mode) and/or the second state (e.g. charging mode), and the second input is responsible for interfacing with and allowing current transfer from the external charging station 25 in the second state (that is, the DC charging state).

The operation of the boost converter 310 is described as follows. Responsive to control signals from module 20, switching mechanism 16 selectively connects terminal 13 of port 4 (and thus power rail 354 of charging station 25) to the second input terminal 11 at mid-point 380 located between MOSFETs 139 and 140 and connected to inductive winding 19c of motor 7. The boost converter 310 may use a lower switch 146 and/or 134 in one or more of the other H-bridges of the bridge arrangement of switches, to draw a boost current from the lower voltage potential power rail 318 (and thus second input terminal 11), supplied by the external DC source of the charging station 25, through the phase windings of motor 7, thereby storing energy in the inductive windings 19c, and 19b (if switch 134 is used) and/or 19a (if switch 146 is used). When the lower switch of the other H-bridge/s (that is, 134 and/or 146) is released or turned off, the stored energy in the inductive windings is released and the boost current is then conducted through the upper free-wheeling diode FWD (anti-parallel diode) of the corresponding upper H-bridge switch 145, 133, 344, 348 to provide a charging current to the battery pack 3 via the higher voltage potential power rail 312 and first input terminal 5. The step-up or boost in voltage potential to the high voltage power rail 312 is regulated or controlled by the boost control module 20 pulse switching the appropriate switches of the bridge arrangement in varying duty cycles, modulating schemes, or switching frequencies to obtain the voltage boost via the motor windings. The control signals from the boost control module 20 may be pulse width modulated (PWM) as appropriate.

In one example, the boost in voltage may be from approximately 400 Volts DC to 800 V DC. It should be appreciated that the DC voltage boost may be varied by adjusting and/or reconfiguring the PWM frequency, duty cycles, or interleaving applied to the lower switches 146, 134 of the bridge arrangement (in the form of multiple H bridges) and the selection of windings within the motor 7.

In other embodiments, input rail 318 (and thus the second input terminal 11) is connected to another half bridge or motor phase winding. For example, the half bridge comprising of switches 145 and 146 at mid-point power rail 381, or the half bridge of 133 and 134 at mid-point power rail 382. An input capacitor 66 selectively coupled by switching mechanism 16 across the second input and/or port 4 is advantageously used to provide an energy buffer to the input of the boost converter, thereby smoothing the current drawn from the charging station 25, providing filtering, reducing electromagnetic interference (EMI) and/or improving electromagnetic compatibility (EMC), and preventing overshoot during boost converter operation. Capacitor 66 provides similar functionality as an output filter when boost converter 310 operates in the bidirectional buck mode. "Pre-charging" the input capacitor 66 may be done by the boost control module 20 by reconfiguring the boost converter 310 to be used in a bidirectional buck mode. That is, by switching the top switches of the H-bridges not connected to the second input (e.g., the H-bridge circuits 31 and 63 in the present embodiment) and using the bottom diodes 346, 350 to provide the buck-current when top switches 145, 133 are in the off-state. The input capacitor 66 may be pre-charged to a voltage lower than the battery pack via the bidirectional buck mode, however this is advantageous. For example, for an 800 VDC the battery pack 3 vehicle, the input capacitor 66 may be pre-charged to 400 VDC to be ready to couple to a 400V prior-art the charging station 25. The boost control module 20 may then re-configure the boost converter 310 back to boosting voltage, once connected to the charging station 25 via input circuit 316. Then boost converter 310 operates to boost the 400 VDC from the charging station 25 to 800 VDC to charge the onboard the battery pack 3. In some embodiments, a voltage sensor on the capacitor 66, or across port 4 terminals 13 and 14, or the second input terminals 11 and 12, may be used for feedback. If an alternate pre-charge is necessary, a dedicated pre-charge system may be used, such as a resistor arrangement. For example, in one mode of operation, switching mechanism 16 closes switch 139 and switch 358 of input circuit 316, and uses a pre-charge circuit deployed in PDU 21 (not depicted in FIG. 3A) to pre-charge both capacitor 65 and capacitor 66. Alternatively, in some embodiments, switching mechanism 16 can use bypass 64 (if fitted) and to pre-charge capacitor 64 without pre-charging capacitor 65 or applying voltage to controller 17. In some cases, the charging station 25 can pre-charge capacitor 66.

In boost converter 310, the vehicle charge communication module 123 may also interact with the boost control module 20 for efficient operation of the boost converter 310. In addition, the pre-charging of the input capacitor 66 and other safety checks prior to connection with the charging station 25 may be facilitated by the boost control module 20 also communicating with the charging station 25 prior to connection.

In some arrangements, boost control module 20 determines (through communication with module 123 and thus charging station 25) that the charging station 25 is capable of charging onboard battery pack 3 directly, and uses switching mechanism 16 to enact a bypass mode. When the dedicated bypass mode is enacted, switching mechanism 16 closes switch 64 and switch 360 and/or the corresponding negative power rail bypass corresponding to switch 64 and bypass route 60 (not depicted in FIG. 3A). In another embodiment, module 20 enters an internal bypass mode with switching mechanism 16 closing switches 360, 358, and switch 139 (and/or body diode 340). Prior to allowing charging to commence in bypass mode, capacitor 66 and/or capacitor 65 may be pre-charged by using previously described methods, for example, by PDU 21, station 25, or by controller 17 acting in a pre-charge mode.

It will be appreciated to those skilled in the art that in the present embodiment and other possible embodiments, the negative terminal of the first input 6, and the negative terminal of the second input 12 are equivalent and may interface to controller 17 at the same location. Therefore, the return charging current need not pass through the negative DC bus power rail 314 of controller 17.

The boost converter 310 of FIG. 3 may also optionally include additional safety and protection devices (not depicted in FIG. 3), for example, current and/or voltage sensors and limiters as well as disconnection devices such as fuses. In some embodiments, the boost converter 310 of FIG. 3A may include a further switching device as part of switching mechanism 16 located within the input circuit 316 to selectively connect and disconnect power rail 318 to and from power rail 312 to provide an alternative second input. The switching mechanism 16 may use this further switching device (and other switching devices of switching mechanism 16) to couple power rail 312 to external source voltage 354 to enable module 20 to act in the first state to provide propulsion for car 1 using energy derived from the charging station 25. Such example use of alternative inputs will be described in later embodiments, for example in reference to the alternative second input 662 of FIG. 6. Such operation of enabling propulsion from an external source has been described earlier in the application.

The boost converter 310, in one operational and configuration mode, may be used to selectively provide tractive effort to the motor 7 using power from the battery pack 3 including a positive or negative traction effort (e.g. accelerating, or regenerative braking). The boost converter in a second mode may also be used to selectively accept the external DC source such as from an external the charging station 25 and boosting the voltage/electric potential to charge an onboard battery pack 3 (onboard DCDC charging). Advantageously the current does not pass through an AC full-bridge rectifier before the motor winding. One of the power rails of the DC inlet or vehicle charging port 4 terminals 13, 14 connects to one of the mid-points of one of the one or more half-bridge drive-circuits or one or more phases or inductive windings of motor 7. In addition, the AC motor is configured to accept or be fed AC currents in the first mode to propulsion or a driving of the vehicle and in the second charging mode DC currents as passed through the motor 7. Typically, the external the charging station 25 is at a lower voltage potential than the onboard the battery pack 3, for example the charging station is less than <500 VDC, and the onboard battery pack 3 may be >500 VDC. The DC input to the converter may have a capacitor, or filter on the input. The capacitor/filter can be connected or disconnected from the inductive winding of a motor 7.

Further, the boost only embodiment of FIG. 3A may operate in bidirectional buck mode to supply one of a regulated voltage or current back to port 4 using energy derived from battery pack 3. This is advantageous, as in embodiments fitted with a boost charge controller expects the external source voltage Vc to be lower than the onboard battery pack 3 voltage Vb. Further, for V2X mode, such as vehicle-to-vehicle (V2V), a further vehicle of the same model and type connected to port 4 at a lower state-of-charge will typically have a lower voltage potential even though the nominal voltage is expected to be the same. This therefore advantageously enables the vehicle with a higher state-of-charge (SOC) (that is, the vehicle with the higher voltage) to be able to actively recharge the discharged vehicle (lower SOC and lower voltage) using controller 17 in a boost configuration. The bidirectional V2X regulated buck mode is achieved by switching mechanism 16 selectively connecting the first input to battery pack 3, and the second input to port 4, and enabling a DC to DC charging state of controller 17. Module 20 then issues PWM to switches 133 and/or 145 to operate in buck mode and regulate at least one of a current or a charging voltage to the output of port 4. This operation is similar to that of the bidirectional buck mode used to pre-charge capacitor 66, but with switching mechanism 16 allowing current to flow out of port 4.

In an alternative embodiment, a CLC input filter or a PI input filter is included in the input stage 316 to the switched bridge arrangement. This filter can be advantageously used to filter the input current from the charging station, reduce EMI or improve EMC, improve the conversion, reduce overshoot and other undesired effects. In further embodiments, use of another type of EMI filter is employed. For example, a filter with both common mode and differential mode filtering. Embodiments with one or more capacitors, including capacitors to chassis to lower RF, one or more chokes commonly wound or otherwise, impedance stabilization, or the like.

Figure 3B:
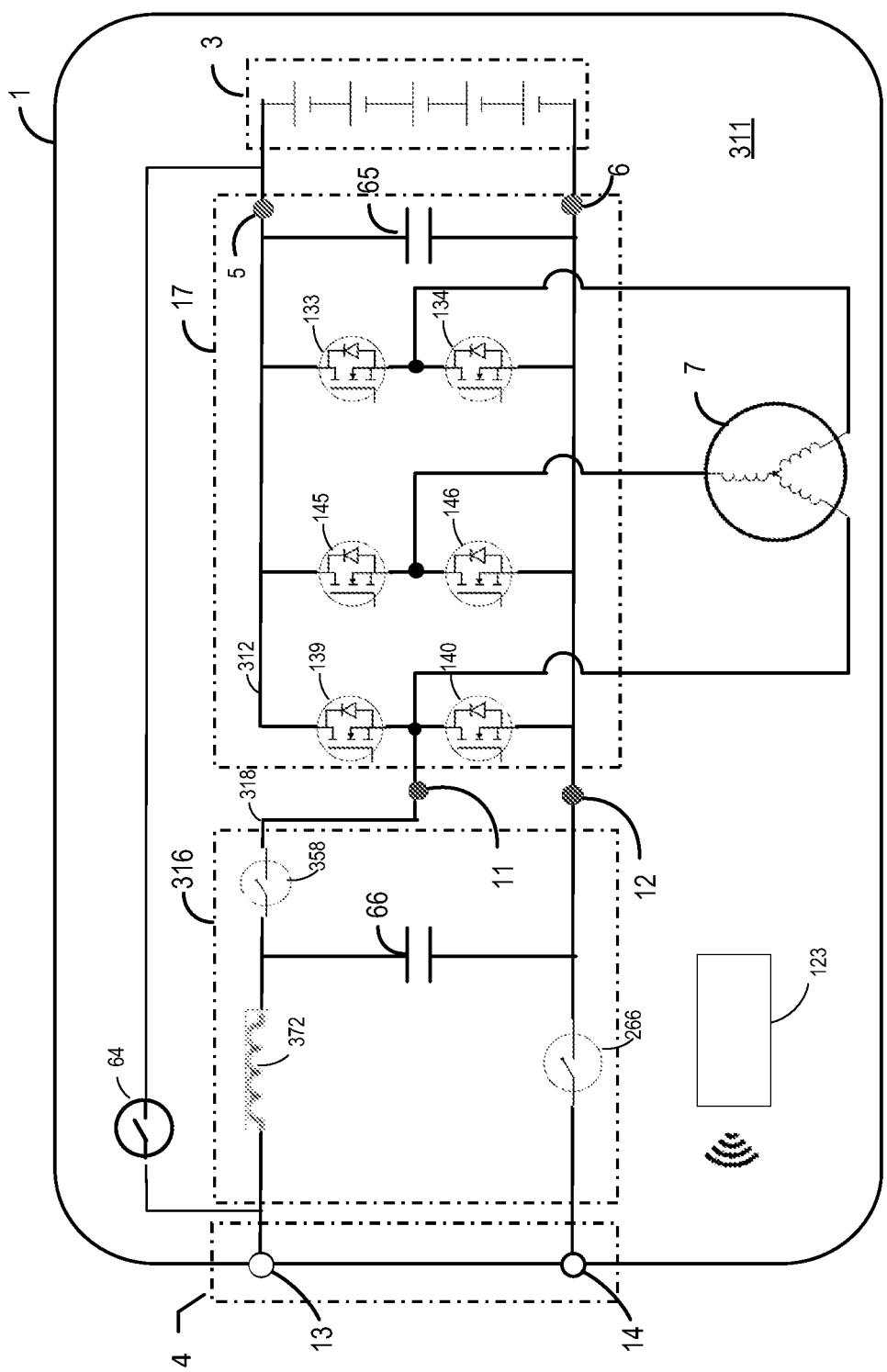

Referring now to FIG. 3B, an example charging system 301 shows boost converter 311, as an alternative embodiment of boost converter 310 when charging battery pack 3 from charging station 25. In this embodiment, the controller is capable of the boost and bidirectional buck modes as described in reference to FIG. 3A. Further, FIG. 3B includes a more robust filter in input circuit 316, which may be designed based one or more of the expected parameters of the external charging source including expected input voltage, impedance, resonance, current, cable length, common mode currents, differential mode currents, noise, transient response, and the like. In this embodiment, input 316 includes, in addition to the capacitor 66 of FIG. 3A, a series inductor or choke 372, which may serve to filter the input charging current. Further, the filter may be designed to improve RF, EMI, EMC, or other properties. In some embodiments, the filter and switching mechanism 16 selectively connect one or more of the power-rails to chassis via a capacitor in a star or other impedance network. In another embodiment, controller includes a more robust filter on the input for EMI/EMC/RF compliance, etc. For example, the inclusion of a LC, LCL, CLC, common mode or differential mode chokes, impedance matched circuits, star capacitor network or the like. Bypass 64 may be employed to offer a bypass route 60 to avoid both the bottleneck of using an internal bypass of controller 17 (e.g., via switch 139) and to avoid the effect of the filter arrangement on the externally regulated charging current. In another embodiment, bypass 64 may be implemented such that the bypass circuit 60 does not bypass the input filter circuit.

Figure 4:
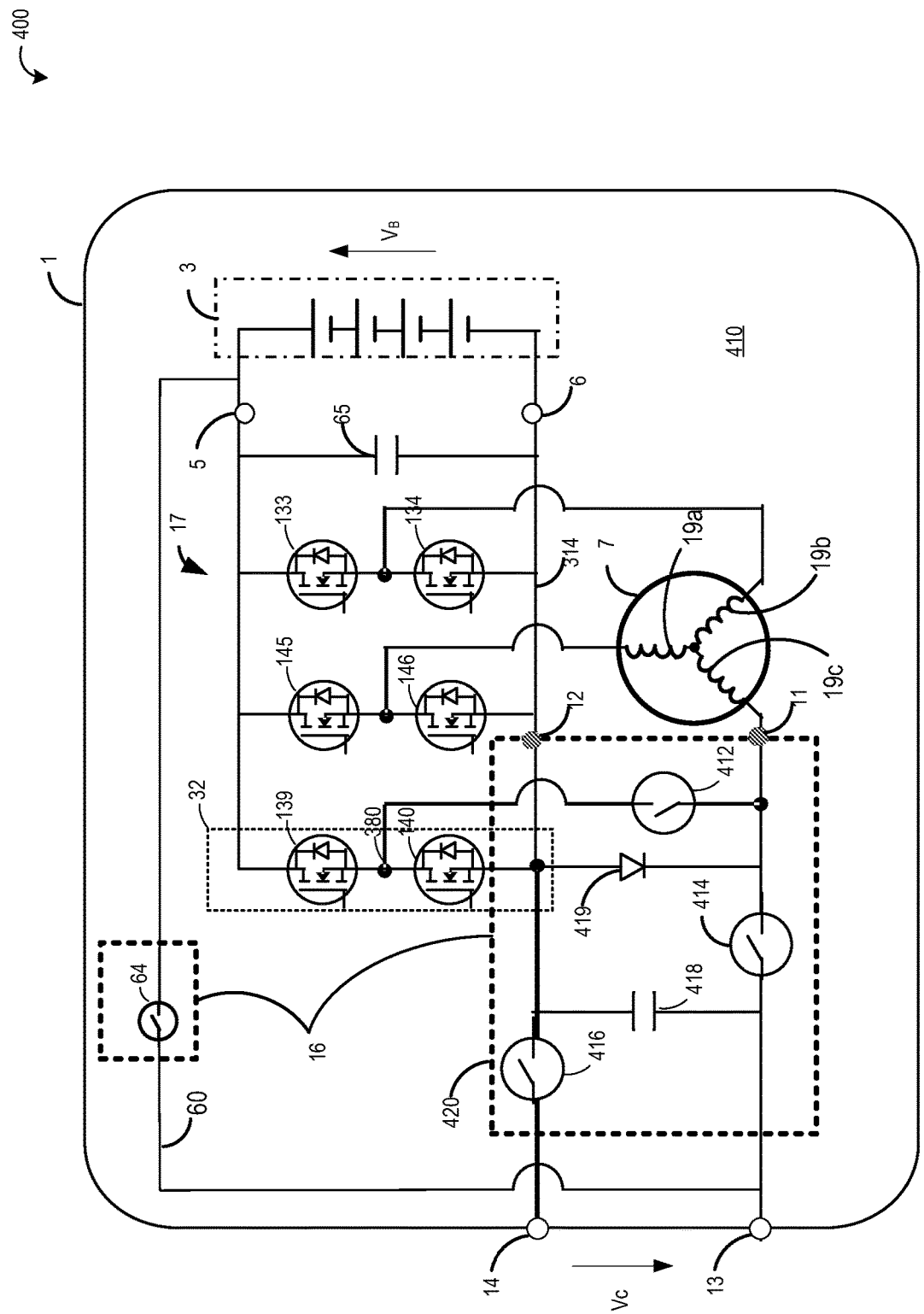
FIG. 4 is an alternative schematic configuration to a drive controller for a three phase motor where, during charging mode, one motor phase is disconnected from its associated drive circuit and connected to the external source via a switching mechanism.

Turning now to FIG. 4, an example onboard charging system 400 shows boost converter 410, as an alternative embodiment of boost converter 310 where the switching mechanism 16 includes a bypass switch 64 on a bypass circuit 60 (e.g., the bypass circuit 60 and bypass switch 64 of FIG. 2A) and an input circuit 420. The input circuit 420 of boost converter 410 has a switch 412 for disconnecting the phase winding 19c of motor 7 from the mid-point power rail 380 of drive circuit 32. In this embodiment, the positive second input power rail 11 is connected directly to phase 19c, and the negative second input power rail 12 is connected to negative power rail 314. In the first mode of operation (e.g., propulsion), switching mechanism 16 connects phase 19c to mid-point 380 via switch 412, and module 20 (not shown in FIG. 4) issues commands to each of the drive circuits of the controller 17 to generate either a positive or negative torque in motor 7. In the second mode of operation (e.g., charging mode), switching mechanism 16 may disconnect phase 19c from mid-point 380 via switch 412, and connect phase 19c to positive terminal 13 of port 4 via switching mechanism 414. In charging mode, circuits 31 and 63 are able to operate as boost circuits to regulate a charging current or voltage to battery pack 3 from an external source such as charging station 25. The system thereby operates as a boost converter similar to that presented in FIG. 3A.

Input circuit 420 may also include a diode 419 disposed between the negative power rail 314 and the second input terminal 11 connected to phase 19c. In embodiments with diode 419 fitted, switch 414 is able to act as a buck switch for enabling module 20 to regulate a charge when $V_C$ (that is, the voltage of charging station 25) is of lower potential than $V_B$ (that is, the voltage of the battery pack 3). Therefore, in embodiments fitted with diode 419, switch 414 is preferentially employed as a high frequency switching device such as a MOSFET or other semiconductor device. In other embodiments, diode 419 is the anti-parallel FWD of a MOSFET or other semiconductor switch 419, and module 20 may issue PWM to switch 419 to act in a bidirectional boost function with the freewheeling current flowing through the anti-parallel FWD body diode of switch 414 (exemplarily implemented as back to back IGBTs).

Switching mechanism 16 may operate switch 412 and MOSFET 139 (or its FWD) to selectively enable an internal bypass, or use switch 64 via dedicated bypass route 60. In some embodiments without internal bypass, switches 414 and 412 may be interlocked or replaced by a Single Pole Double Throw (SPDT) switch such that either one may operate at one time, and phase 19c (and second input terminal 11) may be connected either to terminal 13 of port 4, or to mid-point power rail 380. In another embodiment, second input terminal 12 is connected to mid-point 380, and switching mechanism 16 may employ switch 140 to be ON during the second state (e.g., charging mode). Accordingly, the switched bridge arrangement section of the negative DC bus rail of the 3-phase controller would operate at a different high voltage potential. In other embodiments, switching mechanism 16 controls switch 139 (or body diode 340), 412, 414, and 416 to enact an internal bypass mode such that external charger 25 can charge pack 3 without requiring a dedicated bypass route 60 or switch 64.

Thus, in general terms, embodiments of the invention are available with one or up to all of the following capabilities:
- To drive a motor from a first power source during the first state.
- To drive the motor from a second power source during the first state.
- To drive the motor from either or both of the first power source and the second power source during the first state.
- To charge either or both of the first power source and the second power source from current generated by the motor, where those power sources are rechargeable power sources.
- To charge the second power source from the first power source during the second state, where the second power source is a rechargeable power source.

To charge the first power source from the second power source during the second state, where the first power source is a rechargeable power source.

That is, for those embodiments making use of two rechargeable energy sources and a motor, and offering all of the above capabilities, the controller for the motor provides full bidirectional energy flows between the motor and the energy sources. It will be appreciated that the system is bidirectional, in that circuits used for regulating a buck operation in one direction may equally be used for regulating a boost operation in the reverse direction. In the same way, the system is fully input and output agnostic, where either the battery pack 3 or the charging station 25 can be presented as either $V_B$ or $V_C$. In other words, the boost converter 310 presented in FIG. 3A can operate in boost mode when charging from the infrastructure to EV, and operate in buck mode when charging from the EV to infrastructure, and in an equivalent embodiment of boost-converter 310 but with differently configured DC input connections, boost-converter 310 may operate to buck from the infrastructure to EV and boost from the EV to infrastructure. In other words, controller 17 provides a fully bidirectional DC-DC converter disposed electrically between the two sources of energy (the on-board batteries, and the external source), and a DC-DC, DC-AC or AC-DC converter between either of the sources and the motor.

Figure 5:
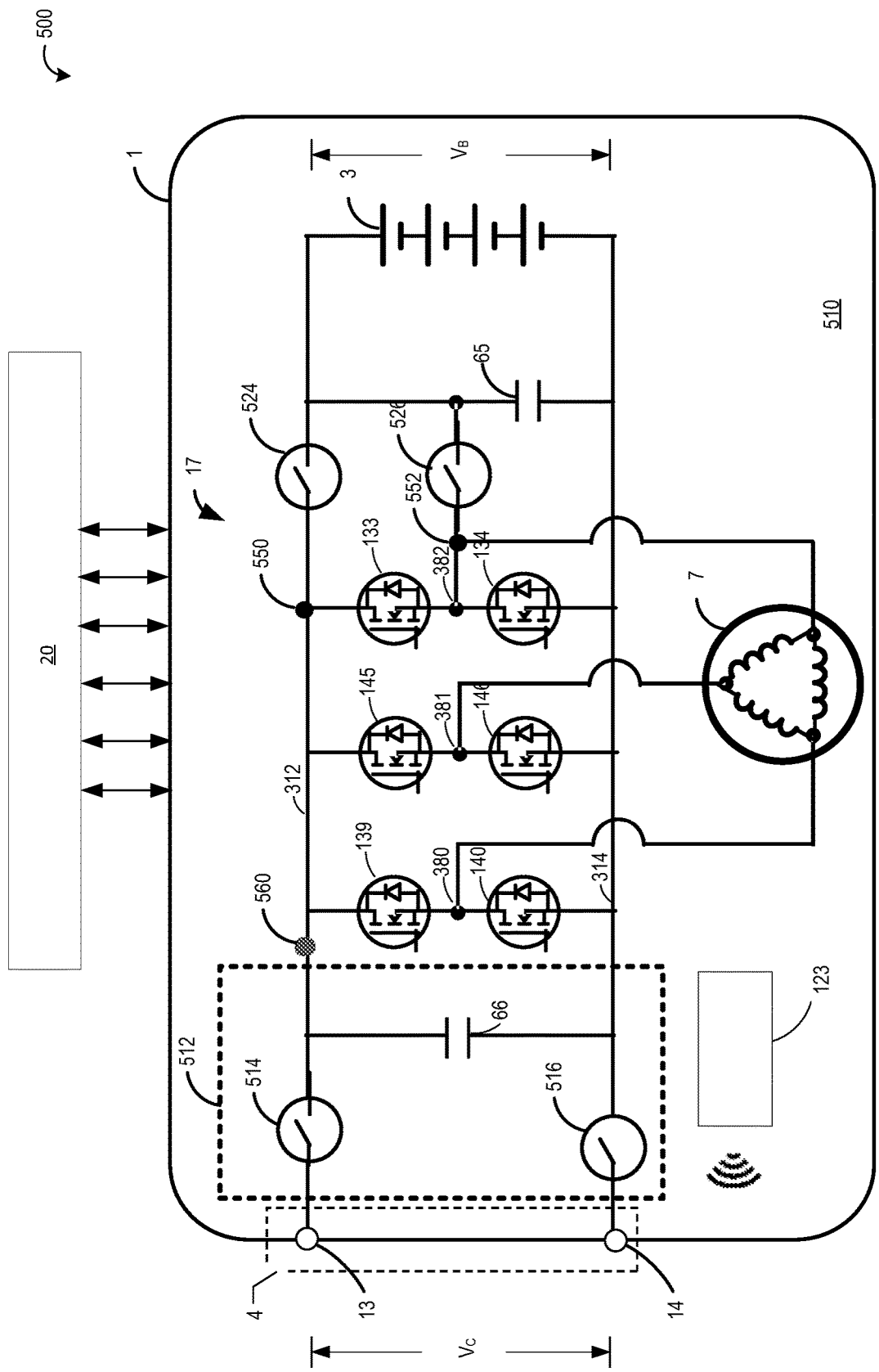
FIG. 5 is a schematic representation of an embodiment of a drive controller that provides a DC to DC buck mode charger that may be applied or configured to the electric vehicle of FIG. 1.

Turning now to FIG. 5, an example onboard charging system 500 shows a buck mode charger 510 is shown as an alternative arrangement to boost converter 310 of FIG. 3A for providing DC to DC charging of battery pack 3 of voltage $V_B$, from an external DC source at port 4 at voltage $V_C$, wherein the external voltage $V_C$ is higher than the onboard voltage $V_B$. In this embodiment, the inputs of controller 17 are configured to operate in buck or step-down mode when charging pack 3 from port 4. Buck mode charger 510 includes a three phase motor 7 with three inductive wirings in a delta formation, however, in other embodiments, a wye/star configuration may be used. Buck mode charger 510 may include an input circuit 512, which may include protective switch 514, protective switch 516, and capacitor 66. The protective switches 514 and 516 and capacitor 66 may be the same as or similar to protective switches 358 and 360, respectively, and capacitor 66 of FIG. 3A. The switching mechanism (e.g., switching mechanism 16 of FIG. 2C) may include switches 524 526, 514, 516 and PDU 21 (if fitted).

Buck mode charger 510 may include a first input 550 at power rail 312 for interfacing with the positive power rail of the battery pack 3 in the first state (e.g., propulsion mode) and an alternative first input 552 at mid-point power-rail 382 for interfacing with the positive power rail of battery pack 3 in the second state (e.g., in DC charging mode). Buck mode charger 510 may include a second input 560 for interfacing with port 4 (and thus charging station 25) in the second mode. In the first mode of operation, the switching mechanism 16 may connect battery pack 3 to the first input via switch 524 in a closed position, and disconnect it from the alternative first input 552 via switch 526 in an open position. Similarly, switching mechanism may disconnect port 4 (and thus charging station 25) from the second input 560 via switches 514 and 516. After communication data is received, module 20 may determine to enter the second state (e.g., DC charging). In the second state, switching mechanism 16 connects battery pack 3 to the alternative first input 552 via closing switch 526 and disconnects battery pack 3 from the first input 550 by opening switch 524, and connects the second input 560 to port 4 by closing switches 514 and 516. Module 20 may then operate switches 139 and/or 145 as buck switches either collectively, inversely, interleaved, or otherwise to regulate at least one of a charging current or charging voltage to battery pack 3 from port 4. It will be appreciated to those skilled in the art that the buck operation operates similarly to the bidirectional buck operation of FIG. 3A. Similarly, it will be appreciated by those skilled in the art that alternative first input 552 of the present embodiment is similar to the second input 11 of FIG. 3A, and the second input 560 of the present embodiment is similar to the first input 5 of FIG. 3A. That is, the buck mode charger 510 can be viewed as operating equivalently in the second state to the boost converter 310 of FIG. 3A, but with the input connections to voltage sources of pack 3 and port 4 reversed. Further, it will be appreciated by those skilled in the art that buck mode charger 510 operates in the second state similarly to buck-boost mode charger 210 when operating in buck charging mode in the alternatively described configuration, with switch 48 disposed between drive circuits 31 and 63. That is, in both buck-boost mode charger 210, and buck mode charger 510 with alternative switch 48 location operating in buck mode, circuits 32 and 63 may operate as buck switches for regulating a charging current or voltage between port 4 and battery pack 3. It will therefore be appreciated by those skilled in the art that switch 133 may be operated the same or a similar way to switch 48 of buck-boost converter 210 of FIG. 2A in charging modes when $V_C > V_B$. Where applicable, the features and operation described with respect to previous figures also apply to the FIG. 5 buck mode charger 510.

One benefit of the DC-DC buck mode charger 510 is that it may also provide boost conversion when supplying a current in reverse, for example, when exporting power from the vehicle to an external DC source or sink in V2X mode. During bidirectional boost conversion, the voltage potential of the battery pack 3 is raised when supplying power to an external source (e.g., charging station 25 of FIGS. 2A and 3A). Capacitors 65 and 66 provide the advantage of improving EMI/EMC and voltage ripple imposed at the first input 550 and second input 560. In this mode, module 20 may operate switches 140 and/or 146 as boost switches either collectively, inversely, interleaved, or otherwise to regulate at least one of a charging current or charging voltage to port 4 from battery pack 3.

Module 20 may selectively operate buck mode charger 510 in internal bypass mode with switching mechanism 16 closing switches 514, 516, and 524 to enable charging station 25 to charge pack 3 directly. It will be appreciated by those skilled in the art that the first input 550 and the second input 560 along power rail 312 are equivalent, as with the corresponding negative terminals of the first and second inputs along power rail 314. Therefore, in bypass mode, the charging current supplied by charging station 25 to battery pack 3 advantageously need not flow through either of the positive or negative DC power rails (being 312 and 314 respectively) of controller 17.

Furthermore, it will be appreciated to those skilled in the art that any of the proposed converters may include both a first input and/or an alternative first input, and a second input and/or an alternative second input. Wherein, in some embodiments, the first and second inputs are used to selectively connect an DC source to the positive power rail of the drive circuits (e.g., power rail 312 in FIGS. 3A and 5), and wherein the alternative first input and the alternative second input are used to selectively connect an external DC source to a mid-point power rail between at least two switches of a half bridge drive circuit (being like the mid-point power rail 380 in FIG. 3, or 552 in FIG. 5). In this way, an embodiment of a controller is able to described which may selectively enable a buck charging mode (that is, charging battery 3 from an external source of higher voltage potential), or which may selectively enter a boost charging mode (that is, charging battery 3 from an external source of lower voltage potential). It will also be appreciated that a first input and a second input may be common, for example in FIG. 5 where switch 48 is not employed. Similarly, an alternative first input and an alternative second inputs may be common.

The use of terminology of an input and respective alternative input may be interchangeable in embodiments. The use of terminology for a first and second input does not imply an order or preference for such inputs, nor does it imply a preferred direction of current or power flow, or the ratio of imposed voltages to be applied at the inputs. Similarly, the use of terminology for a respective first input and an alternative input need to imply a preference for interfacing with such inputs, nor imply the type of load or voltage level to be applied to each input.

Figure 6:
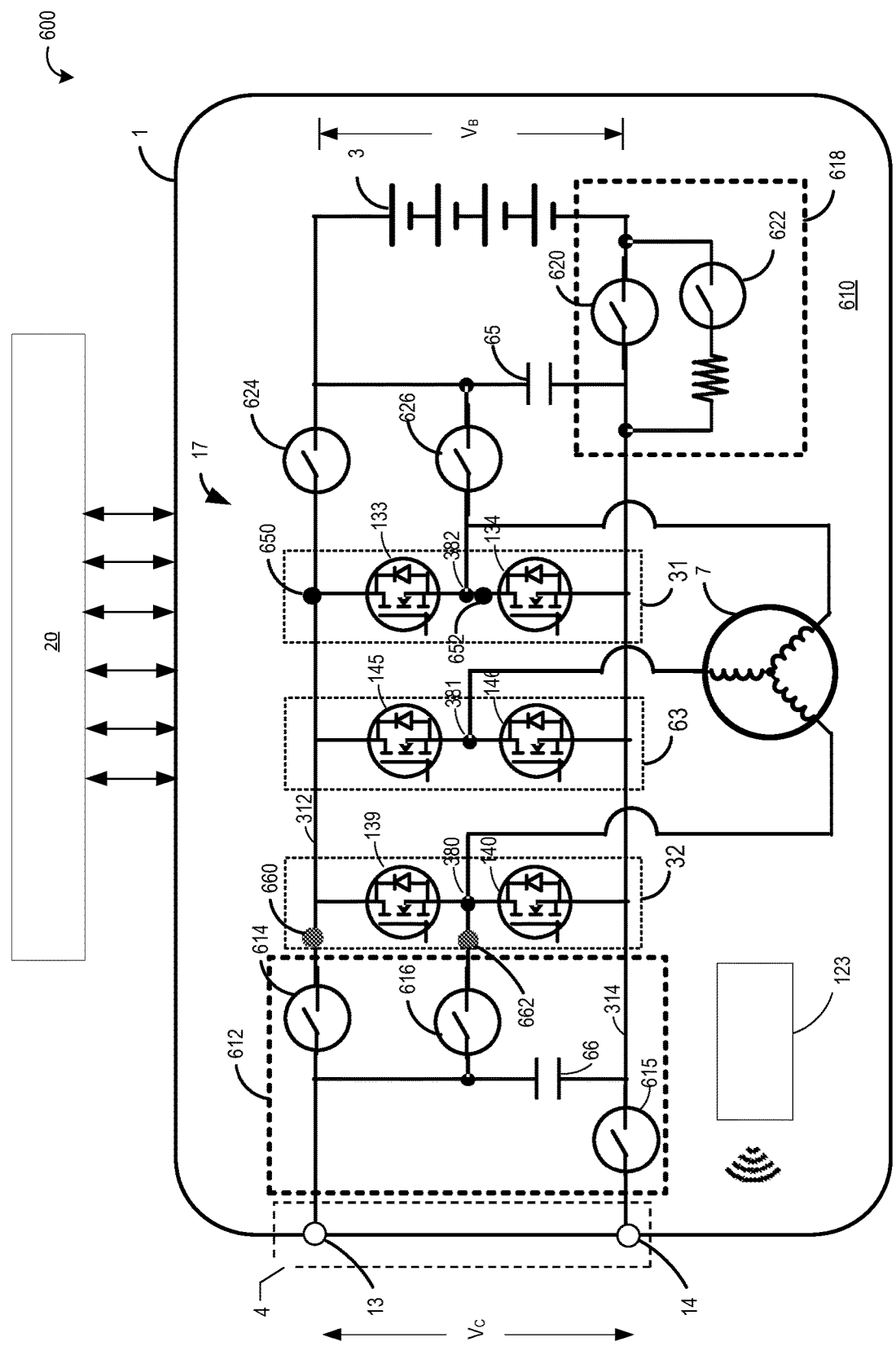
FIG. 6 is a schematic representation of an embodiment of a drive controller that provides a DC to DC boost converter that may be applied or configured to the electric vehicle of FIG. 1 to provide selective boost or buck modes.

Turning now to FIG. 6, an example onboard charging system 600 shows a bidirectional buck/boost charger 610 as an alternative arrangement to the buck mode charger 510 of FIG. 5 for selectively providing buck or boost DC to DC charging of battery pack 3. In this embodiment, buck/boost charger 610 may act as a buck charger for interfacing with a charging station with a voltage Vc sufficiently higher than the pack voltage Vb. Similarly, buck/boost charger 610 may present as a boost charger for interfacing with a charging station with a voltage Vc sufficiently lower than the pack voltage $V_B$. Buck/boost charger 610 includes a three phase motor 7 with three inductive wirings in a wye formation, but may alternatively be implemented with a delta configuration. Similar to buck mode charger 510, buck/boost charger 610 may include an input circuit 612, which may include protective switch 614, protective switch 615, protective switch 616, and capacitor 66. The protective switches 614, 615, and 616 and capacitor 66 may be the same as or similar to protective switch 514 and protective switch 516, respectively, and capacitor 66 of FIG. 5. As shown in FIG. 5, the switching mechanism (e.g., switching mechanism 16 of FIG. 2C) may include a pre-charge circuit 618, which may include switches 620 and 622. Additional switches 624 and 626 may also be included. The operation of the switches is discussed in further detail below. Where applicable, the features and operation described with respect to FIG. 3A and FIG. 5 also apply to the FIG. 6 buck/boost charger 610.

In a first state of operation, module 20 uses switching mechanism 16 by closing switches 624 (and switches of PDU 21 if fitted) and 620 to connect battery pack 3 to controller 17 at a first input 650 at power rail 312 to enable propulsion of car 1. During this mode, switching mechanism 16 may also close switch 614 such that capacitor 66 is applied across the power rails 312 and 314 of the drive circuits to provide further filtering. Pre-charge circuit 618 may form part of PDU 21 within battery pack 3, and switches 622, 624 and 614 may be closed prior to switch 620 in order to pre-charge capacitors 65 and 66 via the resistance of pre-charge resistor 623. Once capacitors 65 and/or 66 are sufficiently charged, switching mechanism may close switch 620.

In an alternative mode of operation of the first state, after module 123 receives communication data that external power source 25 is connected to port 4, switching mechanism 16 may use switch 614 and 615 to connect port 4 to controller 17 at the second input 660 at power rail 312, such that current derived from charging station 25 may be used for vehicle propulsion (positive or negative torque). During this mode, switching mechanism 16 may also close switch 624 such that capacitor 65 is applied across the power rails 312 and 314 of the drive circuits to provide further filtering. It will be appreciated by those skilled in the art that the first input 650 and the second input 660 are equivalent and may interface with controller 17 at a single location.

After a first charging data is received by module 123, module 20 may enable buck/boost charger 610 to enter the second state to charge battery pack 3 from charging station 25. Buck/boost charger 610 may import power to charge battery pack 3 from port 4 (that is, DC charging mode), or export power to port 4 (and thus charging station 25) from battery pack 3 (that is, bidirectional mode). Module 20 uses the first charging data to determine whether buck/boost charger 610 should operate in buck import/charging mode, boost import/charging mode, bidirectional/export buck mode, bidirectional/export boost mode, or bypass mode.

If the chosen mode is to operate in import buck or export boost modes (that is, similar to the operation of buck converter 510), module 20 closes switch 614, 615, 626, and 620, and maintains switches 616 and 624 open. Switch 622 can be used to pre-charge capacitor 65 and/or 66 prior to the closing of switches. Capacitor 66 can also be pre-charged after enacting the switching states, but prior to closing of switch 615, by using the bidirectional boost function to establish a voltage upon capacitor equal to that of the voltage Vc presented at port 4, prior to closing switch 615 and entering the second state. Therefore, battery pack 3 is presented at the alternative first input 652 at mid-point power rail 382, and port 4 is presented at the second input 660 at power rail 312. Module 20 may then operate circuits 32 and/or 63 as buck switches (that is, PWM applied to switches 139 and/or 145 respectively) to enable buck import mode, or operate circuits 32 and/or 63 as boost switches (that is, PWM applied to switches 140 and/or 146 respectively) to enable boost export mode.

If the chosen mode is to operate in import boost or export buck modes (e.g., similar to the operation of boost converter 310), module 20 may close switch 616, 615, 624, and 620, and maintains switches 614 and 626 open. Switch 622 may be used to pre-charge capacitor 65 and/or 66 prior to the closing of switches. Capacitor 66 can also be pre-charged after enacting the switching states, but prior to closing of switch 615, by using the bidirectional/export buck function to establish a voltage upon capacitor equal to that of the voltage Vc presented at port 4, prior to closing switch 615. Therefore, battery pack 3 is presented at the first input 650 at power rail 312, and port 4 is presented at the alternative second input 662 at mid-point power rail 380. Module 20 may then operate circuits 31 and 63 as buck switches (that is, PWM applied to switches 133 and 145 respectively) to enable buck export mode, or operate circuits 31 and 63 as boost switches (that is, PWM applied to switches 134 and 146) to enable boost import mode.

If the chosen mode is to operate in bypass mode, module 20 may close 614, 624, 615 and 620 of switching mechanism 16 to enable charging station 25 to charge battery pack 3 directly. A pre-charge function by pre-charge circuit 618 or by controller 17 may be enacted in advance. Therefore, battery pack 3 is interfaced to the first input 650, and port 4 is interfaced to the second input 660. In such an embodiment, the first and second inputs are equivalent, and therefore no current is passed through controller 17, and thus a dedicated bypass route 60 is not employed.

In another embodiment, the alternative first input and the alternative second inputs are interfaced at the same midpoint power rail and thus equivalent, for example, at midpoint power rail 380. In such an embodiment, module 20 may operate in bypass mode by enabling current to be passed through the alternative first input 652 to alternative second input 662.

It will be appreciated in light of the teaching herein that for controller 17 to act as a boost charger for charging battery pack 3 from port 4, battery pack 3 is connected across a first input which is parallel to or disposed across the drive circuits and/or capacitor 65 of controller 17. Further, it will be appreciated that between the power rail connected to the active first input (either first or alternative first), and the power rail of the active second input (second or alternative second), there exists at least one of a switching device which is held open in the second state (e.g. switch 48 in FIG. 2A, switch 139 in FIG. 3A, switch 133 in FIG. 5, etc). Further, the same switching device(s) may be closed or used (e.g. applied with PWM) during the first state.

In an embodiment, in the second state, the DC current drawn by the at least one of the power rails is a DC charging current from the further DC energy source that is at least in part directed through at least one of the one or more windings and regulated by at least one of the one or more corresponding drive circuits. It will be appreciated that in all embodiments of the invention, that the current through motor windings when operating in the second state is DC.

In embodiments, a voltage sensor may be placed across both capacitor 65 and capacitor 66 such that the voltage differential of the input and output source can be determined, and used as part of the buck, boost, or buck-boost mode selection, as well as a feedback loop in the control algorithm. This sensor may be used when pre-charging capacitor 66 to a specific voltage value from the first input source (onboard battery) prior to closing the input circuit and connecting the capacitor to the external source. In other embodiments, a voltage sensor is placed instead or in addition across the input port 4 (terminals 13 and 14) such that the external voltage can be known before closing the input circuit 75. In other embodiments, the external voltage is communicated by the communicated modules, and no voltage sensor is used on the input port 4 or capacitor 66.

It will be appreciated that in all embodiments, the currents through a balanced machine are balanced (no zero sequence currents), and when operating in the charging mode the inductive phases can be operated in series (primarily wye configuration), or parallel (primarily delta), or a combination of both.

In some embodiments, a third input is employed for interfacing with a single or three-phase AC source, and an input circuit is employed to actively rectify said AC source to provide a DC source at the second input (for example, terminals 11 and 12). The active rectifier may also operate as a bidirectional inverter, such that controller 17 and the bidirectional inverter export an AC power to the third input (for example, in V2G mode). It will be appreciated that even when the input source is AC (such as received at the third input), the voltage applied to the second input is always DC. In some embodiments, the third input may be designed to accept either an AC or DC source, or the third input may be designed to accept high frequency AC (e.g., from a wireless transducer).

Figure 7:
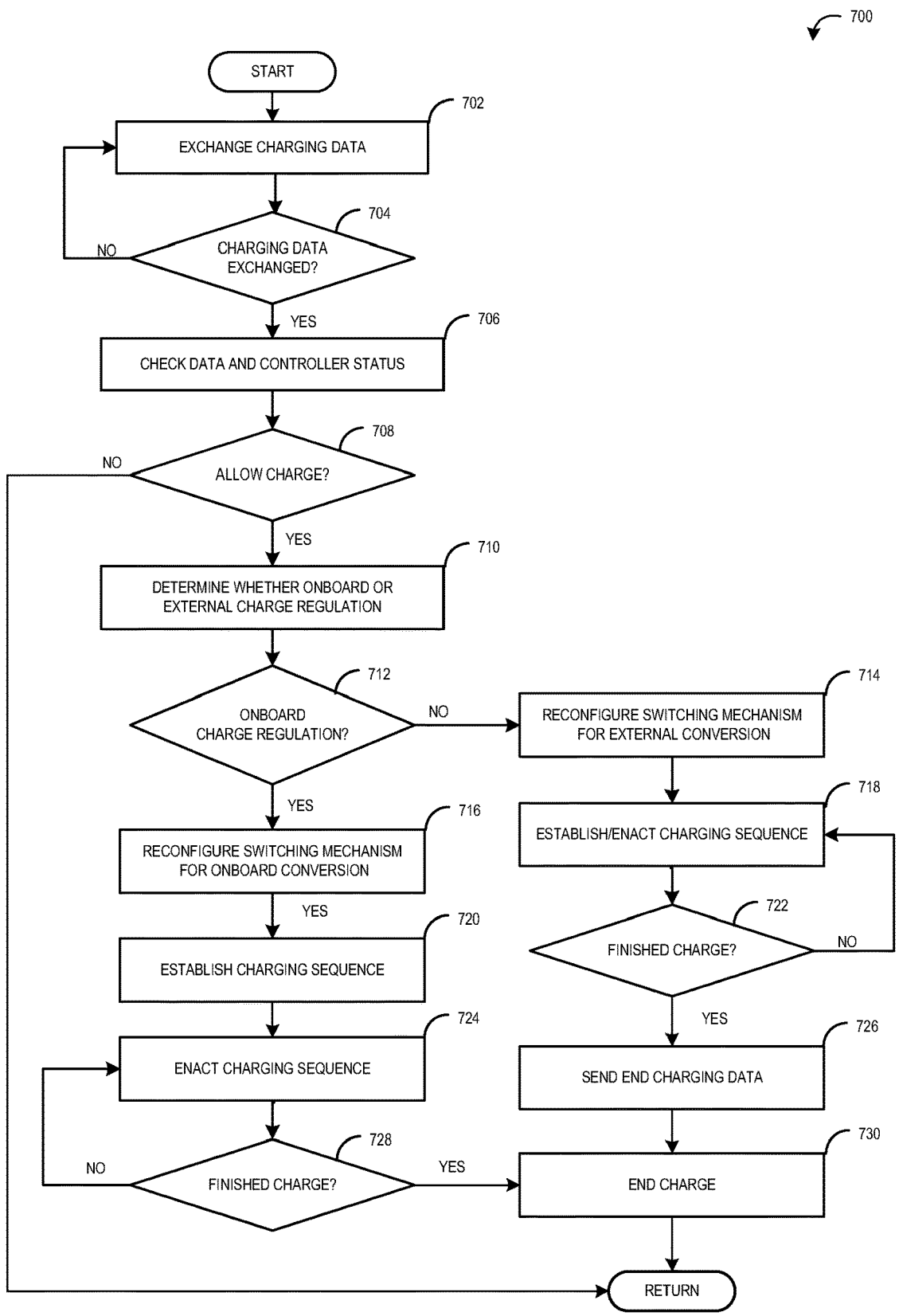
FIG. 7 is a flowchart illustrating an example method for charging an electric vehicle where onboard charge conversion is handled via a switching mechanism.

Referring now to FIG. 7, an example method 700 describes, for an electric vehicle such as car 1 of FIG. 1, a process by which charge conversion is handled via a switching mechanism. Instructions for carrying out method 700 may be executed by a controller such as the drive controller 15 or 17 of FIGS. 1, 2A, 3A, 4, 5 and/or 6. In some embodiments, the controller may also be the same as or similar to the control module 20 of FIG. 1.

At 702, method 700 includes exchanging charging data with an external energy source. The external energy source may be the same as or similar to charging station 25 of FIG. 1. As described above in reference to FIG. 2A, the charging data may be transmitted from a communication module of the external energy source (e.g., communication module 122 of charging station 25) to a communication module of the electric vehicle (e.g., communication module 123 of car 1), or the charging data may be transmitted from the communication module of the electric vehicle to the communication module of the external energy source. The charging data may be a pilot signal, proximity sense, HVIL, voltage sense, and/or serial/parallel/differential data. The charging data may be the same as or similar to the first charging data or the second charging data described in relation to FIG. 2A. For example, the charging data exchanged may include the state of charge, energy capacity, voltage, voltage limits, current, current limits, and/or other characteristics of the external energy source, which may be transmitted from the external energy source to the electric vehicle. The charging data exchanged may also include the maximum current or power able to be drawn by the electric vehicle or supplied by the charging station, or other characteristics of the electric vehicle, which may be transmitted from the electric vehicle to the external energy source.

At 704, method 700 includes determining whether the charging data has been exchanged. If the charging data is not exchanged at 704, method 700 proceeds back to 702, and the controller continues to wait until the exchange of the charging data has been completed. If the charging data is received at 704, method 700 proceeds to 706.

At 706, method 700 includes checking the charging data and controller status in order to determine whether to allow the charge. For example, the controller may verify that the vehicle is stationary and that the controller is available for use in the second state, within temperature, voltage, current, or other limits. The controller may also determine the compatibility between the external energy source and the electric vehicle. For example, the controller may determine from the charging data whether the external energy source has sufficient power to supply an effective charge to the electric vehicle, or whether the external energy source has a compatible voltage with the electric vehicle, or it may determine from the charging data the maximum current that can be drawn by the electric vehicle from the external energy source, or the status of the charge in the onboard energy supply of the electric vehicle (e.g., the battery pack 3 of car 1), or other similar characteristics for charging the electric vehicle from the external energy source.

At 708, method 700 includes determining whether to allow the charge. If at 708 the controller determines that the charge is not to be allowed, method 700 returns. If at 708 the controller determines that the charge is to be allowed, method 700 proceeds to 710. At 710, method 700 includes determining whether the charge being regulated is an onboard or external charge. If at 712 it is determined that the charge being regulated is an onboard charge, method 700 proceeds to 716. At 716, method 700 includes reconfiguring a switching mechanism for the appropriate onboard conversion. The switching mechanism may be the same as or similar to the switching mechanism 16 of FIG. 2C. This procedure may include pre-charging the one or more capacitors included with the controller before connecting the relevant controller input to the input port via the switching mechanism. The procedure may also include waiting for or forcing the vehicle to stop, or disconnecting the motor from the wheels so that the charging sequence is not impacted by the rotation of the wheels of the vehicle. Once the switching mechanism has been reconfigured for online conversion at 716, method 700 proceeds to 720, where method 700 includes establishing the charging sequence. Establishing the charging sequence may include sending data from the controller to the external energy source and/or receiving data from the external energy source or battery management system (BMS) e.g. 22, as well as performing one or more steps in a procedure to prepare the electric vehicle for charging. For example, establishing the charging sequence may include determining and establishing a carrier frequency, populating appropriate values for a control loop (e.g. PI controller), and providing an inrush current limiting function or ramp up function to begin drawing a load current from the external source to apply to the onboard battery pack. At 724, method 700 includes enacting the charging sequence established at 720. Enacting the charging sequence may entail proceeding within a control loop to regulate either a constant charging current (CC) or a constant charging voltage (CV) for onboard battery pack. The controller may use data received by the BMS, and/or any data received from the external energy source, to create a target set point current (CC) or voltage (CV) within the appropriately determined limits to charge the onboard battery pack. The controller may apply the set point current or voltage to a feedforward or feedback control element to determine the appropriate duty cycle and pulse-width modulation to apply to each of the drive circuits. This step may also include sending a charging data request or otherwise maintaining communication with the external energy source.

At 728, method 700 includes determining whether the charging of the electric vehicle has finished. If at 728 is determined that the charging of the electric vehicle has finished, method 700 proceeds to 730, where method 700 includes ending the charge, in an ordered shutdown thereby making the system safe and/or idle, and method 700 returns.

Alternatively, if at 712 it is determined that the charge being regulated is not an onboard charge, method 700 proceeds to 714. At 714, method 700 includes reconfiguring the switching mechanism for external conversion. Reconfiguring the switching mechanism for external conversion may include bypassing one or more boost/buck conversion circuits to allow a direct connection between the external energy source and the electric vehicle. For example, in the embodiments illustrated in FIGS. 2A and 3A, the bypass switch 64 may be closed to allow an external source to connect directly with the battery pack 3 via bypass circuit 60. Alternatively, the one or more boost/buck conversion circuits may be bypassed during charging mode by closing one or more switches (e.g., switches 90, 92, 48, etc. of FIG. 2A). In other embodiments, reconfiguring the switching mechanism for external conversion may not include bypassing the one or more boost/buck conversion circuits to allow a direct connection between the external energy source and the electric vehicle. The controller may also choose to connect and pre-charge capacitor 66 and/or capacitor 65 to the voltage of the onboard battery (or another voltage) in preparation of connection of the external source.

Once the switching mechanism has been reconfigured for external conversion at 714, method 700 proceeds to 718, where method 700 includes establishing and enacting a charging sequence as described above in reference to 720 and 724, at which point the external energy source initiates the charging of the electric vehicle. At 722, method 700 includes determining whether the charging of the electric vehicle has finished. This may be done using communication data received from the BMS or external source, or using other feedback or sensors accessible by controller. If at 722 it is determined that the charging of the electric vehicle has finished, method 700 proceeds to 726. At 726, method 700 includes sending a request to the external source to end the charging event in an end charging data packet. After the end charging data has been sent to the external energy source, at 730, method 700 includes ending the charge, and method 700 returns.

Turning now to FIGS. 8-14, while the above embodiments have been described with reference to a single phase or three phase examples, attention is now directed to motors having a different number of phases. It should also be appreciated that for implementations with other than three phases, the controller may have other than three associated drive circuits, or multiple converters (e.g., controllers). For example, controller 17 and controller 18 may be used to control multiple motors simultaneously in either the first state or the second state.

Figure 8:
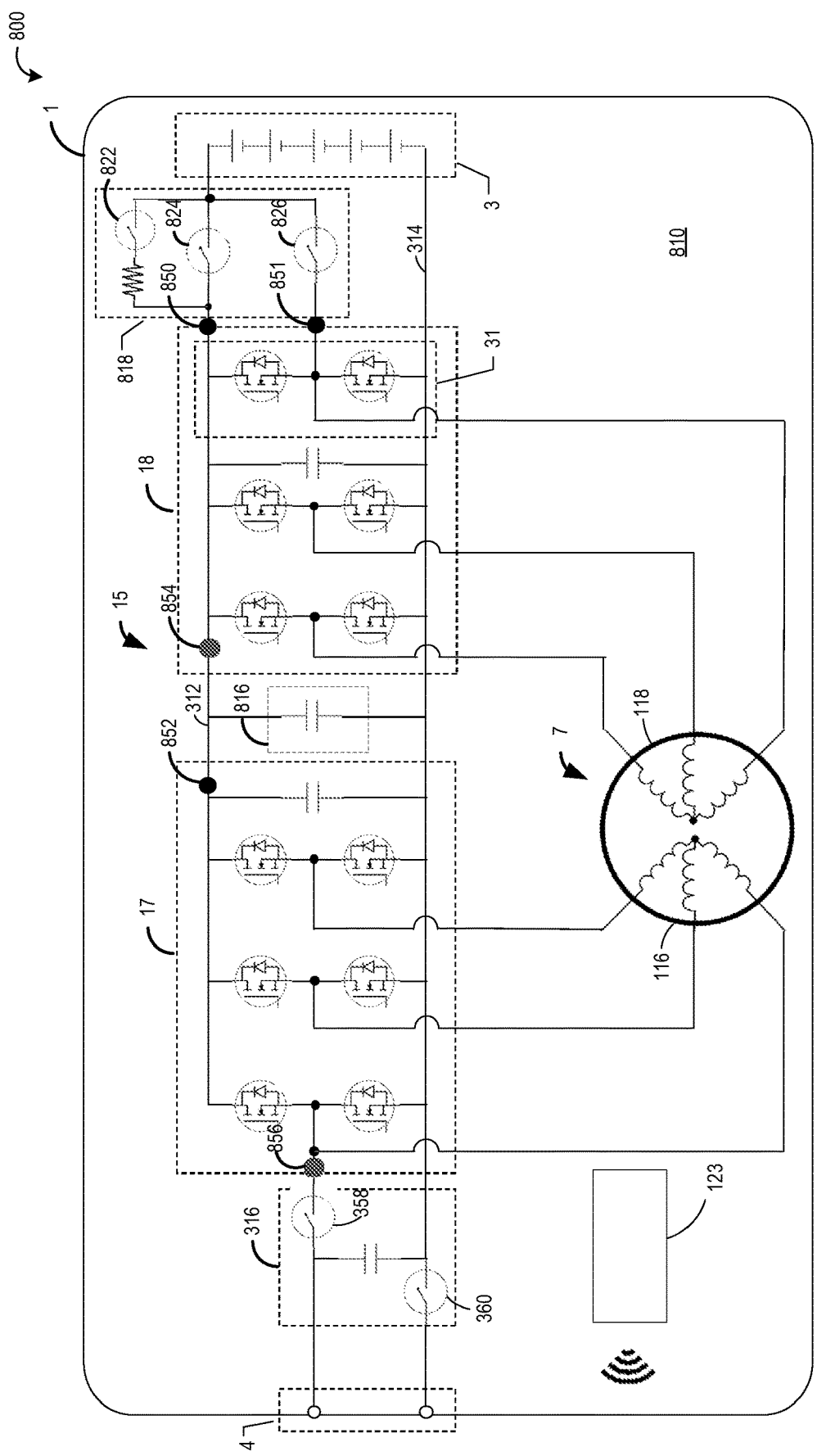
FIG. 8 is a schematic representation of an embodiment of a drive controller that provides a DC to DC converter that boosts then bucks.

Referring now to FIG. 8, an example multiphase charging system 800 shows a boost-buck converter 810 configured for operation a motor 7 with two inductive windings 116 and 118, respectively, of car 1 of FIG. 1. Boost-buck converter 810 may be used to charge car 1 from the charging station 25 of FIG. 1 (not depicted in FIG. 8), responsive to control signals from the module 20 of FIGS. 1-6 (not depicted in FIG. 8). Where applicable, the features and operation described with respect to FIG. 3A also apply to the boost-buck converter 810 of FIG. 8.

Boost-buck converter 810 includes two conversion stages comprising controller 17 and controller 18, in series, to define a controller 15 which is able to perform a boost-buck operation. The controllers 18 and 15 may be the same as or similar to the controllers 18 and 15 of FIG. 1, and the controllers 17 and 18 may be the same as or similar to the controllers of FIGS. 2A-6. In the present embodiment, controller 17 is a boost charger (for example, as described by boost converter 310 in FIG. 3A), and controller 18 is a buck charger (for example, as described as buck mode charger 510 in FIG. 5). When controller 17 and 18 are operated in series, controller 15 is able to define a bidirectional boost then buck (herein referred to as boost-buck) converter. In this embodiment, windings 116 and 118 are isolated 3-phase windings wound on a common stator and interacting with a common rotor. In other embodiments, they may be two distinct and decoupled windings. Advantageously, the DCDC boost-buck conversion mode provides minimal or no discontinuous input or output currents and may thus provide superior performance to reduced electromagnetic interference (EMI) and/or improved electromagnetic compatibility (EMC) of the system. Further, such a converter may reduce the requirements for input and output filtering.

The optional additional capacitor 816 shown between the boost and buck stages may be of appropriate high capacity to buffer the intermediate discontinuous currents of the boost-buck conversion, and may be deployed in addition to, or instead of, the bulk capacitors of controller 17 and 18 (like capacitor 65). Advantageously, any switching noise of intermediate pulsed currents internal to controller 15 may be typically encapsulated in the controller housing, thereby providing a faraday cage to reduce irradiated emissions. A pre-charge circuit is incorporated in 818 which enables the intermediate capacitors 816 (and/or capacitors of controller 17 and 18) to be pre-charged by the battery pack 3. Converter 810 is also able to operate controller 18 in buck mode to charge the capacitor within the input circuit 316 (similar to capacitor 66 in FIG. 3A) from the battery pack 3 prior to interfacing with the external source and entering the second state. Similarly, converter 810 is able to operate controller 17 in boost mode to charge 816 (and/or capacitors of controller 17 and 18) from DC input at port 4. Switching mechanism 16 may include switches 822, 824, 826, 358, and 360 for selectively connecting the battery pack 3 to the first input 850 or the alternative first input 851 of controller 18, and/or for selectively connecting port 4 to the second input 856 of controller 17. In the present embodiment, the first input 852 of controller 17 may be permanently connected to the second input 854 of controller 18.

Boost-buck converter 810 may operate in the first state (e.g., propulsion) by closing switch 248 to supply both controller 17 and 18. It will be appreciated that in the current embodiment, the first input 850 and the second input 854 of controller 18, along with the first input 852 of controller 17 are common and equivalent. Therefore, the current drawn by controller 17 from pack 3 need not be supplied through controller 18.

As described earlier in reference to FIGS. 2A and 7, first and second charging data may be exchanged between the communication module 123 of car 1 and the communication module 122 of charging station 25 (not depicted in FIG. 8). After a first charging data is received by module 123, the module 20 may enable the boost-buck converter 810 (and thus, the controller 17 and/or 18) to enter the second state to charge battery pack 3 from charging station 25. Boost-buck charger 810 may import power to charge pack 3 from port 4 (e.g., DC charging mode), or export power to port 4 (and thus charging station 25) from pack 3 (e.g., bidirectional mode). One or both controllers 17 or 18 may operate in the second mode during this time.

In some embodiments, one controller may operate in the first state, while the other operates in the second state. Other modes are also possible, for example, controller 17 may act in a bypass mode, whereas controller 18 may act in import buck/export boost mode, such that the overall series conversion of controller 15 is import buck or export boost mode. Further, controller 17 may act in import boost/export buck mode, and controller 18 act in bypass mode, such that the overall series conversion of controller 15 is an import boost export buck mode. In a further mode, both controller 17 and controller 18 may act in bypass mode. Module 20 may use the first charging data and optimization algorithms to determine whether the boost-buck charger 810 should operate in import buck mode, import boost mode, export buck mode, export boost mode, import boost-buck mode, export boost-buck mode, or bypass mode.

In alternative embodiments, a bypass switch 64 on a dedicated bypass route 60 may be employed, as controlled by switching mechanism 16, to connect the input port 4 to the PDU 21 (not depicted in FIG. 8) within battery pack 3, or at least one of controller 17 and/or 18 may employ a switch 48 as described and illustrated in FIG. 2A.

Figure 9:
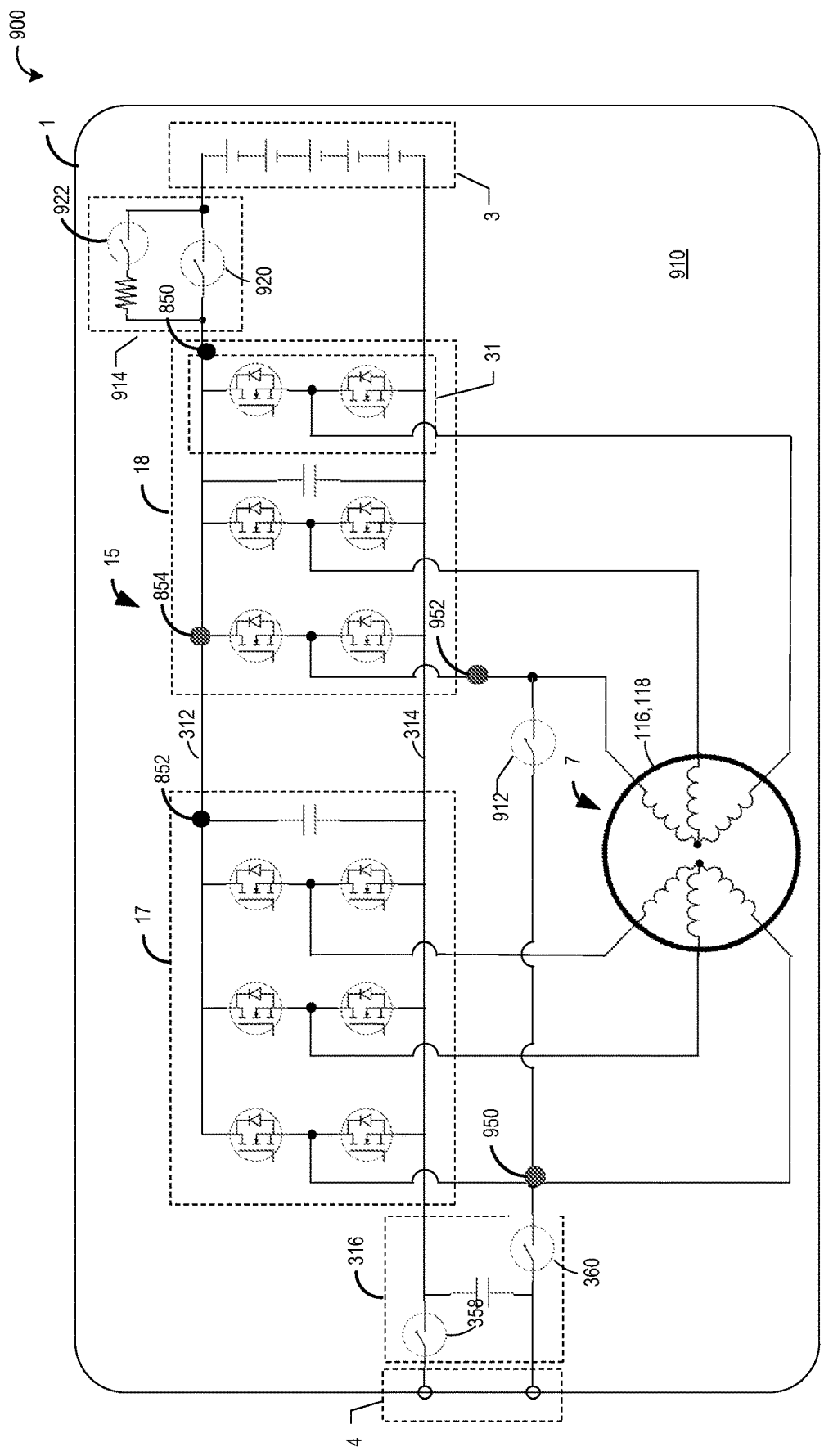
FIG. 9 is a schematic representation of an embodiment of a drive controller that provides an alternative arrangement to FIG. 6 for a dual DC to DC boost converter.

Referring now to FIG. 9, an example multiphase charging system 900 shows a boost converter 910 configured for operation with a motor 7 with two inductive windings 116 and 118, respectively, of car 1 of FIG. 1. Boost converter 910 may be used to charge car 1 from the charging station 25 of FIG. 1 (not depicted in FIG. 9), responsive to control signals from the module 20 of FIGS. 1-6 (not depicted in FIG. 9). A pre-charge circuit 914 is incorporated into boost converter 910, which enables the capacitance of controllers 17 and 18 to be pre-charged by the battery pack 3 (e.g., the battery pack 3 of car 1 of FIGS. 1-6). Where applicable, the features and operation described with respect to FIG. 3A or 8 also apply to the dual boost converter 910 of FIG. 9.

Boost converter 910 shows an alternative arrangement of controllers 17 and 18 to FIG. 8 to provide a dual DC to DC boost functionality to the battery pack 3. Advantageously, the dual DCDC boost converter 910 may provide higher power by the two boost conversion stages of controllers 17 and 18 operating in parallel. In this embodiment, each controller 17 and 18 may act singularly or in unison in a manner similar or identical to that described by boost converter 310 in FIG. 3A. The boost switches of controllers 17 and 18 may be interleaved by the boost control module 20 (not depicted in FIG. 9) for reduced EMI and AC ripple to the boosted voltage potential to the battery pack 3. Another advantage is that a single DCDC conversion may be done at lower powers to limit switching losses and to increase conversion efficiency. Switching mechanism 16 may include switches 358 and 360 of input circuit 316, 920 and 922 of circuit 914, and switch 912. The capacitance in input circuit 316 may be pre-charged by one or both the controllers 17 and/18 operating in the bidirectional pre-charge mode, for example, as previously described with reference to FIG. 3A. Switch 912 may be used to place the second inputs of converters 17 and 18 (e.g., 950 and 952 respectively) in parallel such that controller 15 can perform the parallel boost mode when operating in the second state (e.g., during charging).

Figure 10:
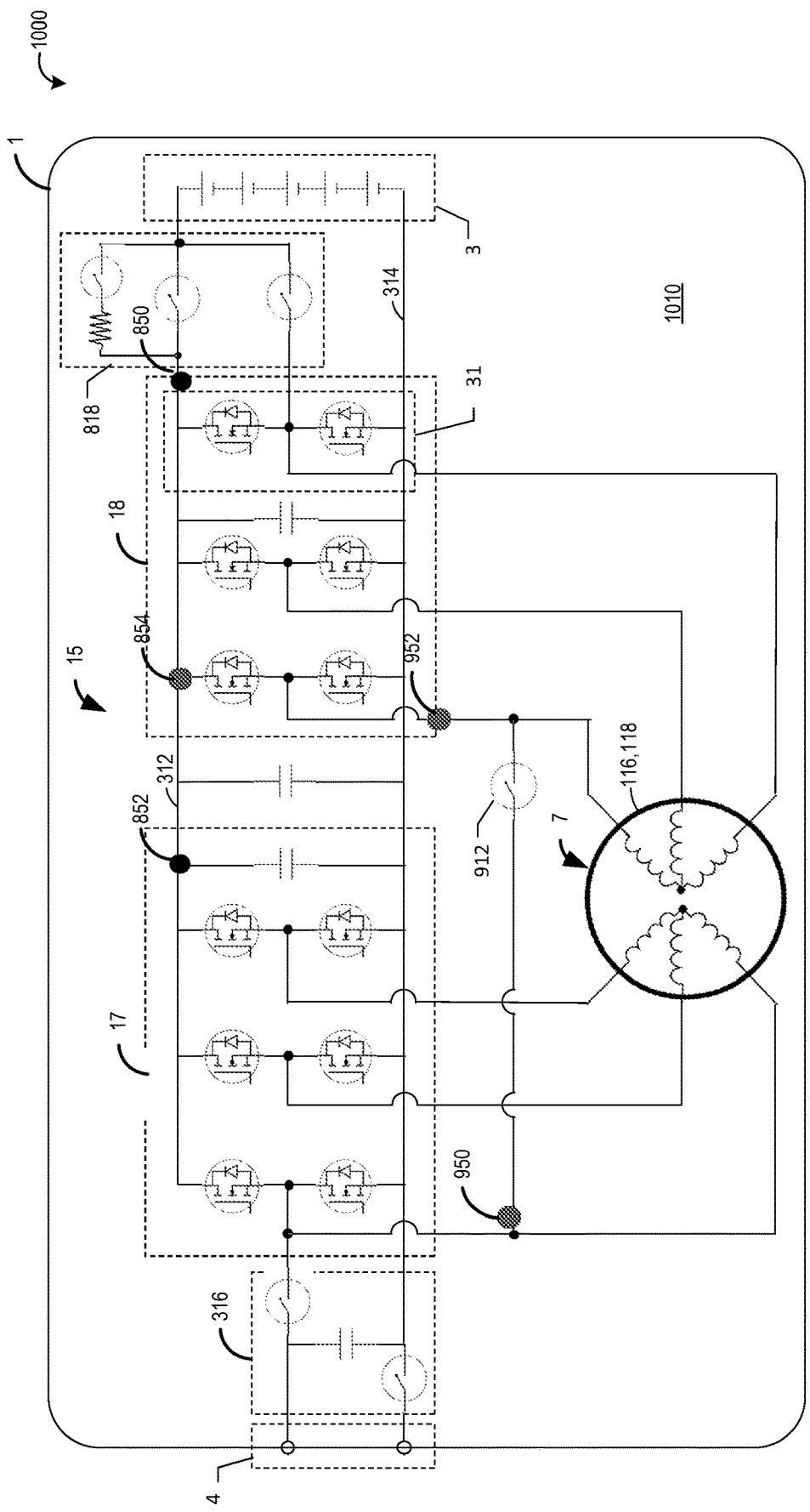
FIG. 10 is a schematic representation of an embodiment of a drive controller that provides an alternative to FIG. 9 for a DC to DC boost and buck converter or a DC to DC parallel boost converter.

Referring now to FIG. 10, an example multiphase charging system 1000 shows a boost-buck converter 1010 configured for operation with a motor 7 with two inductive windings 116 and 118, respectively, of car 1 of FIG. 1. Boost converter 1010 may be used to charge car 1 from the charging station 25 of FIG. 1 (not depicted in FIG. 10), responsive to control signals from the module 20 of FIGS. 1-6 (not depicted in FIG. 10). Where applicable, the features and operation described with respect to FIGS. 3A, 5, 8 and 9 also apply to the boost-buck converter 1010 of FIG. 10.

FIG. 10 represents an alternative onboard charging system to FIG. 9, whereby boost-buck converter 1010 may provide either a DC to DC boost and buck converter or a DC to DC parallel boost converter. Advantageously, the DCDC boost and buck converter with selectivity to DCDC parallel boost conversion 1010 provides for at least three power settings for conversion: a dual boost for high power/higher voltage potential, a boost-buck converter for medium power/medium boosted voltage potential, and a single boost or buck converter for a low power/low voltage potential.

Figure 11:
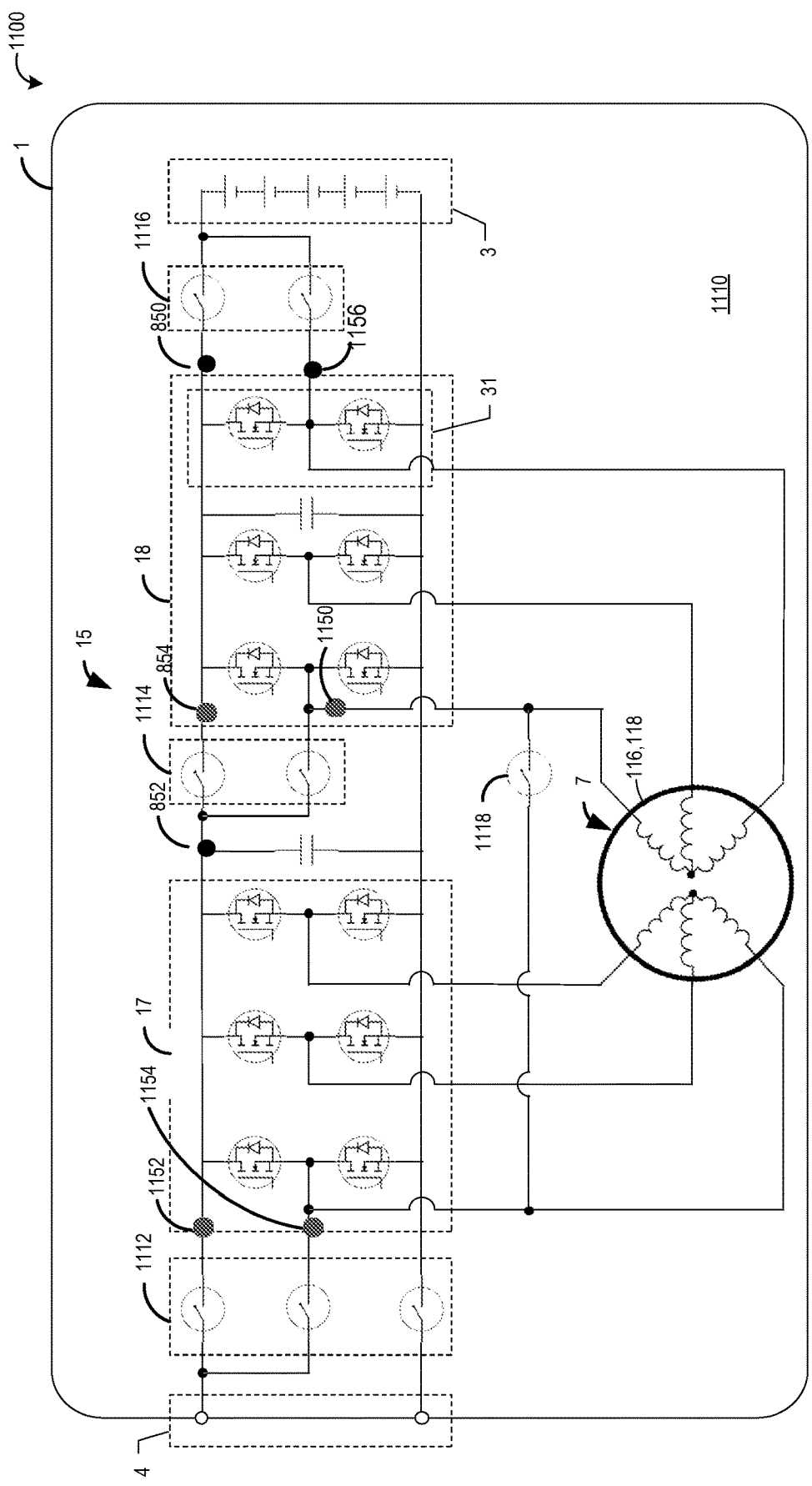
FIG. 11 is a schematic representation of an embodiment of a drive controller that provides an alternative to FIG. 10 for a DC to DC boost-buck mode.

Referring now to FIG. 11, an example multiphase charging system 1100 shows a multimodal converter 1110 configured for operation a motor 7 with two inductive windings 116 and 118, respectively, of car 1 of FIG. 1. Multimodal converter 1110 may be used to charge car 1 from the charging station 25 of FIG. 1 (not depicted in FIG. 11), responsive to control signals from the module 20 of FIGS. 1-6 (not depicted in FIG. 11). Where applicable, the features and operation described with respect to FIGS. 3A, 5, 6, 8, 9, and 10 also apply to the multimodal converter 1110 of FIG. 11.

Multimodal converter 1110 provides an alternative to the boost-buck converter 1010 of FIG. 10, to selectively provide A DC to DC boost then buck converter,
    a DC to DC parallel boost converter,
    a DC to DC series boost converter,
    a DC to DC buck then boost converter, or
    a DC to DC buck using series inductance.

Advantageously, the multimodal converter 1010 provides the ability to select from multiple modes of conversion to fully optimize conversion regardless of the intended conversion power requirement or step-up or step-down ratio. Controller 18 in this case may operate like the buck or boost controller 610 of FIG. 6.

In one mode operation not previously described in detail, controller 15 (and thus multimodal converter 1110) may operate in series buck-boost mode. This is achieved by closing switch 1118 thus connecting the alternative second input 1154 of controller 17 to the alternative second input 1150 of controller 18, thus interfacing battery pack 3 to controller 18 at the first input 850 via switching mechanism 1116, and interfacing port 4 to controller 17 at the second input 1152 via switching mechanism 1112. Then controller 15 operates the buck switches of controller 17's drive circuits other than the drive circuit connected to the alternative second input 1154, and operates the boost switches of controller 18's drive circuits other than the drive circuit connected to the alternative second input 1150.

In another mode of operation not previously described in detail, controller 15 (and thus multimodal converter 1110) operates in series boost-boost mode. This is achieved by opening switch 1118, interfacing battery pack 3 to controller 18 at the first input 850 via switching mechanism 1116, interfacing the first input 852 of controller 17 to the alternative second input 1150 of controller 18 via switching mechanism 1114, and interfacing port 4 to controller 17 at the alternative second input 1154 via switching mechanism 1112. Then controller 15 operates the boost switches of controller 17's drive circuits other than the drive circuit connected to the alternative second input 1154, and operates the boost switches of controller 18's drive circuits other than the drive circuit connected to the alternative second input 1150.

In another mode operation not previously described in detail, controller 15 (and thus multimodal converter 1110) operates in series buck mode using the inductance of both windings 116 and 118. This is achieved by closing switch 1118, thus connecting the alternative second input 1154 of controller 17 to the alternative second input 1150 of controller 18, interfacing battery pack 3 to controller 18 at the alternative first input 1156 via switching mechanism 1116, and interfacing port 4 to controller 17 at the second input 1152 via switching mechanism 1112. Then controller 15 operates the buck switches of controller 17's drive circuits other than the drive circuit connected to the alternative second input 1154, and the current travels through the inductive windings of both windings 116 and 118 before exiting the alternative first input 1156 of controller 18 to charge battery pack 3.

Multimodal converter 1110 is able to selectively decide the mode of operation to achieve the desired inductance, efficiency, power, or other characteristics of the charging conversion in the second state. Multimodal converter 1110 may also select modes such as to minimize torque generation, or to counteract the torque generation, in or between the rotors of windings 116 and 118.

It will be appreciated that one of the advantages of the embodiments disclosed herein is to selectively determine characteristics of the charging conversion (in at least one of the modes) by manipulating the current path of the DC to DC conversion through the one or more phases. This is controlled via the selective structure of the converter, or via the switching patterns applied to either the buck or boost switches. If more phases are available and one or more additional switches 48 are used between the power rails of those phases, multiple buck or boost inductances are able to be realized. Similarly, if the configuration of the phases is able to be changed on demand between a delta and a wye configuration, other inductances are possible.

Moreover, where a multiphase motor is appropriately configured, any number of the motor phase windings, including up to all of the motor windings, are able to be used for the voltage translation power conversion. Further, the windings are able to be configured in series or parallel (or a combination of series and parallel) to offer respectively greater inductance to the buck-boost structure and higher rates of power transfer.

It will be appreciated to those skilled in the art that a converter may include or combine any elements of any of the previously described converters. For example, a converter structure can combine any two or more sub-converter structures (for example, controller 17 and 18 of FIG. 11) in either series or parallel, for example, using a boost charger structure similar to that of boost charger 310 described in FIG. 3A, or a buck charger structure similar to that of buck charger 510 described in FIG. 5. Different embodiments of the invention including of boost-buck, boost-boost, buck-buck, and buck-boost are therefore possible in different in-series and/or parallel configurations.

Figure 12:
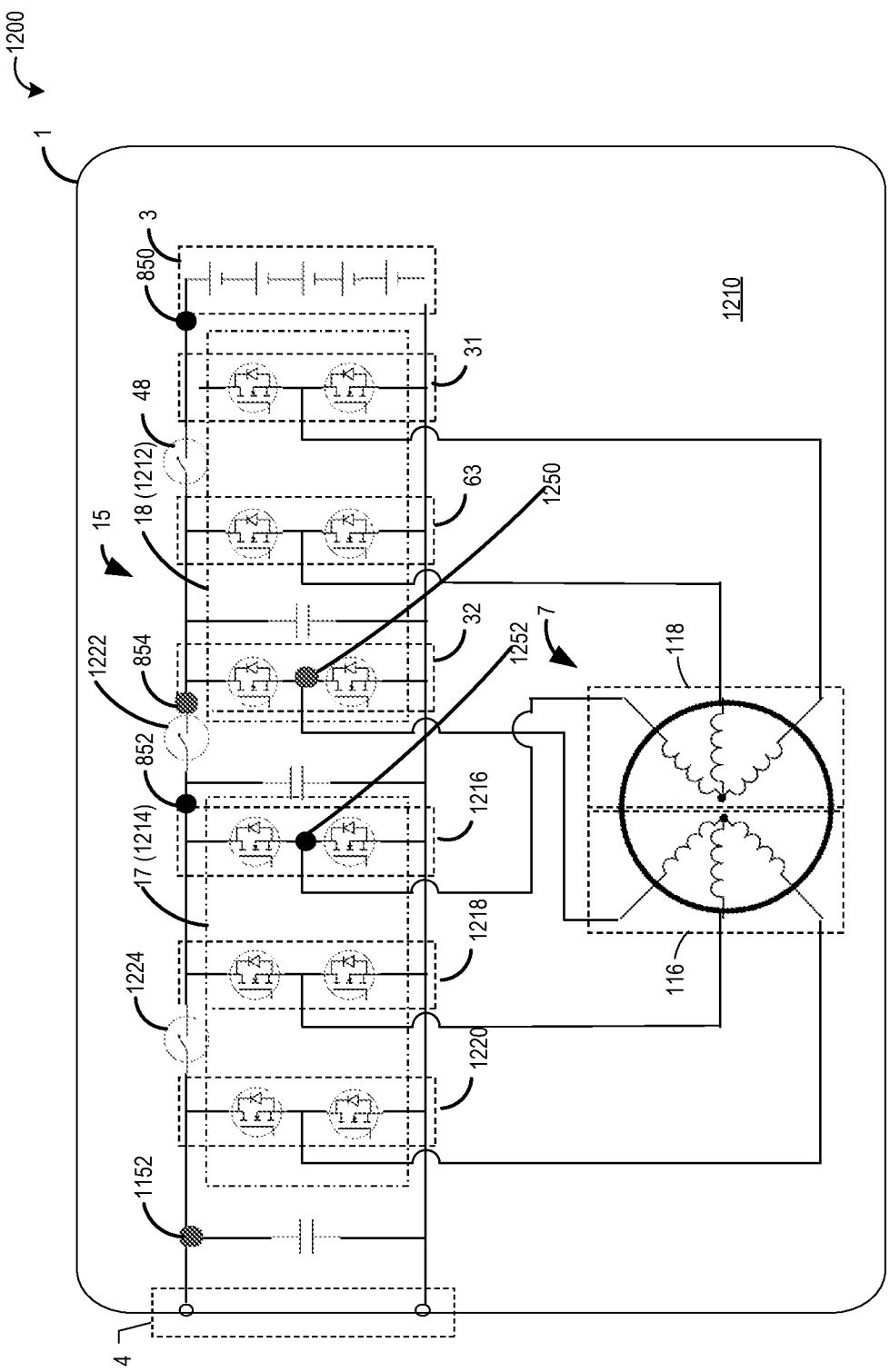
FIG. 12 is a schematic representation of an embodiment of a drive controller that provides a buck-boost mode.

Referring now to FIG. 12, an example multiphase charging system 1200 shows a dual buck-boost converter 1210 configured for operation with a six-phase machine 7 with two independent sets of 3-phase windings 116 and 118, respectively, of car 1 of FIG. 1. Dual buck-boost converter 1210 may be used to charge car 1 from the charging station 25 of FIG. 1 (not depicted in FIG. 12), responsive to control signals from the module 20 of FIGS. 1-6 (not depicted in FIG. 12). Where applicable, the features and operation described with respect to FIGS. 3A, 5, 6, 8, 9, 10, and 11 also apply to the dual buck-boost converter 1210 of FIG. 12.

In this embodiment, each set of windings is driven by three drive circuits, to give a total of six drive circuits. In some embodiments, a single controller comprises all six drive circuits to control the operation of machine 7. In this embodiment, controller 17 and controller 18, each with three drive circuits, act independently, or under the supervisory control of controller 15, to control the operation of machine 7. Three of the drive circuits together form a 3-phase inverter switching array module (sometimes referred to as a six pack), which will be referred to in herein as an array.

In the illustrated embodiment, array 1212 of controller 18 is comprised of drive circuits 31, 63, and 32, whilst array 1214 of controller 17 is comprised of drive circuits 1216, 1218, and 1220. Three optional power rail interruption switches 48, 1222, and 1224 are disposed between the drive circuits 31 and 63, 32 and 1216, and 1218 and 1220, respectively. One of the machine phase tails from each set of independent windings 116 and 118 is driven by at least one drive circuit in each array. In other words, the winding set 118 is driven by drive circuits 31, 63, and 1216, and the winding set 116 is driven by drive circuits 32, 1218, and 1220. In this way, switch 1222 is opened in the second state for a voltage translation to occur, using either one, or both, sets of windings in parallel. Therefore, in some embodiments, switch 1222 is implemented as a means of interrupting the power rail and entering the second state. Such an embodiment has the advantage that arrays are able to be sourced which have internally fused/connected positive and negative power rail connections, allowing for a wider range of selection of components during the design and implementation of such a controller. In the illustrated embodiment, if controller 17, or a supervisory controller such as controller 15 of car 1 of FIG. 1, opens switches 1222, and/or 1224, and/or 48 in the second state, a multi-stage voltage translation is able to occur in series and/or parallel. In this way, the charging cycle is able to be optimized for efficiency, THD, EMI, EMC, switching frequency, charging power, PFC, or the like. For example, in one embodiment, when placed in series, the dual buck-boost converter 1210 is able to increase the effective inductance of the conversion, and whilst in parallel, the converter can reduce the effective inductance. In another example when operating in series, the dual buck-boost converter 1210 can act to first boost and then buck the charging current such as to reduce filtering on the first and second DC inputs.

As detailed earlier, the controller 15 is able to act such that torque generated by one set of windings in the second state is able to be wholly or substantially cancelled by the other winding set. In one embodiment, switch 48 may be opened such that drive circuits 32, 1218, and 1220 are operated in the first state, whilst drive circuits 31, 63, and 1216 operate in the second state. In such embodiments, winding set 116 is able to be used for providing tractive effort for the car 1 powered by a DC input from charging station 25, or for manipulating the rotor position during the charge cycle involving winding set 118. In another embodiment switch 1224 is opened such that winding set 118 is operated in the first state whilst winding set 116 is operated in the second state. In other embodiments, other features previously mentioned in this patent specification for machines with multiple sets of windings, or machines with locked or linked rotors are able to be utilized. In further embodiments, other components are implemented in the circuit such as supercapacitors, rectifiers, input circuits, and the like, as previously outlined in this specification.

In still further embodiments, other switches and/or configurations and/or algorithms and/or features for the first and second state may be used. Each set of independent windings may be driven from one array, and switch 1222 may be used to electrically isolate at least one power rail of one array from the other. This may be advantageous, for example, in the event of a failure of one of the drive circuits, arrays, or winding sets, which would otherwise impose a failure on the other set if it were not isolated. In such cases, for a voltage translation to occur over switch 1222, a separate buck-boost inductor may be implemented in between at least one drive circuit of one array, and at least one drive circuit of the other array. This separate inductor is able to be switched in and out of the circuit, depending on if the controller is operating in the first or second state, by use of further isolation switches on one or both sides of the separate inductor (not depicted in FIG. 12). In a further embodiment, two or more drive circuits may be used for rectification, whilst two or more other drive circuits may be operated in the second state.

In other embodiments, machine 7 may have other than six phases, and/or other than two independent sets of windings, for example, a machine with 9-phases, including nine drive circuits derived from three 3-phase arrays where voltage translation occur using any combination of the three sets of windings. In one such embodiment with three sets of independent windings, one winding from each winding set may be connected to the first array 1212 such that all three winding sets may be used in parallel for producing the charging current.

Figure 13:
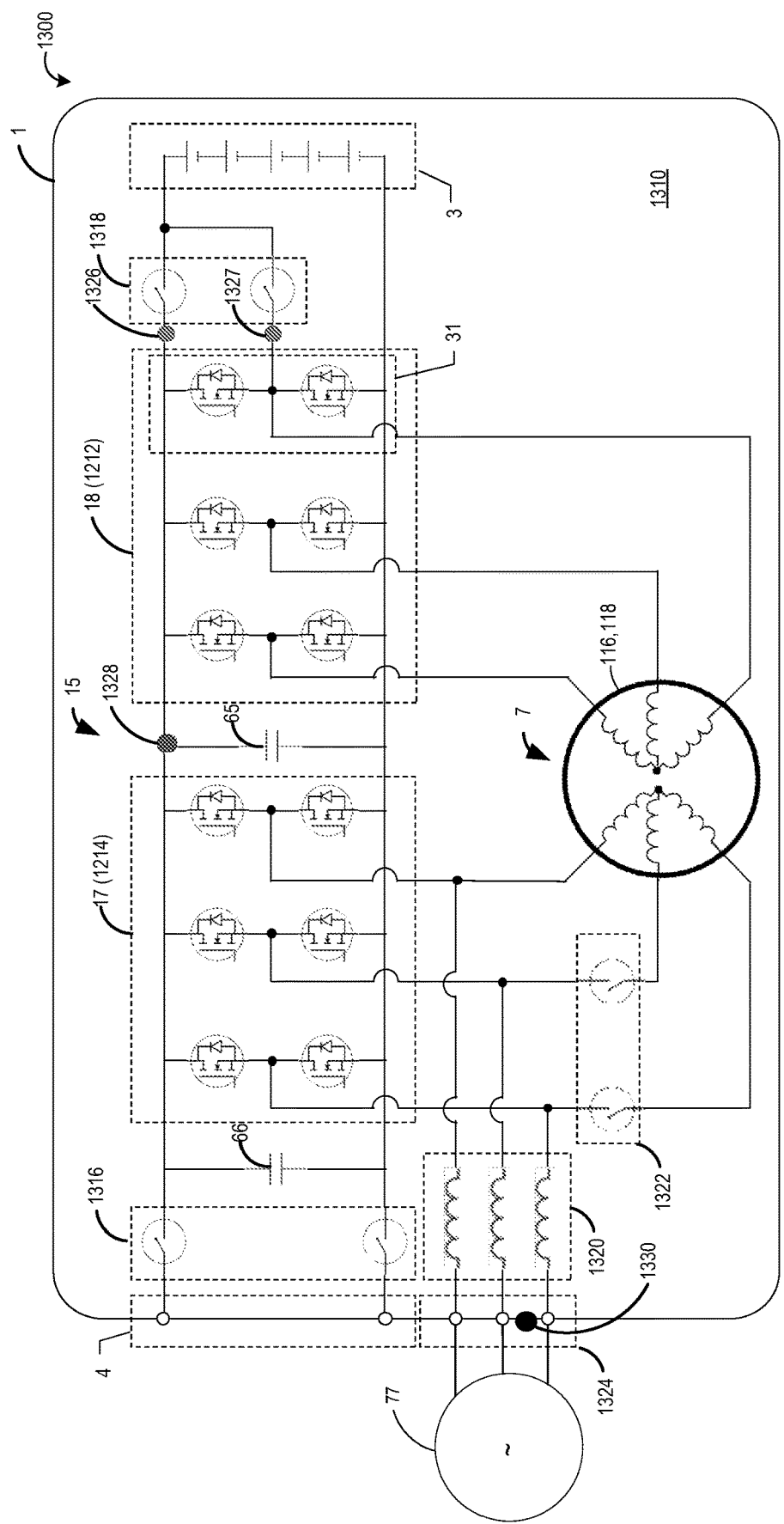
FIG. 13 is a schematic representation of another embodiment of a drive controller that includes a third input for AC charging.

Referring now to FIG. 13, an example multiphase charging system 1300 shows a boost-buck rectifier charger 1310 configured for operation with a six-phase machine 7 with two independent sets of 3-phase windings 116 and 118, respectively, of car 1 of FIG. 1. Boost-buck rectifier charger 1310 may be used to charge car 1 from the charging station 25 of FIG. 1 (not depicted in FIG. 13), responsive to control signals from the module 20 of FIGS. 1-6 (not depicted in FIG. 13). Where applicable, the features and operation described with respect to FIGS. 3A, 5, 6, 8, 9, 10, 11, and 12 also apply to the boost-buck rectifier charger 1310 of FIG. 13.

In this embodiment, controller 15 includes a controller 17 and controller 18 (e.g., the controllers 17 and 18 of FIGS. 1, 2A, and 3A), where in an alternative mode of operation controller 17 is able to operate as a synchronous rectifier and controller 18 is able to act in a similar way to buck converter 510 of FIG. 5. In addition to an input circuit 1316 for interfacing with a DC source at port 4, a third input 1330 can also be used to charge from AC sources. In this embodiment, car 1 includes third input terminals 1324 for connecting with a three phase grid 77, and an input circuit 1320. The additional input circuit 1320 of the boost-buck rectifier charger 1310 may include disconnect switches, a filter, a buck and/or boost rectifier, or an inverter. In this embodiment, circuit 1320 includes external series inductors which are used as boost inductors for the active synchronous 3-phase inverter-rectifier stage 1214. This allows the controller 17 to effect bidirectional power flows to and from grid 77. Controller 15 is able to operate in buck charging from port 4 to battery pack 3 by operating controller 17 in the bypass mode with switches 1316 closed and controller 18 in buck mode. In an alternative mode of operation, controller 15 is able to act in boost-buck rectification mode with switches 1322 open, and the alternative first input 1327 of controller 18 connected to battery pack 3 via switching mechanism 1318, and controller 17 operating to the external AC current to present a DC input at the second input 1328 of controller 18, and controller 18 operating in buck mode as described by buck charger 510 of FIG. 5, in addition to the other power flows mentioned above in reference to FIGS. 2-12.

It will be appreciated that when power is drawn from and provided to grid 77 and respectively into and out of the controller 17, the voltage at the second input 1328 of controller 18 is always a DC voltage, and the current through machine 7 when controller 18 operates in the second state is always a DC current. The third AC input 1330 is polarity agnostic to the power input at port 1324, and therefore accepts an external single phase, three phase AC source, or an unregulated or regulated DC current of positive or negative voltage, and may be bidirectional in the case of V2X.

In an alternative configuration, controller 17 may act as a buck rectifier, and controller 18 may be configured to act as the boost converter 310 of FIG. 3A, or controller 17 may be a standalone active 3-phase rectifier of any configuration, and not responsible for operating machine 7 in the first state (e.g., propulsion). Additionally, responsive to control signals from the control module 20 (e.g., module 20 of FIG. 3A) and/or the controller 17, the input circuit 1320 may draw a DC current from the second input, and supply an AC current to the external source via the third input terminals 1324.

In the present embodiment with controller 17 and input circuit 1320 able to act as a synchronous boost rectifier, controller 18 is implemented as a buck charger converter (e.g., similar to the buck charger 510 of FIG. 5) such that the charging process performed by controller 15 from third input 1130 to the alternative first input 1327 (and thus of battery pack 3) is a boost-buck conversion, and no discontinuous currents (when operating in CCM) are subjected to the third or first inputs, with discontinuous currents filtered by capacitor 66 and/or 65 (acting similarly to capacitor 816 as described in reference to FIG. 8). Such an embodiment may improve overall system EMI and/or EMC.

In an alternative embodiment, controller 17 may be implemented as a buck ACDC active rectifier and may be followed by controller 18 operating as a boost DCDC stage (for example, similarly to boost charger 310 of FIG. 3) which may reduce current ripple imposed on capacitors 65 and 66, and therefore may result in a more compact solution.

Combining a boost then buck, or buck then boost stage advantageously allows for a wider output DC voltage to be achieved. For example, a 240 VAC input may be able to charge a vehicle pack 3 with voltage $V_B$ of higher or lower voltage potential than the typical passively rectified DC voltage of approximately 340 VDC (for example, in a pack 3 where voltage $V_B$ can range between 200-500 VDC). However, in some embodiments, a boost then boost, or buck then buck design may be used in the case of a large step-up or step-down, for example, when charging a 48 VDC system from a 400 VAC 3-phase supply, or an 800 VDC system from a 110 VAC supply.

Figure 14:
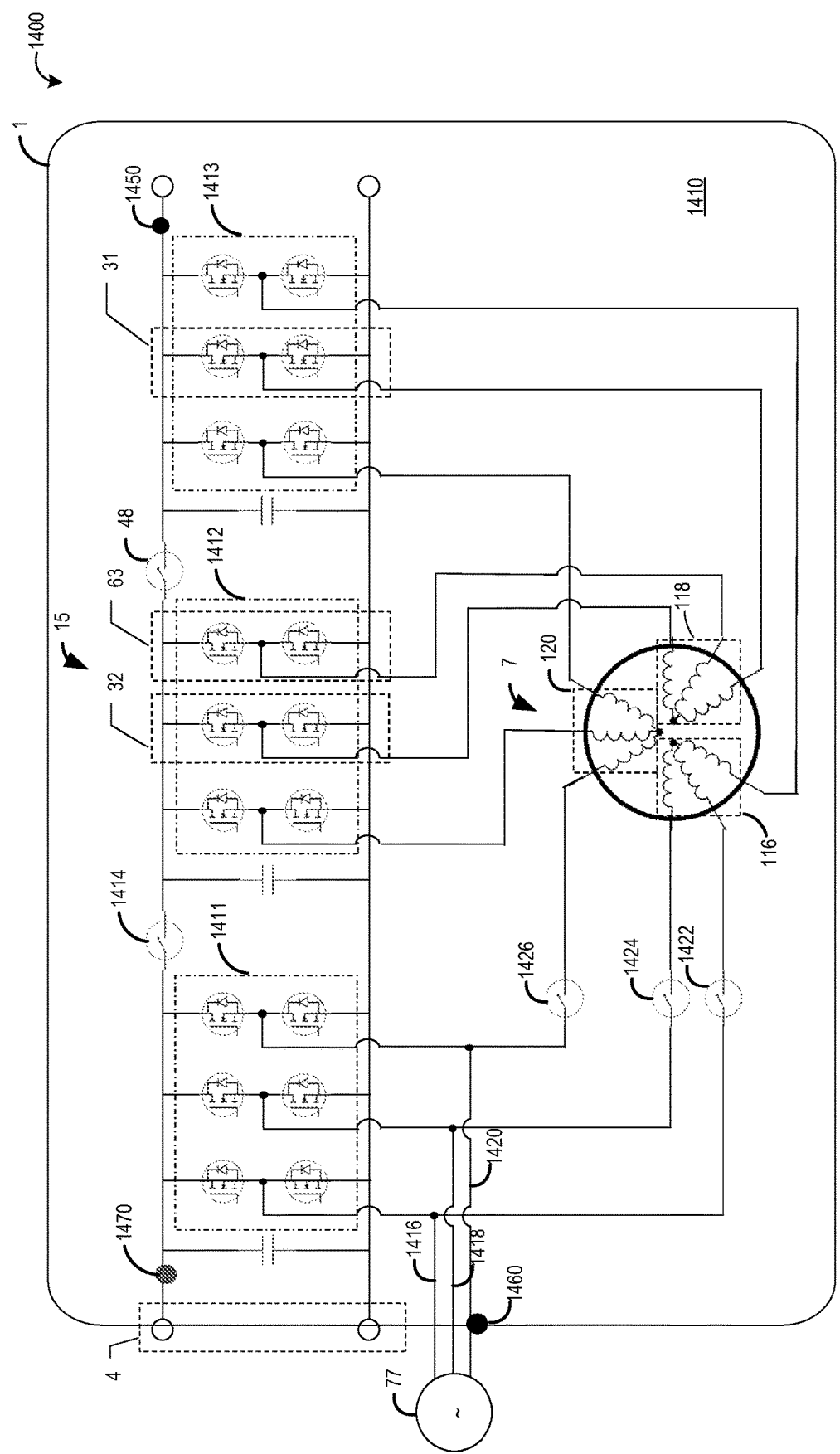
FIG. 14 is a schematic representation of a drive controller with multiple drive circuits, where some drive circuits are used for rectification.

Referring now to FIG. 14, an example multiphase charging system 1400 shows a 9-phase converter 1410 configured for operation with a nine-phase electrical machine 7 with three independent sets of 3-phase windings 116, 118, and 120 respectively, of car 1 of FIG. 1. 9-phase converter 1410 may be used to charge car 1 from the charging station 25 of FIG. 1 (not depicted in FIG. 14) interfaced at port 4, and be responsive to control signals from the module 20 of FIGS. 1-6 (not depicted in FIG. 14). Where applicable, the features and operation described with respect to FIGS. 3A, 5, 6, 8, 9, 10, 11, 12, and 13 also apply to the 9-phase converter 1410 of FIG. 14.

In the embodiment shown, controller 15 comprises three controllers 17, 18 and 19. Controller 15 comprises three arrays 1411, 1412, and 1413, each including three drive circuits. The drive circuits associated with each controller are distributed across the arrays, and the three controllers 17, 18, and 19 are defined by the drive circuits corresponding with the phase windings 120, 188, and 116 respectively. For example, controller 18 includes the three drive circuits 31, 32 and 63 connected to winding 118. An unregulated DC source is able to be connected to the second input of controller 15 connected to port 4, and controller 15 is able to operate in the second state through the use of switches 48 and/or 1414, such that controller 15 is able to apply a regulated charging current or charging voltage to the first input 1450. Alternatively, with switches 1422, 1424, and 1426 open, an AC source represented by grid 77 is able to be applied to the third input 1460 at third input terminals 1416, 1418 and/or 1420, and rectified by array 1411 to provide a DC voltage at the power rails of array 1412, and/or the second input. When a source is applied to the third input 1460, controller 17 is able to disconnect the phases of the motor from array 1411 where the third input is applied. For example, if a single phase AC source is presented at the third input through input terminals 1416 and 1418, controller 17 issues signals to open switches 1422 and 1424 such that the input is disconnected from the motor phase windings of 116. The drive circuits of array 1411 are then able to operate such that the input AC source is actively rectified with power factor correction. Similarly, if a three-phase source is applied to the third input, switches 1422, 1424, and 1426 are opened such that the three-phase input is disconnected from the motor phases. In other embodiments, all three drive circuits of array 1411 are connected to winding set 116, and as such one or two of the three drive circuits may be disconnected from the motor windings when a source is applied at the third input. In some embodiments, some or all of the drive circuits of array 1411 form part of an input circuit (e.g., input circuit 75 of FIG. 2A or input circuit 316 of FIG. 3A).

In some embodiments, a filter is incorporated in an input circuit (not shown in FIG. 14) on the vehicle at the third input to reduce total harmonic distortion, EMI, EMC, and/or other undesirable traits. This input circuit may include external series inductors implemented on each of the AC inputs (similar to circuit 1320 of FIG. 13) to act as boost inductances and filters for array 1411 operating in a rectifier mode. In some instances, the external series inductors may be wound on a common core (e.g., a sine filter, LCL filter, etc.). In some embodiments, the filter acts as a common mode filter for terminals 1416, 1418 and 1420. In other embodiments, a filter is implemented on the infrastructure side in charging station 25, or boost inductors may be fitted in the input circuit such that array 1411 forms part of a boost rectifier. In some embodiments, input protection switches are also fitted in the input circuit.

In the illustrated embodiment, once a voltage is present across the second input 1470, either from an applied external DC source interfaced to port 4, or as derived from the third input and array 1411, controller 17 is able to operate in the second state with modules 1412 and/or 1413 and/or 1411 to apply a charging current or voltage to the first input 1450. Controller 15 is also able to operate in the first state by drawing current from either the first input 1450 or the second input 1470 or a combination of the two. In some embodiments, controller 15 is able to operate both in the first state and the second state concurrently, for example by opening switch 1414 and operating controller 18 in the first state with winding 118, and using controller 19 and winding 16 to operate in a second state to provide a charging current or voltage to the first input 1450 from the second input 1470. Further, as all windings sets in the present embodiment have at least one winding connected to array 1413, controller 15 may operate in the second state using switch 48, and motor winding sets 116, 118, and 120 (and thus, controller 17, 18, and 19) may operate in parallel. Alternatively, controller 15 may operate in the second state with both switch 48 and 1414 open, and therefore provide a series conversion, or a combination of series and parallel conversions of controllers 17, 18 and/or 19. Controller 15 may operate such that switch 48 and or switch 1414 are pulsed such that a hybrid operation exists. That is, controller 15 may operate in any way such that it optimizes the applied charging current or voltage applied to the first input based on efficiency, THD, PFC, ripple, noise, machine torque, rotor position, or any other parameter. The bulk capacitance associated with array 1411 is able to be pre-charged by controller 15 acting in the second state via the first input such that an inrush current does not occur when a source is applied to the second or third inputs. Similarly, other capacitances are able to be pre-charged and discharged as relevant.

In a further embodiment, machine 7 may have other than 3 sets of independent windings, and/or controller 17 may have other than three sets of 3-phase array modules.

In some embodiments, rectification may not be used and the third input and switches 1426, 1424, and 1422 are eliminated. In further embodiments, array 1411 is not connected to an electrical machine winding set, and/or another array configuration is used which is optimized for rectification, such as a Vienna rectifier. In still further embodiments, multiple electrical machines may be used in place of independent motor windings, to a similar effect.

In other embodiments, machine windings may be connected to the drive circuits of the array modules 1412, 1413, and 1411 in other configurations such that controller 15 may operate in other modes optimal to the input types and relevant application.

Thus, many different topologies for a controller for an inductive load able to provide locomotion to an electric vehicle, and in a reconfigured state, an onboard charger from a DC source without adding significant cost, weight, or size to a traditional electric vehicle propulsion system. The DCDC boost converters described herein have the following advantages:

Galvanic isolation during charging typically provided by the DC input source, compared with charging from an AC source using other integrated charging conversion apparatus and methods.

Cost effective and highly efficient integrated charging within the vehicle.

No or minimal changes to the vehicle's inverter.

High power and high voltage potential onboard DC charging. AC charging standards may be limited in power and high voltage potential.

Backwards compatibility for new generation vehicles with higher motor voltage potentials, for example 400 VDC to next generation 800 VDC.

Charging station interoperability between all vehicles and DC energy sources. For example, the invention enables a vehicle to charge from most or any DC charging source, including unregulated DC sources.

Re-charge time may be substantially reduced to less than 20 minutes irrespective of battery capacity.

Able to make use of higher voltage cabling between a charging station and an electric vehicle, thereby minimising conduction power losses.

Able to provide a boost then buck configuration with multiple controllers such as to minimise switching noise imposed on the input (that is, charging station) and output (that is, onboard battery).

Able to reduce the requirement for onboard filtering.

Offering multiple modes of operation including one or more of; propulsion, pre-charging of internal capacitors, DC to DC charging, bidirectional modes, internal bypass, external bypass.

Offers multiple conversion modes of differing powering levels, inductance values, efficiency, filtering requirements, step-up (boost) or step-down (buck) ratios, series conversions, parallel conversions, interleaving, and the like.

Able to operate with both star and delta winding configurations without the injection of zero sequence currents.

Able to operate with multiple motor types including single or poly-phase AC or DC, BLDC, PMSM, IPM, IM, SRM, hybrid, and the like.

The technical effect of the onboard charging system presented herein is that various configurations of controllers, drive circuits, and switches can be implemented to increase compatibility between electric vehicles and external energy sources of different current types and voltages.

In the description provided herein numerous specific details are set forth. However, it is understood that embodiments of the invention may be practiced without these specific details. In other instances, well-known methods, structures and techniques have not been shown in detail in order not to obscure an understanding of this description. While some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination. Likewise, functionality may be added or deleted from the block diagrams and operations may be interchanged among functional blocks. Steps may be added or deleted to methods described within the scope of the present invention.

Reference in the above embodiments to control signals is to all signals that are generated by a first component and to which a second component is responsive to undertake a predetermined operation, to change to a predetermined state, or to otherwise be controlled. The control signals are typically electrical signals although in some embodiments they include other signals such as optical signals, thermal signals, audible signals and the like. The control signals are in some instances digital signals, and in others analogue signals. The control signals need not all be of the same nature, and the first component is able to issue different control signals in different formats to different second components, or to the same second components. Moreover, a control signal is able to be sent to the second component indirectly, or to progress through a variety of transformations before being received by the second component.

The terms "controller", "converter", "module" and the like are used in this specification in a generic sense, unless the context clearly suggests otherwise. When used in a generic sense, these terms are typically interchangeable. Similarly, references to Controller 17 are equally valid for other controllers, or a combination of controllers, as listed in this patent specification.

As used herein, an element or step recited in the singular and proceeded with the word "a" or "an" should be understood as not excluding plural of said elements or steps, unless such exclusion is explicitly stated. Further, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for a vehicle, comprising:
   adjusting, responsive to an operating condition, drive circuits, including a first and a second drive circuit each including at least two switches in series, and a switching mechanism of one or more switches of the vehicle, where:

in a first state, disconnecting at least one pole of a capacitor from at least one pole of a first coupler or an input to the first or second drive circuit, drawing drive current from a first DC energy storage device and operating the first and second drive circuits to receive drive current and selectively energize an electric machine winding of an electric machine of the vehicle for moving the vehicle; and in a second state, upon receiving charging data from a communications module, selectively connecting the capacitor across the first coupler and the input to the first or second drive circuit, drawing a DC load current from an external DC source and operating at least one of the first and second drive circuits to selectively energize the electric machine winding of the electric machine of the vehicle, and generating at least one of a regulated charging current or a regulated charging voltage for charging the first DC energy storage device, wherein the capacitor is precharged to a voltage prior to initiating the second state, wherein the electric machine winding includes at least three inductive windings wound in a wye or a delta configuration, and wherein energizing current flows through at least two phases in series when wound in the wye configuration and through at least two phases in parallel when wound in the delta configuration.

2. The method of claim 1, wherein the input to the first or second drive circuit is defined, at least in part, by a series-mid-point of at least one of the first and second drive circuits or by a connection to at least one of the at least three inductive windings, and wherein, in the first state, at least one pole of the capacitor is disconnected from the input to the first or second drive circuit, and, in the second state, the first coupler and the capacitor are connected to the input to the first or second drive circuit.

3. The method of claim 1, wherein the first DC energy storage device operates at a first DC voltage and the external DC source operates at a second DC voltage, and wherein, in the second state, the method includes generating one of a regulated charging current or a regulated charging voltage for the first DC energy storage device while accommodating the second DC voltage which is lower than the first DC voltage.

4. The method of claim 1, wherein the vehicle includes an input for interfacing with an external AC source, the method further comprising rectifying AC current and presenting a DC current to the input to the first or the second drive circuit.

5. The method of claim 1, further comprising outputting at least one of a regulated voltage or a regulated current to the external DC source in the second state.

6. A controller for an electric vehicle, comprising:
a first DC energy storage device at a device voltage;
a charging interface for interfacing with an external DC source of an external DC voltage;
an electric machine including at least three inductive windings;
a converter including at least two or more drive circuits operating in a first state and in a second state;
a first DC input and a second DC input to the converter;
a switching mechanism of one or more switches for selectively operating in a first state and in a second state operated by the controller;
a first capacitor and a second capacitor with at least two terminals;
a communications module for receiving charging data selectively changing states between at least the first state and the second state of at least one of the switching mechanism and the converter, and wherein:
(a) in the first state, the first capacitor is connected in parallel with the first DC energy storage device, disconnecting at least one terminal of the at least two terminals of the second capacitor from the charging interface or the second DC input, and the converter is responsive to drawing a drive current from the first DC energy storage device and applying current to at least one of the one or more inductive windings for moving the vehicle; and
(b) in the second state, after receiving the charging data, selectively connecting the second capacitor in parallel with the second DC input and the charging interface, and the first DC input in parallel with the first DC energy storage device and the first capacitor, and the converter is responsive to drawing a load current from the charging interface and applying an energizing current to at least two of the at least three inductive windings, wherein the energizing current will flow through at least two phases in series when wound in a wye configuration and through at least two phases in parallel when wound in a delta configuration, for generating at least one of a regulated charging current or a regulated charging voltage for the first DC energy storage device.

7. The controller of claim 6, wherein, in the first state, the switching mechanism disconnects at least one of the at least two terminals of the second capacitor from the charging interface, and disconnects at least one of the at least two terminals of the second capacitor from the second DC input.

8. The controller of claim 6, wherein the controller uses information of the charging data and the switching mechanism to selectively couple the second DC input, the capacitor, and the charging interface, to and from each other.

9. The controller of claim 6, wherein the controller is able to operate bidirectionally, and able to output at least one of a regulated voltage or a regulated current to the external DC source in the second state.

10. The controller of claim 6, wherein the at least two or more drive circuits include at least two switches in series, and wherein, in the second state, either the first DC input or the second DC input is defined, at least in part, by the series-mid-point of at least one of the drive circuits or by at least one end of one of the at least three inductive windings.

11. The controller of claim 10, wherein the second DC input is defined, at least in part, by the series-mid-point of at least one of the drive circuits or by at least one end of one of the at least three inductive windings, and wherein in the first state at least one terminal of the at least two terminals of the second capacitor is disconnected from the second DC input.

12. The controller of claim 6, wherein the vehicle includes a third input for interfacing with an external AC source, and a rectifier for rectifying AC current and presenting a DC current at the second DC input.

13. The method of claim 2, wherein the switching mechanism is represented, at least in part, by at least one of the at least two switches in series of at least one of the first or the second drive circuit, wherein, in the first state, at least one pole of the capacitor is disconnected from the first coupler and the at least one of the at least two switches in series is pulsed, and wherein, in the second state, the at least one of the at least two switches in series is held open circuit.

14. The method of claim 1, wherein, in a third state, the first coupler receives at least one of a regulated charging current or a regulated charging voltage for charging the first DC energy storage device from the external DC source, and further comprising a method of operating the switching mechanism for the at least one of the regulated charging current or the regulated charging voltage to bypass the electric machine winding of the electric machine of the vehicle.

15. The method of claim 14, wherein the switching mechanism is represented, at least in part, by at least one of the at least two switches in series of at least one of the first or the second drive circuit, and wherein, in the third state, the capacitor is connected across the first coupler and the input to the first or second drive circuit, and the at least one of the at least two switches in series of the switching mechanism is held in closed circuit.

16. The method of claim 15, wherein the charging data is used to selectively operate in the second state or the third state.

17. The controller of claim 6, wherein the second capacitor is pre-charged to a voltage prior to initiating the second state, and wherein, in the first state, at least one terminal of the at least two terminals of the second capacitor is disconnected from the charging interface, and at least one terminal of the at least two terminals of the second capacitor is disconnected from the second input.

18. The controller of claim 6, wherein, in a third state, the switching mechanism connects the charging interface to the first DC energy storage device to bypass the energizing current of the at least three windings, and the external DC source delivers at least one of a regulated DC voltage or a regulated DC current to the first DC energy storage device.

19. The controller of claim 18, wherein each of the at least two or more drive circuits includes at least two switching devices in series, and wherein in the third state, the switching mechanism connects the first input to the second input by using at least one of the at least two switching devices in series of at least one of the at least two or more drive circuits.

20. The controller of claim 10, wherein, in the second state, the first DC input is defined, at least in part, by the series-mid-point of at least one of the drive circuits or by at least one end of one of the at least three inductive windings, and wherein, in the first state at least one terminal of the at least two terminals of the second capacitor is disconnected from the charging interface.

* * * * *